US012795349B2

(12) United States Patent
Lee et al.

(10) Patent No.: US 12,795,349 B2
(45) Date of Patent: Nov. 10, 2026

(54) PROVIDING ENHANCED CELLULAR COMMUNICATION IN A FACILITY

(71) Applicant: View, Inc., Milpitas, CA (US)

(72) Inventors: Ji Hoon Lee, Louisville, CO (US); Yerang Hur, Fremont, CA (US)

(73) Assignee: View Operating Corporation, San Jose, CA (US)

( * ) Notice: Subject to any disclaimer, the term of this patent is extended or adjusted under 35 U.S.C. 154(b) by 218 days.

(21) Appl. No.: 18/560,261

(22) PCT Filed: May 11, 2022

(86) PCT No.: PCT/US2022/028850
§ 371 (c)(1),
(2) Date: Nov. 10, 2023

(87) PCT Pub. No.: WO2022/241046
PCT Pub. Date: Nov. 17, 2022

(65) Prior Publication Data

US 2024/0276204 A1 Aug. 15, 2024

Related U.S. Application Data

(60) Provisional application No. 63/265,653, filed on Dec. 17, 2021, provisional application No. 63/187,632, filed on May 12, 2021.

(51) Int. Cl.
*H04W 8/26* (2009.01)
*G06K 19/06* (2006.01)
*H04W 8/20* (2009.01)

(52) U.S. Cl.
CPC ........ *H04W 8/20* (2013.01); *G06K 19/06037* (2013.01); *H04W 8/265* (2013.01)

(58) Field of Classification Search
CPC .................................. H04W 8/20; H04W 8/26
See application file for complete search history.

(56) References Cited

U.S. PATENT DOCUMENTS 4,129,861 A 12/1978 Giglia
4,553,085 A 11/1985 Canzano
4,864,314 A 9/1989 Bond
(Continued)

FOREIGN PATENT DOCUMENTS

AU 2012209352 A1 8/2013
CN 1161092 A 10/1997
(Continued)

OTHER PUBLICATIONS

AGC, Inc., "AGC completes development of 5G-compatible 'Glass Antenna that adds cellular base station capabilities to windows,'" Press Release, Jun. 3, 2020, 2 pp.
(Continued)

*Primary Examiner* — Michael T Vu
(74) *Attorney, Agent, or Firm* — Cha & Reiter, LLC

(57) ABSTRACT

In various embodiments, methods, systems, software, and apparatuses for providing access to an enhanced cellular network of a facility. Different subscriber profiles may be established to enable different types of access to the extended cellular network, which may grant access to the Internet, a private network, one or more building systems of a facility, or the like.

20 Claims, 16 Drawing Sheets

(56) References Cited

U.S. PATENT DOCUMENTS

| | | | |
|---|---|---|---|
| 4,874,903 | A | 10/1989 | Clarke |
| 4,932,755 | A | 6/1990 | Holdridge et al. |
| 5,139,850 | A | 8/1992 | Clarke et al. |
| 5,147,694 | A | 9/1992 | Clarke |
| 5,202,788 | A | 4/1993 | Weppner |
| 5,384,653 | A | 1/1995 | Benson et al. |
| 5,416,617 | A | 5/1995 | Loiseaux et al. |
| 5,440,317 | A | 8/1995 | Jalloul et al. |
| 5,477,152 | A | 12/1995 | Hayhurst |
| 5,579,149 | A | 11/1996 | Moret et al. |
| 5,625,369 | A | 4/1997 | Newman |
| 5,724,187 | A | 3/1998 | Varaprasad et al. |
| 5,867,495 | A | 2/1999 | Elliott et al. |
| 5,959,586 | A | 9/1999 | Benham et al. |
| 6,032,020 | A | 2/2000 | Cook et al. |
| 6,039,390 | A | 3/2000 | Agrawal et al. |
| 6,055,089 | A | 4/2000 | Schulz et al. |
| 6,066,801 | A | 5/2000 | Kodaira et al. |
| 6,089,721 | A | 7/2000 | Schierbeek |
| 6,104,513 | A | 8/2000 | Bloom |
| 6,128,471 | A | 10/2000 | Quelch et al. |
| 6,262,831 | B1 | 7/2001 | Bauer et al. |
| 6,294,111 | B1 | 9/2001 | Shacklett, III et al. |
| 6,344,748 | B1 | 2/2002 | Gannon |
| 6,407,847 | B1 | 6/2002 | Poll et al. |
| 6,456,239 | B1 | 9/2002 | Werb et al. |
| 6,567,708 | B1 | 5/2003 | Bechtel et al. |
| 6,620,342 | B1 | 9/2003 | Burchill et al. |
| 6,703,981 | B2 | 3/2004 | Meitzler et al. |
| 6,707,590 | B1 | 3/2004 | Bartsch |
| 6,795,226 | B2 | 9/2004 | Agrawal et al. |
| 6,809,692 | B2 | 10/2004 | Puente Baliarda et al. |
| 6,897,936 | B1 | 5/2005 | Li et al. |
| 6,965,813 | B2 | 11/2005 | Granqvist et al. |
| 7,133,181 | B2 | 11/2006 | Greer |
| 7,391,420 | B1 | 6/2008 | Coyne |
| 7,536,370 | B2 | 5/2009 | Masurkar |
| 7,554,437 | B2 | 6/2009 | Axelsen |
| 7,684,105 | B2 | 3/2010 | Lamontagne et al. |
| 7,722,948 | B2 | 5/2010 | Dixon et al. |
| 7,739,138 | B2 | 6/2010 | Chauhan et al. |
| 7,800,812 | B2 | 9/2010 | Moskowitz |
| 7,941,245 | B1 | 5/2011 | Popat |
| 8,085,460 | B2 | 12/2011 | Finley et al. |
| 8,099,140 | B2 | 1/2012 | Arai |
| 8,149,756 | B2 | 4/2012 | Hottinen |
| 8,213,074 | B1 | 7/2012 | Shrivastava et al. |
| 8,254,013 | B2 | 8/2012 | Mehtani et al. |
| 8,290,627 | B2 | 10/2012 | Richards et al. |
| 8,363,178 | B2 | 1/2013 | Chung et al. |
| 8,614,848 | B2 | 12/2013 | Ueda et al. |
| 8,634,764 | B2 | 1/2014 | Cruz et al. |
| 8,705,162 | B2 | 4/2014 | Brown et al. |
| 8,780,432 | B1 | 7/2014 | Nguyen |
| 8,843,238 | B2 | 9/2014 | Wenzel et al. |
| 8,924,076 | B2 | 12/2014 | Boote et al. |
| 8,927,069 | B1 | 1/2015 | Estinto et al. |
| 8,963,378 | B1 | 2/2015 | Fornage et al. |
| 8,975,789 | B2 | 3/2015 | Snyker et al. |
| 8,976,440 | B2 | 3/2015 | Berland et al. |
| 9,081,246 | B2 | 7/2015 | Rozbicki |
| 9,128,346 | B2 | 9/2015 | Shrivastava et al. |
| 9,170,008 | B2 | 10/2015 | Reul et al. |
| 9,225,286 | B1 | 12/2015 | Tweedie |
| 9,300,581 | B1 | 3/2016 | Hui et al. |
| 9,341,912 | B2 | 5/2016 | Shrivastava et al. |
| 9,348,192 | B2 | 5/2016 | Brown et al. |
| 9,412,290 | B2 | 8/2016 | Jack et al. |
| 9,442,338 | B2 | 9/2016 | Uhm et al. |
| 9,442,341 | B2 | 9/2016 | Shrivastava et al. |
| 9,454,055 | B2 | 9/2016 | Brown et al. |
| 9,470,947 | B2 | 10/2016 | Nagel et al. |
| 9,494,055 | B2 | 11/2016 | Rusche |
| 9,551,913 | B2 | 1/2017 | Kim et al. |
| 9,664,976 | B2 | 5/2017 | Rozbicki |
| 9,677,327 | B1 | 6/2017 | Nagel et al. |
| 9,690,174 | B2 | 6/2017 | Wang |
| 9,709,869 | B2 | 7/2017 | Baumann et al. |
| 9,740,074 | B2 | 8/2017 | Agrawal et al. |
| 9,778,533 | B2 | 10/2017 | Bertolini |
| 9,791,701 | B2 | 10/2017 | Ato et al. |
| 9,898,912 | B1 | 2/2018 | Jordan, II et al. |
| 9,906,956 | B1 | 2/2018 | Huang |
| 9,946,138 | B2 | 4/2018 | Shrivastava et al. |
| 9,948,387 | B2 | 4/2018 | Frankel et al. |
| 10,001,691 | B2 | 6/2018 | Shrivastava et al. |
| 10,031,356 | B2 | 7/2018 | Van Oosten et al. |
| 10,048,561 | B2 | 8/2018 | Brown |
| 10,110,631 | B2 | 10/2018 | Bauer et al. |
| 10,137,764 | B2 | 11/2018 | Driscoll et al. |
| 10,153,845 | B2 | 12/2018 | Ashrafi |
| 10,191,318 | B2 | 1/2019 | Park et al. |
| 10,253,558 | B2 | 4/2019 | Vigano et al. |
| 10,254,618 | B2 | 4/2019 | Parker |
| 10,268,098 | B2 | 4/2019 | Shrivastava et al. |
| 10,286,839 | B1 | 5/2019 | Mazuir et al. |
| 10,288,971 | B2 | 5/2019 | Phillips et al. |
| 10,299,101 | B1 | 5/2019 | Lim et al. |
| 10,303,035 | B2 | 5/2019 | Brown et al. |
| 10,329,839 | B2 | 6/2019 | Fasi et al. |
| 10,387,221 | B2 | 8/2019 | Shrivastava et al. |
| 10,400,509 | B2 | 9/2019 | Fasi et al. |
| 10,409,652 | B2 | 9/2019 | Shrivastava et al. |
| 10,481,459 | B2 | 11/2019 | Shrivastava et al. |
| 10,488,837 | B2 | 11/2019 | Cirino |
| 10,505,751 | B2 | 12/2019 | Casilli |
| 10,514,963 | B2 | 12/2019 | Shrivastava et al. |
| 10,532,268 | B2 | 1/2020 | Tran et al. |
| 10,591,798 | B1 | 3/2020 | Nagel et al. |
| 10,673,121 | B2 | 6/2020 | Hughes et al. |
| 10,704,322 | B2 | 7/2020 | Vigano et al. |
| 10,720,766 | B2 | 7/2020 | Krammer et al. |
| 10,724,867 | B1 | 7/2020 | Waful et al. |
| 10,746,761 | B2 | 8/2020 | Rayman et al. |
| 10,747,082 | B2 | 8/2020 | Shrivastava et al. |
| 10,768,582 | B2 | 9/2020 | Shrivastava et al. |
| 10,797,373 | B2 | 10/2020 | Hughes et al. |
| 10,859,983 | B2 | 12/2020 | Shrivastava et al. |
| 10,867,266 | B1 | 12/2020 | Carlin et al. |
| 10,917,259 | B1 | 2/2021 | Chein et al. |
| 10,921,675 | B2 | 2/2021 | Barnum et al. |
| 10,949,267 | B2 | 3/2021 | Shrivastava et al. |
| 10,954,677 | B1 | 3/2021 | Scanlin |
| 10,956,231 | B2 | 3/2021 | Shrivastava et al. |
| 10,969,645 | B2 | 4/2021 | Rozbicki et al. |
| 10,989,977 | B2 | 4/2021 | Shrivastava et al. |
| 11,016,357 | B2 | 5/2021 | Brown et al. |
| 11,054,711 | B2 | 7/2021 | Shrivastava et al. |
| 11,054,792 | B2 | 7/2021 | Shrivastava et al. |
| 11,073,800 | B2 | 7/2021 | Shrivastava et al. |
| 11,114,742 | B2 | 9/2021 | Shrivastava et al. |
| 11,150,616 | B2 | 10/2021 | Shrivastava et al. |
| 11,168,910 | B2 | 11/2021 | Alcala Perez |
| 11,182,970 | B1 | 11/2021 | Kathol |
| 11,205,926 | B2 | 12/2021 | Shrivastava et al. |
| 11,294,254 | B2 | 4/2022 | Patterson et al. |
| 11,300,849 | B2 | 4/2022 | Trikha et al. |
| 11,322,818 | B2 | 5/2022 | Kum et al. |
| 11,342,791 | B2 | 5/2022 | Rozbicki et al. |
| 11,384,596 | B2 | 7/2022 | Shrivastava et al. |
| 11,436,061 | B2 | 9/2022 | Shrivastava et al. |
| 11,460,749 | B2 | 10/2022 | Trikha et al. |
| 11,462,814 | B2 | 10/2022 | Hughes et al. |
| 11,566,468 | B2 | 1/2023 | Vigano et al. |
| 11,579,571 | B2 | 2/2023 | Shrivastava et al. |
| 11,630,366 | B2 | 4/2023 | Shrivastava et al. |
| 11,670,833 | B2 | 6/2023 | Hughes et al. |
| 11,681,197 | B2 | 6/2023 | Shrivastava et al. |
| 11,687,045 | B2 | 6/2023 | Shrivastava et al. |
| 11,732,527 | B2 | 8/2023 | Rozbicki et al. |
| 11,733,660 | B2 | 8/2023 | Shrivastava et al. |
| 11,740,948 | B2 | 8/2023 | Shrivastava et al. |
| 11,750,594 | B2 | 9/2023 | Vangati et al. |
| 11,754,902 | B2 | 9/2023 | Brown et al. |

(56) References Cited

U.S. PATENT DOCUMENTS

| | | | |
|---|---|---|---|
| 11,799,187 | B2 | 10/2023 | Shrivastava et al. |
| 11,868,103 | B2 | 1/2024 | Shrivastava et al. |
| 11,882,111 | B2 | 1/2024 | Vangati et al. |
| 11,892,737 | B2 | 2/2024 | Shrivastava et al. |
| 11,948,015 | B2 | 4/2024 | Shrivastava et al. |
| 12,078,906 | B2 | 9/2024 | Shrivastava et al. |
| 12,087,997 | B2 | 9/2024 | Brown et al. |
| 2001/0005083 | A1 | 6/2001 | Serizawa et al. |
| 2002/0024424 | A1 | 2/2002 | Burns et al. |
| 2002/0027504 | A1 | 3/2002 | Davis et al. |
| 2002/0072868 | A1 | 6/2002 | Bartone et al. |
| 2002/0109634 | A1 | 8/2002 | Aisenbrey |
| 2002/0140611 | A1 | 10/2002 | Ligander et al. |
| 2002/0149829 | A1 | 10/2002 | Mochizuka et al. |
| 2003/0007462 | A1 | 1/2003 | Makinen et al. |
| 2003/0034926 | A1 | 2/2003 | Veerasamy |
| 2003/0098791 | A1 | 5/2003 | Carlson et al. |
| 2003/0101154 | A1 | 5/2003 | Hisano et al. |
| 2003/0112187 | A1 | 6/2003 | Whitehouse |
| 2003/0169574 | A1 | 9/2003 | Maruyama et al. |
| 2003/0191546 | A1 | 10/2003 | Bechtel et al. |
| 2003/0227663 | A1 | 12/2003 | Agrawal et al. |
| 2003/0232181 | A1 | 12/2003 | Simpson et al. |
| 2004/0001056 | A1 | 1/2004 | Atherton et al. |
| 2004/0053576 | A1 | 3/2004 | Vasseur et al. |
| 2004/0148057 | A1 | 7/2004 | Breed et al. |
| 2004/0150867 | A1 | 8/2004 | Lee et al. |
| 2004/0160324 | A1 | 8/2004 | Stilp |
| 2004/0160657 | A1 | 8/2004 | Tonar et al. |
| 2004/0196179 | A1 | 10/2004 | Turnbull |
| 2004/0215520 | A1 | 10/2004 | Butler et al. |
| 2004/0236620 | A1 | 11/2004 | Chauhan et al. |
| 2005/0082639 | A1 | 4/2005 | Kikuta et al. |
| 2005/0117193 | A1 | 6/2005 | Poll et al. |
| 2005/0157675 | A1 | 7/2005 | Feder et al. |
| 2005/0254442 | A1 | 11/2005 | Proctor et al. |
| 2005/0260983 | A1 | 11/2005 | DiPiazza |
| 2005/0270620 | A1 | 12/2005 | Bauer et al. |
| 2005/0270621 | A1 | 12/2005 | Bauer et al. |
| 2006/0018000 | A1 | 1/2006 | Greer |
| 2006/0033663 | A1 | 2/2006 | Saint Clair et al. |
| 2006/0074494 | A1 | 4/2006 | McFarland |
| 2006/0077511 | A1 | 4/2006 | Poll et al. |
| 2006/0107616 | A1 | 5/2006 | Ratti et al. |
| 2006/0145833 | A1 | 7/2006 | Brandt et al. |
| 2006/0174333 | A1 | 8/2006 | Thomas et al. |
| 2006/0277202 | A1 | 12/2006 | Dempsey |
| 2006/0279527 | A1 | 12/2006 | Zehner et al. |
| 2007/0008603 | A1 | 1/2007 | Sotzing et al. |
| 2007/0042819 | A1 | 2/2007 | Li et al. |
| 2007/0053053 | A1 | 3/2007 | Moskowitz |
| 2007/0067048 | A1 | 3/2007 | Bechtel et al. |
| 2007/0097481 | A1 | 5/2007 | Burdis et al. |
| 2007/0115979 | A1 | 5/2007 | Balay et al. |
| 2007/0126637 | A1 | 6/2007 | Habib et al. |
| 2007/0182705 | A1 | 8/2007 | Leyland et al. |
| 2007/0285759 | A1 | 12/2007 | Ash et al. |
| 2007/0292606 | A1 | 12/2007 | Demiryont |
| 2008/0018979 | A1 | 1/2008 | Mahe et al. |
| 2008/0042012 | A1 | 2/2008 | Callahan et al. |
| 2008/0043316 | A2 | 2/2008 | Moskowitz |
| 2008/0048101 | A1 | 2/2008 | Romig et al. |
| 2008/0147847 | A1 | 6/2008 | Pitkow et al. |
| 2008/0172312 | A1 | 7/2008 | Synesiou et al. |
| 2008/0177919 | A1 | 7/2008 | Miyazawa |
| 2008/0184350 | A1 | 7/2008 | Chu |
| 2008/0186562 | A2 | 8/2008 | Moskowitz |
| 2008/0190759 | A1 | 8/2008 | Valentin et al. |
| 2008/0211682 | A1 | 9/2008 | Hyland et al. |
| 2008/0238706 | A1 | 10/2008 | Kenwright |
| 2009/0014693 | A1 | 1/2009 | Zahn |
| 2009/0015740 | A1 | 1/2009 | Sagitov et al. |
| 2009/0047900 | A1 | 2/2009 | Cruz et al. |
| 2009/0054054 | A1 | 2/2009 | Shao et al. |
| 2009/0139052 | A1 | 6/2009 | Boenisch |
| 2009/0140219 | A1 | 6/2009 | Zahn |
| 2009/0163170 | A1 | 6/2009 | Norp et al. |
| 2009/0189458 | A1 | 7/2009 | Kawasaki |
| 2009/0224980 | A1 | 9/2009 | Cruz et al. |
| 2009/0271042 | A1 | 10/2009 | Voysey |
| 2009/0284220 | A1 | 11/2009 | Toncich et al. |
| 2009/0308933 | A1 | 12/2009 | Osada |
| 2009/0323160 | A1 | 12/2009 | Egerton et al. |
| 2009/0323161 | A1 | 12/2009 | Fuss et al. |
| 2010/0027694 | A1 | 2/2010 | Touboul et al. |
| 2010/0039410 | A1 | 2/2010 | Becker et al. |
| 2010/0052718 | A1 | 3/2010 | Baker et al. |
| 2010/0052844 | A1 | 3/2010 | Wesby |
| 2010/0060971 | A1 | 3/2010 | Schwendeman et al. |
| 2010/0076615 | A1 | 3/2010 | Daniel et al. |
| 2010/0165436 | A1 | 7/2010 | Voss et al. |
| 2010/0171667 | A1 | 7/2010 | Knudsen |
| 2010/0172010 | A1 | 7/2010 | Gustavsson et al. |
| 2010/0188057 | A1 | 7/2010 | Tarng |
| 2010/0210233 | A1 | 8/2010 | Cook et al. |
| 2010/0218010 | A1 | 8/2010 | Musti et al. |
| 2010/0228854 | A1 | 9/2010 | Morrison et al. |
| 2010/0243427 | A1 | 9/2010 | Kozlowski et al. |
| 2010/0245973 | A1 | 9/2010 | Wang et al. |
| 2010/0274366 | A1 | 10/2010 | Fata et al. |
| 2010/0286839 | A1 | 11/2010 | Iaquinangelo et al. |
| 2010/0286937 | A1 | 11/2010 | Hedley et al. |
| 2010/0302624 | A1 | 12/2010 | Moskowitz |
| 2010/0315693 | A1 | 12/2010 | Lam et al. |
| 2011/0031821 | A1 | 2/2011 | Greene et al. |
| 2011/0050756 | A1 | 3/2011 | Cassidy et al. |
| 2011/0071685 | A1 | 3/2011 | Huneycutt et al. |
| 2011/0074342 | A1 | 3/2011 | Maclaughlin |
| 2011/0080630 | A1 | 4/2011 | Valentin et al. |
| 2011/0083152 | A1 | 4/2011 | Centore, III et al. |
| 2011/0097081 | A1 | 4/2011 | Gupta et al. |
| 2011/0124313 | A1 | 5/2011 | Jones |
| 2011/0148218 | A1 | 6/2011 | Rozbicki |
| 2011/0154022 | A1 | 6/2011 | Cheng et al. |
| 2011/0159821 | A1 | 6/2011 | Park |
| 2011/0164317 | A1 | 7/2011 | Vergohl et al. |
| 2011/0170170 | A1 | 7/2011 | Boote |
| 2011/0223886 | A1 | 9/2011 | Nasielski et al. |
| 2011/0248901 | A1 | 10/2011 | Alexopoulos et al. |
| 2011/0260856 | A1 | 10/2011 | Rossmann et al. |
| 2011/0261429 | A1 | 10/2011 | Sbar et al. |
| 2012/0026573 | A1 | 2/2012 | Collins et al. |
| 2012/0033287 | A1 | 2/2012 | Friedman et al. |
| 2012/0062975 | A1 | 3/2012 | Mehtani et al. |
| 2012/0086363 | A1 | 4/2012 | Golding et al. |
| 2012/0112883 | A1 | 5/2012 | Wallace et al. |
| 2012/0133213 | A1 | 5/2012 | Borke et al. |
| 2012/0133315 | A1 | 5/2012 | Berman et al. |
| 2012/0140492 | A1 | 6/2012 | Alvarez |
| 2012/0154241 | A1 | 6/2012 | Tatarnikov et al. |
| 2012/0188627 | A1 | 7/2012 | Chen et al. |
| 2012/0190386 | A1 | 7/2012 | Anderson |
| 2012/0194895 | A1 | 8/2012 | Podbelski et al. |
| 2012/0212794 | A1 | 8/2012 | Giron et al. |
| 2012/0217346 | A1 | 8/2012 | Eberle et al. |
| 2012/0229275 | A1 | 9/2012 | Mattern |
| 2012/0235493 | A1 | 9/2012 | Kiuchi et al. |
| 2012/0239209 | A1 | 9/2012 | Brown et al. |
| 2012/0259583 | A1 | 10/2012 | Noboa et al. |
| 2012/0268369 | A1 | 10/2012 | Kikkeri |
| 2012/0275008 | A1 | 11/2012 | Pradhan et al. |
| 2012/0287017 | A1 | 11/2012 | Parsche |
| 2012/0293855 | A1 | 11/2012 | Shrivastava et al. |
| 2012/0328849 | A1 | 12/2012 | Neill et al. |
| 2013/0013921 | A1 | 1/2013 | Bhathena et al. |
| 2013/0024029 | A1 | 1/2013 | Tran et al. |
| 2013/0054033 | A1 | 2/2013 | Casilli |
| 2013/0060357 | A1 | 3/2013 | Li et al. |
| 2013/0073681 | A1 | 3/2013 | Jiang et al. |
| 2013/0085614 | A1 | 4/2013 | Wenzel et al. |
| 2013/0085615 | A1 | 4/2013 | Barker |
| 2013/0085616 | A1 | 4/2013 | Wenzel |
| 2013/0088331 | A1 | 4/2013 | Cho et al. |
| 2013/0131869 | A1 | 5/2013 | Majewski et al. |

(56) References Cited

U.S. PATENT DOCUMENTS

2013/0157493 A1 6/2013 Brown
2013/0158790 A1 6/2013 McIntyre, Jr. et al.
2013/0182308 A1 7/2013 Guarr et al.
2013/0194141 A1 8/2013 Okajima et al.
2013/0196600 A1 8/2013 Capers et al.
2013/0226353 A1 8/2013 Park
2013/0241299 A1 9/2013 Snyker et al.
2013/0242370 A1 9/2013 Wang
2013/0243120 A1 9/2013 Tsai et al.
2013/0243425 A1 9/2013 Franklin
2013/0271812 A1 10/2013 Brown et al.
2013/0271813 A1 10/2013 Brown
2013/0271814 A1 10/2013 Brown
2013/0278989 A1 10/2013 Lam et al.
2013/0306615 A1 11/2013 Rozbicki et al.
2014/0001977 A1 1/2014 Zacharchuk et al.
2014/0008992 A1 1/2014 Leabman
2014/0022621 A1 1/2014 Kailasam et al.
2014/0098007 A1 4/2014 Delpier et al.
2014/0101573 A1 4/2014 Kuo
2014/0149416 A1 5/2014 Wallace
2014/0156097 A1 6/2014 Nesler et al.
2014/0160550 A1 6/2014 Brown et al.
2014/0170863 A1 6/2014 Brown
2014/0171016 A1 6/2014 Sennett et al.
2014/0172557 A1 6/2014 Eden et al.
2014/0182350 A1 7/2014 Bhavaraju et al.
2014/0217967 A1 8/2014 Zeine et al.
2014/0236323 A1 8/2014 Brown et al.
2014/0240474 A1 8/2014 Kondo
2014/0243033 A1 8/2014 Wala et al.
2014/0249825 A1 9/2014 Proud
2014/0249876 A1 9/2014 Wu et al.
2014/0273911 A1 9/2014 Dunn et al.
2014/0274458 A1 9/2014 Kronenberg et al.
2014/0300945 A1 10/2014 Parker
2014/0303788 A1 10/2014 Sanders et al.
2014/0319116 A1 10/2014 Fischer et al.
2014/0330538 A1 11/2014 Conklin et al.
2014/0333485 A1 11/2014 Stone et al.
2014/0347190 A1 11/2014 Grimm
2014/0349497 A1 11/2014 Brown et al.
2014/0367057 A1 12/2014 Feldstein
2014/0368048 A1 12/2014 Leabman et al.
2014/0368899 A1 12/2014 Greer
2014/0371931 A1 12/2014 Lin et al.
2014/0375454 A1 12/2014 Konrad et al.
2015/0002919 A1 1/2015 Jack et al.
2015/0003822 A1 1/2015 Fukada et al.
2015/0023661 A1 1/2015 Borkenhagen et al.
2015/0092259 A1 4/2015 Greer et al.
2015/0098121 A1 4/2015 Turnbull et al.
2015/0116811 A1 4/2015 Shrivastava et al.
2015/0120297 A1 4/2015 Meruva
2015/0129140 A1 5/2015 Dean et al.
2015/0137792 A1 5/2015 Filippi et al.
2015/0155737 A1 6/2015 Mayo
2015/0160525 A1 6/2015 Shi
2015/0198640 A1 7/2015 Lee
2015/0222126 A1 8/2015 Leabman et al.
2015/0323287 A1 11/2015 Durand
2015/0327010 A1 11/2015 Gottschalk et al.
2015/0327304 A1 11/2015 Tinnakornsrisuphap et al.
2015/0338713 A1 11/2015 Brown
2015/0368967 A1 12/2015 Lundy et al.
2015/0378230 A1 12/2015 Gudmunson et al.
2015/0378231 A1 12/2015 Greer et al.
2016/0020647 A1 1/2016 Leabman et al.
2016/0028162 A1 1/2016 Ou et al.
2016/0054633 A1 2/2016 Brown et al.
2016/0054634 A1 2/2016 Brown et al.
2016/0070151 A1 3/2016 Shrivastava et al.
2016/0091769 A1 3/2016 Rozbicki
2016/0099757 A1 4/2016 Leabman et al.
2016/0109778 A1 4/2016 Shrivastava et al.
2016/0124283 A1 5/2016 Brown et al.
2016/0134932 A1 5/2016 Karp et al.
2016/0135175 A1 5/2016 Tarlazzi
2016/0147100 A1 5/2016 Van Oosten et al.
2016/0149635 A1 5/2016 Hinman et al.
2016/0154290 A1 6/2016 Brown et al.
2016/0170402 A1 6/2016 Lindström
2016/0181873 A1 6/2016 Mitcheson et al.
2016/0183056 A1 6/2016 Leabman
2016/0202589 A1 7/2016 Nagel et al.
2016/0203403 A1 7/2016 Nagel et al.
2016/0225832 A1 8/2016 Kwon et al.
2016/0231354 A1 8/2016 Rayman et al.
2016/0248270 A1 8/2016 Zeine et al.
2016/0261837 A1 9/2016 Thompson et al.
2016/0359965 A1 12/2016 Murphy et al.
2016/0372083 A1 12/2016 Taite et al.
2017/0052289 A1 2/2017 Boissevain et al.
2017/0052753 A1 2/2017 Paolini, Jr. et al.
2017/0063429 A1 3/2017 Flask
2017/0068414 A1 3/2017 Plumb
2017/0070457 A1 3/2017 Sachs
2017/0075183 A1 3/2017 Brown
2017/0075323 A1 3/2017 Shrivastava et al.
2017/0077988 A1 3/2017 Flask
2017/0080341 A1 3/2017 Mao et al.
2017/0082903 A1 3/2017 Vigano et al.
2017/0085834 A1 3/2017 Kim et al.
2017/0097259 A1 4/2017 Brown et al.
2017/0104374 A1 4/2017 Zeine et al.
2017/0117754 A1 4/2017 Noori et al.
2017/0139301 A1 5/2017 Messere et al.
2017/0146884 A1 5/2017 Vigano et al.
2017/0147023 A1 5/2017 Kumar et al.
2017/0197494 A1 7/2017 Li
2017/0200424 A1 7/2017 Xu et al.
2017/0212400 A1 7/2017 Shrivastava et al.
2017/0223312 A1 8/2017 McNELLEY et al.
2017/0234067 A1 8/2017 Fasi et al.
2017/0243122 A1 8/2017 Komatsu et al.
2017/0251488 A1 8/2017 Urban et al.
2017/0253801 A1 9/2017 Bae et al.
2017/0264865 A1 9/2017 Huangfu
2017/0272145 A1 9/2017 Lilja
2017/0272317 A1 9/2017 Singla et al.
2017/0279930 A1 9/2017 Zhang
2017/0284691 A1 10/2017 Sinha et al.
2017/0285432 A1 10/2017 Shrivastava et al.
2017/0285433 A1 10/2017 Shrivastava et al.
2017/0328121 A1 11/2017 Purdy et al.
2017/0347129 A1 11/2017 Levi et al.
2017/0359163 A1* 12/2017 Menard .................... H04L 7/04
2017/0364046 A1 12/2017 Westrick, Jr. et al.
2017/0364395 A1 12/2017 Shrivastava et al.
2017/0365908 A1 12/2017 Hughes et al.
2018/0004059 A1 1/2018 Jovanovic
2018/0076978 A1 3/2018 Schubert et al.
2018/0088432 A1 3/2018 Shrivastava et al.
2018/0090992 A1 3/2018 Shrivastava et al.
2018/0095337 A1 4/2018 Rozbicki et al.
2018/0106098 A1 4/2018 Unveren et al.
2018/0129172 A1 5/2018 Shrivastava et al.
2018/0138576 A1 5/2018 Cohen
2018/0144712 A1 5/2018 Threlkel et al.
2018/0157141 A1 6/2018 Brown et al.
2018/0176799 A1 6/2018 Lange et al.
2018/0187478 A1 7/2018 Vigano et al.
2018/0188627 A1 7/2018 Vigano et al.
2018/0189117 A1 7/2018 Shrivastava et al.
2018/0241587 A1 8/2018 Bull et al.
2018/0252423 A1 9/2018 Hieke et al.
2018/0267380 A1 9/2018 Shrivastava et al.
2018/0270542 A1 9/2018 Ramalingam et al.
2018/0284555 A1 10/2018 Klawuhn et al.
2018/0301783 A1 10/2018 Bulja et al.
2018/0321042 A1 11/2018 Brewer et al.
2018/0335939 A1 11/2018 Karunamuni et al.
2019/0011798 A9 1/2019 Brown et al.
2019/0025661 A9 1/2019 Brown et al.

(56) References Cited

U.S. PATENT DOCUMENTS

| | | | |
|---|---|---|---|
| 2019/0028287 A1 | 1/2019 | Jin et al. | |
| 2019/0036209 A1 | 1/2019 | Au | |
| 2019/0044606 A1 | 2/2019 | Mansikkamaki | |
| 2019/0067826 A1 | 2/2019 | Achour et al. | |
| 2019/0097827 A1 | 3/2019 | Angle et al. | |
| 2019/0155122 A1 | 5/2019 | Brown et al. | |
| 2019/0215694 A1 | 7/2019 | Rubin et al. | |
| 2019/0219881 A1 | 7/2019 | Shrivastava et al. | |
| 2019/0235451 A1 | 8/2019 | Shrivastava et al. | |
| 2019/0267840 A1 | 8/2019 | Rozbicki et al. | |
| 2019/0271895 A1 | 9/2019 | Shrivastava et al. | |
| 2019/0294018 A1 | 9/2019 | Shrivastava et al. | |
| 2019/0319335 A1 | 10/2019 | Hughes et al. | |
| 2019/0320033 A1 | 10/2019 | Nagata et al. | |
| 2019/0324341 A1 | 10/2019 | Tonar et al. | |
| 2019/0327320 A1 | 10/2019 | Rubin et al. | |
| 2019/0331978 A1 | 10/2019 | Shrivastava et al. | |
| 2019/0347141 A1 | 11/2019 | Shrivastava et al. | |
| 2019/0353972 A1 | 11/2019 | Shrivastava et al. | |
| 2019/0354071 A1 | 11/2019 | Turney et al. | |
| 2019/0356508 A1 | 11/2019 | Trikha et al. | |
| 2019/0361411 A1 | 11/2019 | Park et al. | |
| 2019/0384652 A1 | 12/2019 | Shrivastava et al. | |
| 2020/0022072 A1 | 1/2020 | Cho et al. | |
| 2020/0041963 A1 | 2/2020 | Shrivastava et al. | |
| 2020/0041967 A1 | 2/2020 | Shrivastava et al. | |
| 2020/0045261 A1 | 2/2020 | Lim et al. | |
| 2020/0057421 A1 | 2/2020 | Trikha et al. | |
| 2020/0067865 A1 | 2/2020 | Jiménez et al. | |
| 2020/0103841 A1 | 4/2020 | Pillai et al. | |
| 2020/0150508 A1 | 5/2020 | Patterson et al. | |
| 2020/0162856 A1 | 5/2020 | Ziv et al. | |
| 2020/0193155 A1 | 6/2020 | Keohane et al. | |
| 2020/0241379 A1 | 7/2020 | Barnum et al. | |
| 2020/0257179 A1 | 8/2020 | Barnum et al. | |
| 2020/0259237 A1 | 8/2020 | Shrivastava et al. | |
| 2020/0260556 A1 | 8/2020 | Rozbicki et al. | |
| 2020/0319765 A1 | 10/2020 | Badr et al. | |
| 2020/0321682 A1 | 10/2020 | Hughes et al. | |
| 2020/0387041 A1 | 12/2020 | Shrivastava et al. | |
| 2021/0021788 A1 | 1/2021 | Mcnelley et al. | |
| 2021/0040789 A1 | 2/2021 | Rozbicki et al. | |
| 2021/0041759 A1 | 2/2021 | Trikha et al. | |
| 2021/0063836 A1 | 3/2021 | Patterson et al. | |
| 2021/0119318 A1 | 4/2021 | Hughes et al. | |
| 2021/0132458 A1 | 5/2021 | Trikha et al. | |
| 2021/0165696 A1 | 6/2021 | Shrivastava et al. | |
| 2021/0185540 A1* | 6/2021 | Gundavelli | H04W 4/60 |
| 2021/0191221 A1 | 6/2021 | Shrivastava et al. | |
| 2021/0210053 A1 | 7/2021 | Ng et al. | |
| 2021/0232015 A1 | 7/2021 | Brown et al. | |
| 2021/0246719 A1 | 8/2021 | Shrivastava et al. | |
| 2021/0302799 A1 | 9/2021 | Khanna | |
| 2021/0373511 A1 | 12/2021 | Shrivastava et al. | |
| 2021/0376445 A1 | 12/2021 | Shrivastava et al. | |
| 2021/0383804 A1 | 12/2021 | Makker et al. | |
| 2021/0384764 A1 | 12/2021 | Shrivastava et al. | |
| 2021/0390953 A1 | 12/2021 | Makker et al. | |
| 2022/0011729 A1 | 1/2022 | Shrivastava et al. | |
| 2022/0019117 A1 | 1/2022 | Shrivastava et al. | |
| 2022/0021099 A1 | 1/2022 | Shrivastava et al. | |
| 2022/0121078 A1 | 4/2022 | Vollen et al. | |
| 2022/0159077 A1 | 5/2022 | Shrivastava et al. | |
| 2022/0171248 A1 | 6/2022 | Shrivastava et al. | |
| 2022/0179275 A1 | 6/2022 | Patterson et al. | |
| 2022/0217525 A1* | 7/2022 | Prayaga | H04W 12/35 |
| 2022/0231396 A1 | 7/2022 | Rozbicki et al. | |
| 2022/0231399 A1 | 7/2022 | Brown et al. | |
| 2022/0252952 A1 | 8/2022 | Rozbicki et al. | |
| 2022/0255351 A1 | 8/2022 | Rozbicki et al. | |
| 2022/0298850 A1 | 9/2022 | Shrivastava et al. | |
| 2022/0316269 A1 | 10/2022 | Shrivastava et al. | |
| 2022/0337596 A1 | 10/2022 | Smith et al. | |
| 2022/0365494 A1 | 11/2022 | Shrivastava et al. | |
| 2022/0365830 A1 | 11/2022 | Shrivastava et al. | |
| 2022/0413351 A1 | 12/2022 | Trikha et al. | |
| 2023/0041490 A1 | 2/2023 | Vangati et al. | |
| 2023/0074720 A1 | 3/2023 | Brown et al. | |
| 2023/0111311 A1 | 4/2023 | Shrivastava et al. | |
| 2023/0120049 A1 | 4/2023 | Vangati et al. | |
| 2023/0152652 A1 | 5/2023 | Trikha et al. | |
| 2023/0261358 A1 | 8/2023 | Hughes et al. | |
| 2023/0333520 A1 | 10/2023 | Shrivastava et al. | |
| 2023/0341740 A1 | 10/2023 | Shrivastava et al. | |
| 2023/0393443 A1 | 12/2023 | Marquez et al. | |
| 2023/0393542 A1 | 12/2023 | Shrivastava et al. | |
| 2024/0171566 A1 | 5/2024 | Vangati et al. | |
| 2024/0192563 A1 | 6/2024 | Hur et al. | |
| 2024/0201314 A1 | 6/2024 | Gomez-Martinez et al. | |
| 2024/0220337 A1 | 7/2024 | Shrivastava et al. | |
| 2024/0242717 A1 | 7/2024 | Makker et al. | |
| 2024/0284155 A1 | 8/2024 | Lee et al. | |

FOREIGN PATENT DOCUMENTS

| | | | |
|---|---|---|---|
| CN | 1219251 | A | 6/1999 |
| CN | 1267416 | A | 9/2000 |
| CN | 1276574 | A | 12/2000 |
| CN | 1311935 | A | 9/2001 |
| CN | 1599280 | A | 3/2005 |
| CN | 1692348 | A | 11/2005 |
| CN | 1723658 | A | 1/2006 |
| CN | 101032052 | A | 9/2007 |
| CN | 101154104 | A | 4/2008 |
| CN | 101253460 | A | 8/2008 |
| CN | 101401312 | A | 4/2009 |
| CN | 101501757 | A | 8/2009 |
| CN | 101510078 | A | 8/2009 |
| CN | 101856193 | A | 10/2010 |
| CN | 101868346 | A | 10/2010 |
| CN | 102255119 | A | 11/2011 |
| CN | 102325326 | A | 1/2012 |
| CN | 102326164 | A | 1/2012 |
| CN | 102414601 | A | 4/2012 |
| CN | 102598469 | A | 7/2012 |
| CN | 202443309 | U | 9/2012 |
| CN | 103051737 | A | 4/2013 |
| CN | 103168269 | A | 6/2013 |
| CN | 203019761 | U | 6/2013 |
| CN | 103238107 | A | 8/2013 |
| CN | 103282841 | A | 9/2013 |
| CN | 103327126 | A | 9/2013 |
| CN | 103345236 | A | 10/2013 |
| CN | 103547965 | A | 1/2014 |
| CN | 103649826 | A | 3/2014 |
| CN | 103793730 | A | 5/2014 |
| CN | 103842735 | A | 6/2014 |
| CN | 103987909 | A | 8/2014 |
| CN | 104102060 | A | 10/2014 |
| CN | 104114804 | A | 10/2014 |
| CN | 104321497 | A | 1/2015 |
| CN | 104335595 | A | 2/2015 |
| CN | 104364706 | A | 2/2015 |
| CN | 104884248 | A | 9/2015 |
| CN | 105143586 | A | 12/2015 |
| CN | 105974160 | A | 9/2016 |
| CN | 106125444 | A | 11/2016 |
| CN | 106164973 | A | 11/2016 |
| CN | 106462023 | A | 2/2017 |
| CN | 205992531 | U | 3/2017 |
| CN | 106575064 | A | 4/2017 |
| CN | 107111287 | A | 8/2017 |
| CN | 107850815 | A | 3/2018 |
| CN | 104730795 | B | 5/2018 |
| CN | 108139644 | A | 6/2018 |
| CN | 107112620 | B | 12/2019 |
| EP | 0413580 | A1 | 2/1991 |
| EP | 0588514 | A1 | 3/1994 |
| EP | 0917667 | A1 | 5/1999 |
| EP | 1929701 | A2 | 6/2008 |
| EP | 1297380 | B1 | 11/2008 |
| EP | 2090961 | A1 | 8/2009 |
| EP | 2357544 | A2 | 8/2011 |
| EP | 2645474 | A1 | 10/2013 |

(56) References Cited

FOREIGN PATENT DOCUMENTS

| | | | |
|---|---|---|---|
| EP | 2648086 | A2 | 10/2013 |
| EP | 2733998 | A1 | 5/2014 |
| EP | 2764998 | A1 | 8/2014 |
| EP | 2357544 | B1 | 10/2014 |
| EP | 2837205 | A1 | 2/2015 |
| EP | 2851993 | A1 | 3/2015 |
| EP | 3015915 | A1 | 5/2016 |
| EP | 2837205 | B1 | 2/2017 |
| EP | 3293941 | A1 | 3/2018 |
| EP | 3352053 | A1 | 7/2018 |
| EP | 3230943 | B1 | 7/2021 |
| JP | S63271320 | A | 11/1988 |
| JP | H10215492 | A | 8/1998 |
| JP | H10233612 | A | 9/1998 |
| JP | H10246078 | A | 9/1998 |
| JP | H11500838 | A | 1/1999 |
| JP | 2000165970 | A | 6/2000 |
| JP | 2001196826 | A | 7/2001 |
| JP | 2003284160 | A | 10/2003 |
| JP | 2004001765 | A | 1/2004 |
| JP | 2004332350 | A | 11/2004 |
| JP | 2005303348 | A | 10/2005 |
| JP | 2006252886 | A | 9/2006 |
| JP | 2006287729 | A | 10/2006 |
| JP | 2007156909 | A | 6/2007 |
| JP | 4139109 | B2 | 8/2008 |
| JP | 2009005116 | A | 1/2009 |
| JP | 2010152646 | A | 7/2010 |
| JP | 2012017614 | A | 1/2012 |
| JP | 2012533060 | A | 12/2012 |
| JP | 2013515457 | A | 5/2013 |
| JP | 3184348 | U | 6/2013 |
| JP | 2014121122 | A | 6/2014 |
| JP | 5556044 | B2 | 7/2014 |
| JP | 5564620 | B2 | 7/2014 |
| JP | 2014204550 | A | 10/2014 |
| JP | 2015128349 | A | 7/2015 |
| JP | 2015521459 | A | 7/2015 |
| JP | 2016512677 | A | 4/2016 |
| JP | 2018050290 | A | 3/2018 |
| JP | 2018507337 | A | 3/2018 |
| JP | 2019508946 | A | 3/2019 |
| JP | 2019186771 | A | 10/2019 |
| KR | 19990088613 | A | 12/1999 |
| KR | 20030040361 | A | 5/2003 |
| KR | 20030073121 | A | 9/2003 |
| KR | 20070089370 | A | 8/2007 |
| KR | 20080068165 | A | 7/2008 |
| KR | 20090066107 | A | 6/2009 |
| KR | 20110128213 | A | 11/2011 |
| KR | 20120045915 | A | 5/2012 |
| KR | 20120092921 | A | 8/2012 |
| KR | 20120117409 | A | 10/2012 |
| KR | 20130023668 | A | 3/2013 |
| KR | 20130026740 | A | 3/2013 |
| KR | 20130112693 | A | 10/2013 |
| KR | 101323668 | B1 | 11/2013 |
| KR | 101346862 | B1 | 1/2014 |
| KR | 20140004175 | A | 1/2014 |
| KR | 20150001549 | A | 1/2015 |
| KR | 20150136981 | A | 12/2015 |
| KR | 20170021692 | A | 2/2017 |
| KR | 101799323 | B1 | 12/2017 |
| KR | 20180012615 | A | 2/2018 |
| KR | 20190142032 | A | 12/2019 |
| KR | 20210032133 | A | 3/2021 |
| KR | 20210039721 | A | 4/2021 |
| RU | 104808 | U1 | 5/2011 |
| RU | 2012107324 | A | 9/2013 |
| SG | 141352 | A1 | 4/2008 |
| TW | 200532346 | A | 10/2005 |
| TW | 201029838 | A | 8/2010 |
| TW | 201135545 | A | 10/2011 |
| TW | 201243470 | A | 11/2012 |
| TW | 201344874 | A | 11/2013 |
| TW | 201423773 | A | 6/2014 |
| TW | M519749 | U | 4/2016 |
| TW | 201635840 | A | 10/2016 |
| TW | I607269 | B | 12/2017 |
| WO | WO-9823116 | A2 | 5/1998 |
| WO | WO-0124700 | A1 | 4/2001 |
| WO | WO-0182410 | A1 | 11/2001 |
| WO | WO-03037056 | A1 | 5/2003 |
| WO | WO-03092309 | A1 | 11/2003 |
| WO | WO-2007146862 | A2 | 12/2007 |
| WO | WO-2008073372 | A2 | 6/2008 |
| WO | WO-2010014648 | A1 | 2/2010 |
| WO | WO-2010079388 | A1 | 7/2010 |
| WO | WO-2010106648 | A1 | 9/2010 |
| WO | WO-2011082208 | A2 | 7/2011 |
| WO | WO-2011087726 | A2 | 7/2011 |
| WO | WO-2012079159 | A1 | 6/2012 |
| WO | WO-2012125332 | A2 | 9/2012 |
| WO | WO-2012125348 | A2 | 9/2012 |
| WO | WO-2012130262 | A1 | 10/2012 |
| WO | WO-2013046112 | A1 | 4/2013 |
| WO | WO-2013121103 | A1 | 8/2013 |
| WO | WO-2013155467 | A1 | 10/2013 |
| WO | WO-2013158365 | A1 | 10/2013 |
| WO | WO-2013158464 | A1 | 10/2013 |
| WO | WO-2013159778 | A1 | 10/2013 |
| WO | WO-2013177575 | A1 | 11/2013 |
| WO | WO-2014007487 | A1 | 1/2014 |
| WO | WO-2014059268 | A2 | 4/2014 |
| WO | WO-2014082092 | A1 | 5/2014 |
| WO | WO-2014121809 | A1 | 8/2014 |
| WO | WO-2014124701 | A1 | 8/2014 |
| WO | WO-2014124710 | A1 | 8/2014 |
| WO | WO-2014130471 | A1 | 8/2014 |
| WO | WO-2015013578 | A1 | 1/2015 |
| WO | WO-2015051262 | A1 | 4/2015 |
| WO | WO-2015075007 | A1 | 5/2015 |
| WO | WO-2015077829 | A1 | 6/2015 |
| WO | WO-2015113592 | A1 | 8/2015 |
| WO | WO-2015134789 | A1 | 9/2015 |
| WO | WO-2016004109 | A1 | 1/2016 |
| WO | WO-2016044187 | A1 | 3/2016 |
| WO | WO-2016072620 | A1 | 5/2016 |
| WO | WO-2016085964 | A1 | 6/2016 |
| WO | WO-2016094445 | A1 | 6/2016 |
| WO | WO-2016153467 | A1 | 9/2016 |
| WO | WO-2016174228 | A1 | 11/2016 |
| WO | WO-2016183059 | A1 | 11/2016 |
| WO | WO-2017007841 | A1 | 1/2017 |
| WO | WO-2017007942 | A1 | 1/2017 |
| WO | WO-2017062592 | A1 | 4/2017 |
| WO | WO-2017062915 | A1 | 4/2017 |
| WO | WO-2017075059 | A1 | 5/2017 |
| WO | WO-2017129855 | A1 | 8/2017 |
| WO | WO-2017155833 | A1 | 9/2017 |
| WO | WO-2017189618 | A1 | 11/2017 |
| WO | WO-2017192881 | A1 | 11/2017 |
| WO | WO-2018039080 | A1 | 3/2018 |
| WO | WO-2018063919 | A1 | 4/2018 |
| WO | WO-2018067377 | A1 | 4/2018 |
| WO | WO-2018094203 | A1 | 5/2018 |
| WO | WO-2018098089 | A1 | 5/2018 |
| WO | WO-2018102103 | A1 | 6/2018 |
| WO | WO-2018200702 | A1 | 11/2018 |
| WO | WO-2018200740 | A2 | 11/2018 |
| WO | WO-2018200752 | A1 | 11/2018 |
| WO | WO-2019022129 | A1 | 1/2019 |
| WO | WO-2019157602 | A1 | 8/2019 |
| WO | WO-2019203931 | A1 | 10/2019 |
| WO | WO-2019204205 | A1 | 10/2019 |
| WO | WO-2019213441 | A1 | 11/2019 |
| WO | WO-2020172187 | A1 | 8/2020 |
| WO | WO-2020185941 | A1 | 9/2020 |
| WO | WO-2020227702 | A2 | 11/2020 |
| WO | WO-2020243690 | A1 | 12/2020 |

(56) References Cited

FOREIGN PATENT DOCUMENTS

WO WO-2020227702 A3 1/2021
WO WO-2021211798 A1 10/2021

OTHER PUBLICATIONS

"Sage Product Highlights" screenshot, accessed Aug. 28, 2015, 1 page.
"SageGlass Mobile App" screenshot, accessed Aug. 28, 2015, 1 page.
"SageGlass Unplugged" screenshot, accessed Aug. 28, 2015, 1 page.
"SageGlass Unplugged™—wireless dynamic glass", 2014, 2 pages.
Alarifi, A. et al., "Ultra Wideband Indoor Positioning Technologies: Analysis and Recent Advances", SENSORS, May 16, 2016, vol. 16 No. 5, pp. 1-36.
Alguindigue. I., et al., "Monitoring and Diagnosis of Rolling Element Bearings Using Artificial Neural Networks," IEEE Transactions on Industrial Electronics, 1993, vol. 40 (2), pp. 209-217.
APC by Schneider Electric, Smart-UPS 120V Product Brochure, 2013, 8 pp.
AU examination report dated Oct. 1, 2021, in application No. AU2020220165.
AU Office Action dated Jan. 11, 2022, in Application No. AU2021201145.
AU Office action dated Sep. 30, 2022, in AU Application No. AU2021215134.
AU Office action dated Apr. 4, 2022, in AU Application No. AU2020226999.
AU Office action dated Apr. 4, 2023, in AU Application No. AU2022202275.
AU Office Action dated Aug. 30, 2022, in Application No. AU20210250838.
AU Office action dated Mar. 20, 2023, in AU Application No. AU20210215134.
AU Office action dated Oct. 12, 2022, in AU Application No. AU2020226999.
AU Office action dated Oct. 22, 2021, in AU Application No. AU2020226999.
Australian Examination Report dated Dec. 24, 2019 in AU Application No. 2015227056.
Australian Examination Report dated Mar. 2, 2020 in AU Application No. 2015353569.
Australian Office Action dated Apr. 8, 2020 in AU Application No. 2015353606.
Australian Office Action dated Aug. 10, 2020 in AU Application No. 2015360714.
Australian Office Action dated Aug. 20, 2019 in AU Application No. 2015353606.
Australian Office Action dated Aug. 9, 2021 in AU Application No. 2015360714.
Australian Office Action dated Dec. 4, 2020 in AU Application No. 2015360714.
Australian Office Action dated Feb. 19, 2021 in AU Application No. 2017260101.
Australian Office Action dated Jun. 3, 2021 in AU Application No. AU 2020220165.
Australian Office Action dated Jun. 4, 2021 in AU Application No. 2015360714.
Australian Office Action dated Mar. 4, 2020 in AU Application No. 2015353606.
Australian Office Action dated May 10, 2019 in AU Application No. 2015353606.
Azini, A.S et al., "Transparent Antenna Design for Wireless Access Point Application," PIERS Proceedings, Taipei, Mar. 25-28, 2013, pp. 910-913.
Balzano Q., et al., "RF Energy in Cars From Window-mounted Antennas", 36th IEEE Vehicular Technology Conference, 2006, pp. 32-39.
Bannat, A., et al., "Artificial Cognition in Production Systems", IEEE Transactions on Automation Science and Engineering, 2011, vol. 8, No. 1, pp. 148-174.
Bucci, G., et al., "Digital Measurement Station for Power Quality Analysis in Distributed Environments," IEEE Transactions on Instrumentation and Measurement, 2003, vol. 52(1), pp. 75-84.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.
CA Office Action dated Aug. 15, 2023, in Application No. CA2968665.
CA Office Action dated Dec. 5, 2023 in Application No. 2970300.
CA Office Action dated Dec. 13, 2021, in Application No. CA2970300.
CA Office Action dated Dec. 22, 2021, in Application No. 2968665.
CA Office Action dated Dec. 23, 2021, in Application No. CA2941526.
CA Office Action dated Dec. 27, 2023 in CA Application No. 3172227.
CA Office Action dated Feb. 22, 2023, in Application No. CA2970300.
CA Office Action dated Jan. 11, 2024 in CA Application No. 3038974.
CA Office Action dated Jan. 26, 2024 in CA Application No. CA3167832.
CA Office Action dated Jul. 31, 2023, in Application No. CA3156883.
CA Office Action dated Jun. 1, 2023, in Application No. CA3023072.
CA Office Action dated Nov. 9, 2023, in CA Application No. 3139813.
CA Office Action dated Nov. 15, 2022 in Application No. CA2968665.
CA Office Action dated Oct. 26, 2023, in CA Application No. 3039342.
CA Office Action dated Oct. 31, 2023, in Application No. CA3129952.
CA Office Action dated Sep. 1, 2023, in Application No. CA3034630.
CA Office Action dated Sep. 13, 2022, in Application No. CA2970300.
CA Office Action dated Sep. 28, 2023, in Application No. CA3062817.
CAN in Automation (CiA): PDO protocol, 2016; can-cia.org, http://www.can-cia.org/can-knowledge/canopen/pdo-protocol. Retrived from https ://web .archive.org/web/20161028171403/http :1/www .can-cia .org/can-knowledge/canopen/pdo-protocol on Feb. 8, 2023, Year: 2016.
Cecilio, J., et al., "A Configurable Middleware for Processing Heterogenous Industrial Intelligent Sensors," IEEE 16th International Conference on Intelligent Engineering Systems (INES), Jun. 15, 2012, pp. 145-149.
Chan, E.C.L, et al., "Effect of Channel Interference on Indoor Wireless Local Area Network Positioning" IEEE 6th International Conference on Wireless and Mobile Computing, Networking and Communications, Oct. 11, 2010, pp. 239-245.
Chen, H. et al. "The Design and Implementation of a Smart Building Control System", 2009 IEEE International Conference on e-Business Engineering, pp. 255-262.
Chinese Office Action dated Nov. 1, 2022 in CN Application No. CN201880035570 with English translation.
CN Office Action dated Dec. 29, 2021, in application No. 202010466929.9 with English translation.
CN Notice of Allowance with Supplemental Search Report (w/translation) dated Mar. 1, 2021 in CN Application No. 201580040461.4.
CN Office Action dated Apr. 11, 2024 in CN Application No. 201980003232.3 with English translation.
CN Office Action dated Apr. 15, 2022 in CN Application No. 201780063202.2.
CN Office Action dated Apr. 15, 2022 in CN Application No. 201780063202.2 with English translation.
CN Office Action dated Apr. 18, 2022, in Application No. CN202011547257.0 with English translation.
CN Office Action dated Apr. 27, 2022, in Application No. CN201780057293.9 with English translation.
CN Office Action dated Apr. 29, 2020 in CN Application No. 201780038353.2.
CN Office Action dated Apr. 6, 2021 in CN Application No. 201780038353.2.
CN Office Action dated Apr. 6, 2021 in CN Application No. 201911227990.1.
CN Office Action dated Aug. 1, 2022, in Application No. CN201880037591.6 With English translation.

(56) References Cited

OTHER PUBLICATIONS

CN Office Action dated Aug. 16, 2019 in CN Application No. 201580015979.2.
CN Office Action dated Aug. 17, 2023, in Application No. CN202111203764.7 with English translation.
CN Office Action dated Aug. 19, 2022, in Application No. CN202080022001.X with English translation.
CN Office Action dated Aug. 2, 2021, in CN Application No. 201780038353.2 with English translation.
CN Office action dated Aug. 22, 2022 in Application No. CN202011547257.0 With English translation.
CN Office Action dated Aug. 28, 2018 in CN Application No. 201580070776.3.
CN Office Action dated Aug. 3, 2021 in CN Application No. 201780063202.2.
CN Office Action dated Aug. 31, 2022 in Application No. CN201780069604.3 with English translation.
CN Office Action dated Aug. 6, 2019 in CN Application No. 201580070207.9.
CN Office Action dated Dec. 1, 2021, in application No. CN201780069604.3 with English translation.
CN Office Action dated Dec. 12, 2023 in CN Application No. 201980003232.3, withEnglish Translation.
CN Office Action dated Feb. 2, 2019 in CN Application No. 201580015979.2.
CN Office Action dated Feb. 3, 2020 in CN Application No. 201580072749.X.
CN Office Action dated Jan. 10, 2023, in Application No. CN202080022001.X with English translation.
CN Office Action dated Jan. 12, 2023 in CN Application No. CN202011547257 with English translation.
CN Office Action dated Jan. 15, 2020 in CN Application No. 201580015979.2.
CN Office Action dated Jan. 15, 2024 in CN Application No. CN202011606768.5, with English Translation.
CN Office Action dated Jul. 28, 2021, in CN Application No. 201780057293.9.
CN Office Action dated Jul. 28, 2023, in Application No. CN201980031543 with English translation.
CN Office Action dated Jul. 29, 2023, in Application No. CN201880035570.0 with English Translation.
CN Office Action dated Jun. 7, 2024 in CN Application No. 202011606768.5 with English translation.
CN Office Action dated Jun. 29, 2021 in CN Application No. 202010466929.9.
CN Office Action dated Jun. 3, 2020 in CN Application No. 201580015979.2.
CN Office Action dated Jun. 3, 2021 in CN Application No. 201580072749.X.
CN Office Action dated Mar. 16, 2023, in Application No. CN202080022001 .X with English translation.
CN Office Action dated Mar. 19, 2019 in CN Application No. 201580070776.3.
CN Office Action dated Mar. 2, 2022, in Application No. CN201880037591.6 with English translation.
CN Office Action dated Mar. 30, 2023 in Application No. CN201980031543 with English translation.
CN Office Action dated Mar. 5, 2019 in CN Application No. 201580070207.9.
CN Office Action dated Mar. 8, 2021 in CN Application No. 201580072749.X.
CN Office Action dated Mar. 9, 2020 in CN Application No. 201580040461.4.
CN Office Action dated May 17, 2022, in Application No. CN201780069604.3 With English Translation.
CN Office Action dated May 20, 2022, in Application No. CN202010466929.9 with English translation.
CN Office Action dated May 24, 2023, in Application No. CN202080022001 .X with English translation.
CN Office Action dated Nov. 1, 2022, in Application No. CN201880037591.6 with English translation.
CN Office Action dated Nov. 12, 2021, in Application No. CN20158072749 with English translation.
CN Office Action dated Nov. 6, 2020 in CN Application No. 201780038353.2.
CN Office Action dated Oct. 10, 2022, in Application No. CN201780057293.9, with EnglishTranslation.
CN Office Action dated Oct. 21, 2020 in CN Application No. 201580040461.4.
CN Office Action dated Oct. 22, 2020 in CN Application No. 201911227990.1.
CN Office Action dated Oct. 9, 2019 in CN Application No. 201580070776.3.
CN Office Action dated Sep. 15, 2021, in application No. CN201911227990.1 with English translation.
CN Office Action dated Sep. 26, 2023, in CN Application No. 202080060919.3 with English Translation.
CN Office Action dated Sep. 28, 2022 in Application No. CN202010466929.9 with English translation.
CN Office Action dated Sep. 30, 2020 in CN Application No. 201580072749.X.
Duchon, Claude E et al., "Estimating Cloud Type from Pyranometer Observations," Journal of Applied Meteorology, vol. 38, Jan. 1999, pp. 132-141.
EP Office Action dated Jul. 13, 2022 in Application No. EP20170858928.
EP Office Action dated Sep. 12, 2022 in Application No. EP20180791117.7.
EP Examination Report dated Mar. 4, 2019 in EP Application No. 15814233.1.
EP Extended European Search report dated Apr. 2, 2024 in EP Application No. 21752901.5.
EP Extended European search report dated Jan. 3, 2023 in Application No. EP22198532.8.
EP Extended European Search report dated Jun. 10, 2024 in EP Application No. 24161362.9.
EP Extended European Search report dated Mar. 6, 2024 in EP Application No. 23214710.8.
EP Extended European Search report dated May 26, 2023, in Application No. EP23153638.4.
EP Extended European Search Report dated May 28, 2024 in EP Application No. 21775725.1.
EP Extended European Search report dated Oct. 24, 2023, in Application No. EP23161161.7.
EP Extended European Search Report mailed on Sep. 14, 2021, in the application EP21182449.7.
EP Extended Search Report dated Dec. 17, 2019 in EP Application No. 19202054.
EP Extended Search Report dated Dec. 4, 2019 in EP Application No. 17793364.5.
EP Extended Search Report dated Feb. 15, 2018 in EP Application No. 15814233.1.
EP Extended Search Report dated Feb. 25, 2020 in EP Application No. 17844188.7.
EP Extended Search Report dated Jun. 19, 2017 in EP Application No. 15758538.1.
EP Extended Search Report dated Jun. 5, 2018 in EP Application No. 15868003.3.
EP Extended Search Report dated Mar. 31, 2020 in EP Application No. 17857230.1.
EP Extended Search Report dated Nov. 11, 2020 in EP Application No. 18791117.7.
EP Extended Search Report dated Nov. 28, 2019 in EP Application No. 19188907.0.
EP Extended Search Report dated Nov. 8, 2018 in EP Application No. 15863112.7.
EP Extended Search Report dated Oct. 1, 2020 in EP Application No. 17858928.9.
EP Extended Search Report dated Sep. 6, 2018 in EP Application No. 15863433.7.
EP Office Action dated Jan. 17, 2022, in Application No. 17858928.9.

(56) References Cited

OTHER PUBLICATIONS

EP Office Action dated Jun. 30, 2022 in Application No. EP20190727174.
EP office action dated Apr. 24, 2023, in application No. EP21182448.7.
EP Office Action dated Aug. 21, 2018 in EP Application No. 15758538.1.
EP office action dated Aug. 25, 2021, in EP Application No. EP19202054.3.
EP Office Action dated Dec. 16, 2021, in Application No. EP17793364.5.
EP Office Action dated Feb. 15, 2022, in Application No. EP19188907.0.
EP Office Action dated Feb. 21, 2024 in EP Application No. 20729442.2.
EP Office Action dated Jan. 29, 2021 in EP Application No. 15868003.3.
EP Office Action dated Jul. 2, 2024 in EP Application No. 19188907.0.
EP office action dated Jul. 3, 2023, in application No. EP17858928.9.
EP Office Action dated Jun. 3, 2022, in Application No. EP19713970.2.
EP Office Action dated Jun. 19, 2023 in Application No. EP19727174.5.
EP office action dated Jun. 21, 2023, in application No. EP20200757159.
EP office action dated Jun. 29, 2023, in application No. EP19787808.5.
EP office action dated Mar. 10, 2023, in application No. EP20712740.8.
EP Office Action dated May 14, 2020 in EP Application No. 15868003.3.
EP Office Action dated Nov. 19, 2020 in EP Application No. 15758538.1.
EP Office Action dated Oct. 1, 2021, in application No. EP17857230.1.
EP Partial Supplementary European Search report dated Mar. 6, 2024, in EP Application No. 21775725.1.
EP Partial Supplementary Search Report dated May 23, 2018 in EP Application No. 15863433.7.
EP Search Report dated Dec. 10, 2021, in Application No. EP19787808.5.
European Extended Search Report dated Nov. 11, 2020 in EP Application No. 18791268.8.
European Office Action dated Apr. 25, 2023 in Application No. EP19188907.
European Office Action dated Feb. 25, 2021 in EP Application No. 15863112.7.
European Office Action dated Jul. 8, 2020 in EP Application No. 15863433.7.
European Office Action dated May 7, 2021 in EP Application No. 15863433.7.
European Office Action dated Oct. 17, 2019 in EP Application No. 15863433.7.
Hadziosmanovic, D., et al., "Through the Eye of the Plc: Semantic Security Monitoring for Industrial Processes," Proceedings of the 30th Annual Computer Security Applications Conference, 2014, pp. 126-135.
Hameed, Z et al., "Condition Monitoring and Fault Detection of Wind Turbines and Related Algorithms: a Review.", Renewable and Sustainable energy reviews, 2009, vol. 13, pp. 1-39.
IN Office Action dated Aug. 5, 2022 In Application No. IN201937050525.
IN Office Action dated Jan. 13, 2022, in Application No. 201937044701.
IN Office Action dated Aug. 2, 2021 in IN Application No. 201637028587.
IN Office Action dated Dec. 5, 2022 in Application No. IN202238032780.
IN Office Action dated Dec. 24, 2021, in Application No. IN202138004005.
IN Office Action dated Jan. 24, 2022 in Application No. IN201937044699.
IN Office Action dated May 10, 2022, in Application No. IN202037043494.
IN Office Action dated May 29, 2023, in Application No. IN202118042940.
IN Office Action dated Nov. 24, 2020 in IN Application No. 201737020192.
Indian Office Action dated Feb. 24, 2021 in IN Application No. 201737021981.
Indian Office Action dated Mar. 24, 2021 in IN Application No. 201817042545.
Indian Office Action dated Sep. 25, 2020 in IN Application No. 201737018864.
International Preliminary Report on Patentability dated Mar. 3, 2022, in Application No. PCT/US2020/070427.
International Preliminary Report on Patentability dated Oct. 6, 2022 in PCT Application PCT/US2021/023433.
International Preliminary Report on Patentability dated Oct. 6, 2022 in PCT Application PCT/US2021/023834.
International Search Report and Written Opinion dated Sep. 26, 2022 in Application No. PCT/US2022/032993.
International Preliminary Report on Patentability and Written Opinion dated Dec. 21, 2023 in PCT Application No. PCT/US2022/032993.
International Preliminary Report on Patentability and Written Opinion dated Feb. 8, 2024 in PCT Application No. PCT/US2022/074162.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Apr. 11, 2019 in PCT/US2017/052798.
International Preliminary Report on Patentability dated Apr. 18, 2019 in PCT Application No. PCT/US17/54120.
International Preliminary Report on Patentability dated Dec. 9, 2021, in PCT Application No. PCT/US2020/035485.
International Preliminary Report on Patentability dated Feb. 10, 2022 issued in Application No. PCT/US2020/044337.
International Preliminary Report on Patentability dated Jan. 12, 2017 in PCT Application No. PCT/US15/38667.
International Preliminary Report on Patentability dated Jun. 22, 2017 in PCT Application No. PCT/US15/64555.
International Preliminary Report on Patentability dated Jun. 8, 2017 in PCT Application No. PCT/US2015/062387.
International Preliminary Report on Patentability dated Jun. 8, 2017 in PCT/US2015/062480.
International Preliminary Report on Patentability dated Mar. 7, 2019 in PCT/US2017/047664.
International Preliminary Report on Patentability dated May 19, 2023 in PCT Application No. PCT/US2021/057678.
International Preliminary Report on Patentability dated Nov. 12, 2020 in PCT Application No. PCT/US2019/030467.
International Preliminary Report on Patentability dated Nov. 15, 2018 in PCT Application No. PCT/US2017/031106.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 19, 2023, in PCT Application No. PCT/US2022/023605.
International Preliminary Report on Patentability dated Oct. 26, 2023, in Application No. PCT/US2022/024812.
International Preliminary Report on Patentability dated Oct. 27, 2022, in PCT Application No. PCT/US2021/027418.
International Preliminary Report on Patentability dated Oct. 29, 2020 in PCT/US2019/019455.
International Preliminary Report on Patentability dated Sep. 15, 2016 in Application No. PCT/US2015/019031.

(56) References Cited

OTHER PUBLICATIONS

International Preliminary Report on Patentability dated Sep. 24, 2020 in PCT/US2019/022129.
International Preliminary Reporton Patentability dated Nov. 18, 2021, issued in PCT/US2020/032269.
International Preliminary Reporton Patentability dated Sep. 28, 2023, in PCT Application No. PCT/US2022/020730.
International Search Report and Written Opinion dated Apr. 28, 2020 in PCT Application No. PCT/US2020/018677.
International Search Report and Written Opinion dated Apr. 19, 2022 in PCT Application No. PCT/U S2021 /0576 78.
International Search Report and Written Opinion dated Aug. 8, 2022, in Application No. PCT/US2022/023605.
International Search Report and Written Opinion dated Aug. 17, 2021 in PCT Application No. PCT/US2021/023433.
International Search Report and Written Opinion dated Aug. 5, 2021 in PCT Application No. PCT/US2021/027418.
International Search Report and Written Opinion dated Feb. 15, 2016 in PCT/US2015/062480.
International Search Report and Written Opinion dated Jul. 6, 2022, in PCT Application No. PCT/US2022/020730.
International Search Report and Written Opinion dated Jul. 11, 2019 in PCT Application No. PCT/US2019/030467.
International Search Report and Written Opinion dated Jul. 26, 2022 in Application No. PCT/US2022/024999.
International Search Report and Written Opinion dated Mar. 29, 2016 in PCT Application No. PCT/US15/64555.
International Search Report and Written Opinion dated May 29, 2015 in Application No. PCT/US2015/019031.
International Search Report and Written Opinion dated Nov. 16, 2018 in PCT Application No. PCT/US2018/029460.
International Search Report and Written Opinion dated Nov. 16, 2022 in PCT Application No. PCT/US2022/074162.
International Search Report and Written Opinion dated Oct. 15, 2018 in PCT Application No. PCT/US2018/029406.
International Search Report and Written Opinion dated Oct. 16, 2015 in PCT Application No. PCT/US15/38667.
International Search Report and Written Opinion dated Sep. 1, 2022, in Application No. PCT/US2022/024812.
International Search Report and Written Opinion dated Sep. 1, 2022 in Application No. PCT/US2022/028850.
International Search Report and Written Opinion (ISA/EP) dated Dec. 7, 2020 in PCT Application No. PCT/US2020/032269.
International Search Report and Written Opinion (ISA/EP) dated May 9, 2019 in PCT/US2019/022129.
International Search Report and Written Opinion (ISA/EP) dated Sep. 30, 2020 in PCT Application No. PCT/US2020/035485.
International Search Report and Written Opinion (ISA/KR) dated Aug. 22, 2017 in PCT Application No. PCT/US2017/031106.
International Search Report and Written Opinion (ISA/KR) dated Dec. 13, 2017 in PCT/US2017/047664.
International Search Report and Written Opinion (ISA/KR) dated Feb. 6, 2018 in PCT/US2017/052798.
International Search Report and Written Opinion (ISA/KR) dated Jan. 9, 2018 in PCT Application No. PCT/US17/54120.
International Search Report and Written Opinion (ISA/KR) dated Jun. 14, 2019 in PCT/US2019/019455.
International Search Report and Written Opinion (ISA/KR) dated Mar. 8, 2016 in PCT Application No. PCT/US2015/062387.
JP Examination Report dated Nov. 26, 2020 in JP Application No. 2017-549175.
JP Office Action dated Dec. 7, 2021, in Application No. JP20170549175 with English translation.
JP Office Action dated Feb. 13, 2024 in JP Application No. 2020-560912, with EnglishTranslation.
JP Office Action dated Jul. 5, 2022, in Application No. JP2021-119155 with English translation.
JP Office Action dated Jul. 20, 2021 in JP Application No. 2017-549175.
JP Office Action dated Jun. 6, 2023, in application No. JP2022-149815 with English translation.
JP Office Action dated Jun. 11, 2024 in JP Application No. 2021-564914, with English Translation.
JP Office Action dated Jun. 16, 2020 in JP Application No. 2017-549175.
JP Office Action dated Jun. 6, 2023, in Application No. JP2020-560912 with English translation.
JP Office Action dated Mar. 1, 2022, in Application No. JP2020-175033 with translation.
JP Office Action dated Mar. 2, 2021 in JP Application No. 2018-557808.
JP Office Action dated Nov. 8, 2022 for JP Application No. 2021-119155 with English translation.
JP Office Action dated Nov. 19, 2019 in JP Application No. 2017-549175.
JP office action dated Sep. 7, 2021, in JP Application No. 2020-175033 with English translation.
Kipp & Zonen, "Solar Radiation" (known as of Sep. 3, 2014) [http://www.kippzonen.com/Knowledge-Center/Theoretical-info/Solar-Radiation].
KR Office Action dated Apr. 13, 2022, in KR Application No. KR1020217028044 with English translation.
KR Office Action dated Apr. 16, 2021 in KR Application No. 10-2018-7035235.
KR Office Action dated Apr. 25, 2023, in Application No. KR10-2017-7017128 with English translation.
KR Office Action dated Aug. 2, 2023, in Application No. KR10-2022-7042723 with English translation.
KR Office Action dated Aug. 28, 2024 in KR Application No. 10-2021-7040307, with English Translation.
KR Office Action dated Dec. 7, 2022, in Application No. KR10-2022-7005495 WithEnglish translation.
KR Office Action dated Dec. 7, 2022 in Application No. KR10-2022-7036992 with English translation.
KR Office Action dated Dec. 22, 2021, in Application No. KR1020177018491 with English translation.
KR Office Action dated Feb. 22, 2022, in Application No. KR1020177017285 with English translation.
KR Office Action dated Jan. 22, 2021 in KR Application No. 10-2016-7025862.
KR Office Action dated Jul. 10, 2023, in application No. KR 10-2023-7021596 with English Translation.
KR Office Action dated Jul. 26, 2023, in Application No. KR10-2022-7037562 with English translation.
KR Office Action dated Jul. 31, 2021 in KR Application No. 10-2016-7025862.
KR Office Action dated May 12, 2023, in Application No. KR10-2022-7027386 with English translation.
KR Office Action dated May 25, 2022, in Application No. KR1020227005495 With English Translation.
KR Office Action dated Nov. 3, 2022, in Application No. KR10-2022-7027386 withEnglish Translation.
KR Office Action dated Oct. 26, 2021, in KR Application No. KR1020217028044 with English translation.
KR Office Action dated Sep. 25, 2023, in Application No. KR10-2022-7027386 with English Translation.
Laskar, S.H., et al., "Power Quality Monitoring by Virtual Instrumentation using LabVIEW", 2011 46th International Universities' Power Engineering Conference (UPEC), 2011, pp. 1-6.
Lee E., et al., "The Design and Evaluation of Integrated Envelope and Lighting Control Strategies for Commercial Buildings," Energy & Environment division, 1994, pp. 1-23.
Mumaw, R.J et al., "There is More to Monitoring a Nuclear Power Plant Than Meets the Eye", Human factors, 2000, vol. 42, No. 1, pp. 36-55.
National Aeronautics & Space Administration, "Cloud Remote Sensing and Modeling," (known as of Sep. 3, 2014), published date of Sep. 15, 2014, [ http://atmospheres.gsfc.nasa.gov/climate/index.php?section=134 ].
"Ossia Wireless Charging", screenshot and picture of Cota device, accessed Apr. 20, 2015, 1 page.

(56) References Cited

OTHER PUBLICATIONS

Pasternack Enterprises, Inc. Technical Data Sheet for MCX Jack Connector Solder Attachment Surface Mount PCB (PE4889), 2013, 2 pp.
PCT Application No. PCT/US2021/023433 filed Mar. 22, 2021.
Preliminary Amendment dated Jan. 18, 2017 in U.S. Appl. No. 15/123,069.
Rajiv, "How does Cloud Radio Access Network (C-RAN) works," RF Page, Apr. 16, 2018, 5 pp. https://www.rfpage.com/how-cloud-radio-access-network-works/ Accessed May 19, 2021.
"Remote Radio Head for CPRI and 4G, 5G & LTE Networks," CableFree by Wireless Excellence Limited, 2020, 8 pp., https://www.cablefree.net/wirelesstechnology/4glte/remote-radio-head/ Accessed May 19, 2021.
Restriction requirement dated Oct. 18, 2021, for U.S. Appl. No. 16/849,540.
Rolith Inc., "NanoWeb: sub-micron transparent metal mesh conductors," [ http://www.rolith.com/applications/transparent-conductive-electrodes] retrieved Jan. 29, 2016, 3 pp.
RU Office Action dated Sep. 24, 2018 in RU Application No. 2016139012.
Russian Office Action dated Jul. 10, 2019 in RU Application No. 2017123902.
Saad, A. "Printed millimeter-wave MIMO-based slot antenna arrays for 5G networks," AEU—International Journal of Electronics and Communications, vol. 99, Feb. 2019, pp. 59-69.
Saberin, J. R., "Optically Transparent Antennas for Small Satellites," University of Utah, Dept. of Electrical and Computer Engineering, Masters Thesis, Aug. 2010, 55 pp.
Sim, S., et al., "Next Generation Data Interchange: Tool-to-tool Application Programming Interfaces," IEEE Working Conference on Reverse Engineering, Nov. 25, 2000, pp. 278-280.
SunPartner Technologies web page, "Li-Fi", [ http://sunpartnertechnologies.com/li-fi/]; 3 pages; retrieved Jan. 24, 2018.
SunPartner Technologies web page, "Smart Building-Cameleon", [ http://sunpartnertechnologies.com/vitrage-intelligent/]; 3 pages; retrieved Jan. 24, 2018.
SunPartner Technologies web page, "Smart Building-Design Glass", [ http://sunpartnertechnologies.com/vitrage-intelligent/]; 3 pages; retrieved Jan. 24, 2018.
SunPartner Technologies web page, "Smart Building-Vision Glass", [ http://sunpartnertechnologies.com/vitrage-intelligent/]; 3 pages; retrieved Jan. 24, 2018.
SunPartner Technologies White Paper, "Wysips Connect, the first solution for the indoor/outdoor VLC lighting saturation problematics," Feb. 26, 2015, 6 pages, [ http://sunpartnertechnologies.com/wp-content/uploads/2012/08/White_Paper_LiFi_26_02_2015.pdf].
Taiwan Office Action dated Dec. 31, 2020 issued in TW Application No. 106133563.
Taiwan Office Action dated Jan. 25, 2021 issued in TW Application No. 106128249.
Taiwanese First Office Action dated May 21, 2021 in TW 109134283.
Taiwanese Office Action dated Dec. 12, 2018 in TW Application No. 107129150.
Taiwanese Office Action dated Feb. 27, 2020 in TW Application No. 108126548.
Taiwanese Office Action dated Mar. 16, 2020 in TW Application No. 104139297.
Taiwanese Office Action dated May 13, 2019 in TW Application No. 104139217.
Taiwanese Office Action dated Oct. 1, 2019 in TW Application No. 104139297.
"That's right, 5G could depend on Corning glass in your antenna," by Robert Triggs, Android Authority, Mar. 2, 2018, 5 pp.. [https://www.androidauthority.com/corning-glass-5g-antenna-842341/] downloaded Nov. 13, 2018.
Tuokko, R., et al., "Micro and Desktop Factory Road Map", Tampere University of Technology, 2012, pp. 1-114.
TW Notice of Allowance & Search Report (translated) dated Jul. 30, 2021 in TW Application No. 106133985.
TW Office Action dated Jun. 6, 2022 in Application No. TW108115291 With English Translation.
TW Office Action dated Apr. 26, 2022 in Application No. TW110144841 with English translation.
TW Office Action dated Apr. 27, 2023, in application No. TW20220142122 with Englishtranslation.
TW Office Action dated Apr. 29, 2022, in Application No. TW110140314 with English translation.
TW Office Action dated Jan. 12, 2023 in Application No. TW108115291 with English translation.
TW Office Action dated Jan. 28, 2022, in Application No. TW110109128 with English translation.
TW Office Action dated Jul. 11, 2022 In Application No. TW110146990 with English translation.
TW Office Action dated Jun. 17, 2023, in application No. TW107114217 with English translation.
TW Office Action dated Mar. 13, 2022, in Application No. TW106114947 with English translation.
TW Office Action dated Mar. 15, 2022, in Application No. TW109112242 with Englishtranslation.
TW Office Action dated May 4, 2023 in Application No. TW20180114105 with English translation.
TW Office Action dated May 31, 2021 in TW Application No. TW 106114947.
TW Office Action dated May 31, 2023 in Application No. TW111144104 with English translation.
TW Office Action dated Nov. 23, 2022 in Application No. TW107114217 with English translation.
TW Office Action dated Nov. 29, 2021, in Application No. TW109134283 with English translation.
TW Office Action dated Sep. 13, 2022 In Application No. TW20180114105 with English translation.
U.S. Non-Final office Action dated Sep. 21, 2022 in U.S. Appl. No. 17/301,026.
U.S. Notice of Allowance dated May 12, 2022, in U.S. Appl. No. 17/171,667.
U.S. Advisory Action dated Aug. 22, 2024 in U.S. Appl. No. 17/194,795.
U.S Advisory Action dated Aug. 23, 2023 in U.S. Appl. No. 17/194,795.
U.S Advisory Action dated Jan. 14, 2022 in U.S. Appl. No. 16/608,159.
U.S. Advisory Action dated Mar. 13, 2024 in U.S. Appl. No. 17/385,810.
U.S. Appl. No. 63/115,886, Inventors Gupta et al., filed Nov. 19, 2020.
U.S. Appl. No. 63/159,814, Inventors Gupta et al., filed Mar. 11, 2021.
U.S. Appl. No. 63/209,362, Inventors Gomez-Martinez et al., filed Jun. 10, 2021.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
U.S. Corrected Notice of Allowability dated Jan. 10, 2022, in U.S. Appl. No. 16/334,716.
US Corrected Notice of Allowability dated Jun. 4, 2020 in U.S. Appl. No. 16/298,776.
US Corrected Notice of Allowability dated May 3, 2021 in U.S. Appl. No. 16/253,971.
US Corrected Notice of Allowability dated Sep. 23, 2021, in U.S. Appl. No. 16/338,403.
U.S. Corrected Notice of Allowability for U.S. Appl. No. 16/327,789 dated Mar. 1, 2021.
U.S Corrected Notice of Allowance dated Apr. 26, 2022 in U.S. Appl. No. 16/334,716.
U.S. Corrected Notice of Allowance dated Apr. 28, 2022, in U.S. Appl. No. 15/733,765.
U.S. Corrected Notice of Allowance dated Aug. 5, 2024 in U.S. Appl. No. 18/310,443.
U.S. Corrected Notice of Allowance dated Dec. 4, 2023 in U.S. Appl. No. 17/453,469.

(56) References Cited

OTHER PUBLICATIONS

U.S. Corrected Notice of Allowance dated Feb. 15, 2023 in U.S. Appl. No. 16/949,978.
U.S. Corrected Notice of Allowance dated Jul. 17, 2023, in U.S. Appl. No. 16/980,305.
U.S. Corrected Notice of Allowance dated Jul. 17, 2023, in U.S. Appl. No. 17/301,026.
U.S. Corrected Notice of Allowance dated Jun. 3, 2022 In U.S. Appl. No. 16/849,540.
U.S. Corrected Notice of Allowance dated Jun. 12, 2023, in U.S. Appl. No. 17/453,469.
U.S. Corrected Notice of Allowance dated May 26, 2023 in U.S. Appl. No. 17/355,086.
U.S. Corrected Notice of Allowance dated Oct. 31, 2023, in U.S. Appl. No. 17/453,469.
U.S. Corrected Notice of Allowance dated Sep. 6, 2022 in U.S. Appl. No. 16/849,540.
US Final Office Action dated Aug. 19, 2021 in U.S. Appl. No. 16/608,159.
US Final Office Action dated Dec. 23, 2020 in U.S. Appl. No. 16/338,403.
U.S. Final Office Action dated Dec. 28, 2023 in U.S. Appl. No. 17/385,810.
US Final Office Action dated Feb. 26, 2015 in U.S. Appl. No. 13/479,137.
US Final Office Action dated Feb. 6, 2020 in U.S. Appl. No. 16/451,784.
US Final Office Action dated Jan. 27, 2014 in U.S. Appl. No. 13/479,137.
US Final Office Action dated Jan. 31, 2019 in U.S. Appl. No. 15/534,175.
US Final Office Action dated Jul. 2, 2019 in U.S. Appl. No. 15/691,468.
US Final Office Action dated Jul. 3, 2019 in U.S. Appl. No. 15/623,237.
US Final Office Action dated Mar. 15, 2018 in U.S. Appl. No. 14/951,410.
US Final Office Action dated Mar. 17, 2017 in U.S. Appl. No. 14/887,178.
US Final Office Action dated Mar. 18, 2020 in U.S. Appl. No. 16/253,971.
US Final Office Action dated Mar. 3, 2020 in U.S. Appl. No. 16/508,099.
U.S. Final Office Action dated May 8, 2024 in U.S. Appl. No. 17/194,795.
US Final Office Action dated May 11, 2021 in U.S. Appl. No. 16/334,716.
U.S. Final office Action dated May 19, 2023 in U.S. Appl. No. 17/194,795.
U.S. Final Office Action dated Nov. 15, 2023 in U.S. Appl. No. 17/609,671.
US Final Office Action dated Sep. 19, 2016 in U.S. Appl. No. 14/887,178.
U.S. Non Final Office Action dated Jan. 31, 2022 in U.S. Appl. No. 16/849,540.
U.S. Non Final Office Action dated Mar. 21, 2024, in U.S. Appl. No. 17/634,150.
U.S. Non-Final office Action dated Jan. 23, 2023 in U.S. Appl. No. 17/869,725.
U.S. Non-Final office Action dated Nov. 14, 2022 in U.S. Appl. No. 17/804,802.
U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Apr. 18, 2023 in U.S. Appl. No. 17/609,671.
U.S. Non-Final Office Action dated Apr. 24, 2024 in U.S. Appl. No. 18/237,146.
U.S. Non-Final Office Action dated Aug. 12, 2022, in U.S. Appl. No. 16/655,032.
U.S. Non-Final Office Action dated Aug. 24, 2023 in U.S. Appl. No. 17/656,612.
U.S. Non-Final Office Action dated Aug. 28, 2024 in U.S. Appl. No. 18/428,413.
U.S. Non-Final Office Action dated Aug. 31, 2023, in U.S. Appl. No. 17/194,795.
U.S. Non-Final Office Action dated Dec. 2, 2022 in U.S. Appl. No. 16/980,305.
U.S. Non-Final Office Action dated Dec. 6, 2022 in U.S. Appl. No. 17/453,469.
U.S. Non-Final office Action dated Dec. 21, 2022 in U.S. Appl. No. 17/194,795.
U.S. Non-Final Office Action dated Dec. 28, 2023 in U.S. Appl. No. 18/310,443.
U.S. Non-Final Office Action dated Feb. 15, 2023 in U.S. Appl. No. 17/083,128.
U.S. Non-Final Office Action dated Feb. 23, 2024 in U.S. Appl. No. 17/313,760.
U.S. Non-Final Office Action dated Jan. 24, 2024 in U.S. Appl. No. 17/609,671.
U.S. Non-Final Office Action dated Jul. 3, 2023, in U.S. Appl. No. 17/385,810.
U.S. Non-Final Office Action dated Jul. 16, 2024 in U.S. Appl. No. 18/513,707.
U.S. Non-Final Office Action dated Jul. 20, 2023, in U.S. Appl. No. 17/804,802.
U.S. Non-final Office Action dated Jul. 28, 2022 in U.S. Appl. No. 16/655,032.
U.S. Non-Final Office Action dated Jun. 4, 2024 in U.S. Appl. No. 18/138,846.
U.S. Non-Final Office Action dated Jun. 12, 2024 in U.S. Appl. No. 17/300,303.
U.S. Non-Final Office Action dated Mar. 1, 2023 in U.S. Appl. No. 17/380,785.
U.S. Non-Final office Action dated Mar. 9, 2023 in U.S. Appl. No. 17/909,925.
U.S. Non-Final Office Action dated Mar. 14, 2024 in U.S. Appl. No. 17/597,701.
U.S. Non-Final Office Action dated May 7, 2024 in U.S. Appl. No. 17/385,810.
U.S. Non-Final Office Action dated May 9, 2023 in U.S. Appl. No. 17/307,848.
U.S. Non-Final Office Action dated May 31, 2024 in U.S. Appl. No. 17/612,479.
U.S. Non-Final Office Action dated Nov. 16, 2023 in U.S. Appl. No. 17/194,795.
U.S. Non-Final Office Action dated Nov. 18, 2022, in U.S. Appl. No. 17/307,848.
U.S. Non-Final Office Action dated Oct. 24, 2022, in U.S. Appl. No. 17/486,716.
U.S. Non-Final Office Action dated Oct. 28, 2021 in U.S. Appl. No. 15/733,765.
U.S. Non-Final Office Action dated Oct. 29, 2021 in U.S. Appl. No. 16/527,554.
U.S. Non-Final office Action dated Sep. 8, 2022 in U.S. Appl. No. 17/406,301.
U.S. Non-Final Office Action dated Sep. 24, 2024 in U.S. Appl. No. 17/679,027.
U.S. Non-Final Office Action dated Sep. 26, 2024 in U.S. Appl. No. 18/555,129.
U.S. Non-Final office Action dated Sep. 29, 2022 in U.S. Appl. No. 16/949,978.
U.S. Non-Final Office Action dated Sep. 29, 2023, in U.S. Appl. No. 17/989,603.
US Notice of Allowability (supplemental) dated Sep. 30, 2020 in U.S. Appl. No. 15/123,069.
US Notice of Allowance (corrected) dated Apr. 18, 2019 in U.S. Appl. No. 15/320,725.
US Notice of Allowance dated Apr. 17, 2019 in U.S. Appl. No. 15/534,175.

(56) References Cited

OTHER PUBLICATIONS

US Notice of Allowance dated Apr. 17, 2019 in U.S. Appl. No. 15/910,936.
US Notice of Allowance dated Apr. 19, 2021 in U.S. Appl. No. 16/099,424.
US Notice of Allowance dated Apr. 6, 2020 in U.S. Appl. No. 16/298,776.
U.S. Notice of Allowance dated Apr. 6, 2022, in U.S. Appl. No. 15/733,765.
US Notice of Allowance dated Apr. 9, 2020 in U.S. Appl. No. 15/123,069.
U.S. Notice of Allowance dated Aug. 3, 2023, in U.S. Appl. No. 17/869,725.
U.S. Notice of Allowance dated Aug. 10, 2023 in U.S. Appl. No. 17/301,026.
U.S. Notice of Allowance dated Aug. 23, 2023 in U.S. Appl. No. 17/909,925.
U.S. Notice of Allowance dated Aug. 29, 2023 in U.S. Appl. No. 17/486,716.
U.S. Notice of Allowance dated Aug. 31, 2023, in U.S. Appl. No. 17/380,785.
U.S. Notice of Allowance dated Dec. 12, 2023 in U.S. Appl. No. 17/486,716.
US Notice of Allowance dated Dec. 13, 2018 in U.S. Appl. No. 15/978,029.
U.S. Notice of Allowance dated Dec. 13, 2023 in U.S. Appl. No. 17/453,469.
US Notice of Allowance dated Dec. 14, 2018 in U.S. Appl. No. 15/910,936.
U.S. Notice of Allowance dated Dec. 21, 2023 in U.S. Appl. No. 17/909,925.
U.S Notice of Allowance dated Dec. 22, 2021 in U.S. Appl. No. 16/334,716.
U.S. Notice of Allowance dated Dec. 29, 2022 in U.S. Appl. No. 16/655,032.
US Notice of Allowance dated Dec. 31, 2020 in U.S. Appl. No. 16/523,624.
US Notice of Allowance dated Dec. 31, 2020 in U.S. Appl. No. 16/555,377.
US Notice of Allowance dated Dec. 7, 2020 in U.S. Appl. No. 16/508,099.
U.S. Notice of Allowance dated Feb. 1, 2023 in U.S. Appl. No. 16/949,978.
U.S. Notice of Allowance dated Feb. 7, 2023 in U.S. Appl. No. 17/249,442.
U.S. Notice of Allowance dated Feb. 14, 2022 in U.S. Appl. No. 16/608,159.
U.S. Notice of Allowance dated Feb. 14, 2023 in U.S. Appl. No. 17/355,086.
U.S. Notice of Allowance dated Feb. 14, 2024 in U.S. Appl. No. 17/989,603.
U.S. Notice of Allowance dated Feb. 16, 2022 in U.S. Appl. No. 16/664,089.
U.S. Notice of Allowance dated Feb. 28, 2024 in U.S. Appl. No. 17/989,603.
US Notice of Allowance dated Feb. 4, 2021 in U.S. Appl. No. 16/253,971.
U.S. Notice of Allowance dated Jan. 8, 2024 in U.S. Appl. No. 17/989,603.
U.S. Notice of Allowance dated Jan. 17, 2023 in U.S. Appl. No. 17/406,301.
U.S. Notice of Allowance dated Jan. 25, 2023 in U.S. Appl. No. 17/406,301.
U.S. Notice of Allowance dated Jul. 6, 2023 in U.S. Appl. No. 17/870,480.
US Notice of Allowance dated Jul. 1, 2020 in U.S. Appl. No. 15/623,237.
U.S. Notice of Allowance dated Jul. 13, 2023 in U.S. Appl. No. 17/940,951.
US Notice of Allowance dated Jul. 17, 2019 in U.S. Appl. No. 15/123,069.
US Notice of Allowance dated Jul. 17, 2019 in U.S. Appl. No. 15/320,725.
US Notice of Allowance dated Jul. 25, 2019 in U.S. Appl. No. 15/534,175.
U.S. Notice of Allowance dated Jun. 7, 2023 in U.S. Appl. No. 17/453,469.
U.S. Notice of Allowance dated Jun. 7, 2023 in U.S. Appl. No. 17/870,480.
U.S Notice of Allowance dated Jun. 8, 2022 in U.S. Appl. No. 15/733,765.
U.S. Notice of Allowance dated Jun. 12, 2023, in U.S. Appl. No. 17/940,951.
U.S. Notice of Allowance dated Jun. 13, 2022, in U.S. Appl. No. 17/081,809.
US Notice of Allowance dated Jun. 14, 2021 in U.S. Appl. No. 16/338,403.
U.S. Notice of Allowance dated Jun. 16, 2023, in U.S. Appl. No. 17/301,026.
U.S. Notice of Allowance dated Jun. 20, 2022 in U.S. Appl. No. 16/527,554.
US Notice of Allowance dated Mar. 10, 2021 in U.S. Appl. No. 15/691,468.
US Notice of Allowance dated Mar. 20, 2019 in U.S. Appl. No. 15/320,725.
US Notice of Allowance dated Mar. 26, 2021 in U.S. Appl. No. 16/254,434.
U.S. Notice of Allowance dated Mar. 31, 2023 in U.S. Appl. No. 17/249,442.
US Notice of Allowance dated Mar. 9, 2018 in U.S. Appl. No. 14/887,178.
U.S. Notice of Allowance dated May 1, 2024 in U.S. Appl. No. 18/310,443.
U.S. Notice of Allowance dated May 10, 2024 in U.S. Appl. No. 17/609,671.
U.S. Notice of Allowance dated May 11, 2023 in U.S. Appl. No. 16/949,978.
US Notice of Allowance dated May 14, 2015 in U.S. Appl. No. 13/479,137.
US Notice of Allowance dated May 14, 2019 in U.S. Appl. No. 15/623,235.
U.S. Notice of Allowance dated May 18, 2022, in U.S. Appl. No. 17/081,809.
U.S. Notice of Allowance dated May 19, 2023 in U.S. Appl. No. 17/249,442.
U.S. Notice of Allowance dated May 22, 2023 in U.S. Appl. No. 17/486,716.
U.S. Notice of Allowance dated May 23, 2023 in U.S. Appl. No. 17/869,725.
U.S. Notice of Allowance dated May 23, 2024 in U.S. Appl. No. 17/609,671.
U.S. Notice of Allowance dated May 24, 2023 in U.S. Appl. No. 16/980,305.
US Notice of Allowance dated May 25, 2021 in U.S. Appl. No. 15/709,339.
US Notice of Allowance dated May 26, 2020 in U.S. Appl. No. 16/451,784.
U.S. Notice of Allowance dated May 26, 2022, in U.S. Appl. No. 16/849,540.
U.S. Notice of Allowance dated May 26, 2023, in U.S. Appl. No. 17/453,469.
US Notice of Allowance dated May 6, 2020 in U.S. Appl. No. 15/623,237.
US Notice of Allowance dated Nov. 28, 2018 in U.S. Appl. No. 15/123,069.
US Notice of Allowance dated Nov. 3, 2020 in U.S. Appl. No. 15/691,468.
US Notice of Allowance dated Oct. 7, 2021 in U.S. Appl. No. 16/664,089.
US Notice of Allowance dated Oct. 14, 2021 in U.S. Appl. No. 16/664,089.

(56) References Cited

OTHER PUBLICATIONS

US Notice of Allowance dated Oct. 22, 2018 in U.S. Appl. No. 14/951,410.
US Notice of Allowance dated Sep. 10, 2021, in the U.S. Appl. No. 15/709,339.
U.S. Notice of Allowance dated Sep. 11, 2024 in U.S. Appl. No. 17/194,795.
U.S. Notice of Allowance dated Sep. 12, 2024 in U.S. Appl. No. 18/213,843.
U.S. Notice of Allowance dated Sep. 18, 2023, in U.S. Appl. No. 17/380,785.
U.S. Notice of Allowance dated Sep. 20, 2023, in U.S. Appl. No. 17/453,469.
U.S. Notice of Allowance dated Sep. 30, 2024 in U.S. Appl. No. 17/597,701.
U.S. Notice of Allowance for U.S. Appl. No. 16/327,789 dated Feb. 4, 2021.
US Notice of Allowance (supplemental) dated Jun. 12, 2015 in U.S. Appl. No. 13/479,137.
US Office Action dated Apr. 27, 2018 in U.S. Appl. No. 15/123,069.
US Office Action dated Aug. 21, 2019 in U.S. Appl. No. 16/508,099.
US Office Action dated Aug. 22, 2019 in U.S. Appl. No. 16/298,776.
US Office Action dated Aug. 7, 2018 in U.S. Appl. No. 15/910,936.
US Office Action dated Aug. 7, 2020 in U.S. Appl. No. 16/338,403.
US Office Action dated Feb. 4, 2019 in U.S. Appl. No. 15/623,235.
US Office Action dated Feb. 7, 2019 in U.S. Appl. No. 15/623,237.
US Office Action dated Feb. 7, 2019 in U.S. Appl. No. 15/691,468.
US Office Action dated Jan. 16, 2020 in U.S. Appl. No. 15/529,677.
US Office Action dated Jan. 19, 2021 in U.S. Appl. No. 16/608,159.
US Office Action dated Jan. 21, 2021 in U.S. Appl. No. 15/709,339.
US Office Action dated Jul. 21, 2020 in U.S. Appl. No. 16/523,624.
US Office Action dated Jul. 21, 2020 in U.S. Appl. No. 16/555,377.
US Office Action dated Jul. 23, 2020 in U.S. Appl. No. 16/508,099.
US Office Action dated Jul. 24, 2018 in U.S. Appl. No. 15/978,029.
US Office Action dated Jul. 25, 2019 in U.S. Appl. No. 16/253,971.
US Office Action dated Jul. 25, 2019 in U.S. Appl. No. 15/529,677.
US Office Action dated Jul. 29, 2020 in U.S. Appl. No. 16/253,971.
US Office Action dated Jul. 3, 2014 in U.S. Appl. No. 13/479,137.
US Office Action dated Jul. 6, 2018 in U.S. Appl. No. 15/534,175.
US Office Action dated Mar. 25, 2016 in U.S. Appl. No. 14/887,178.
US Office Action dated May 6, 2020 in U.S. Appl. No. 15/691,468.
US Office Action dated Nov. 12, 2020 in U.S. Appl. No. 16/334,716.
US Office Action dated Oct. 23, 2017 in U.S. Appl. No. 14/887,178.
US Office Action dated Sep. 11, 2017 in U.S. Appl. No. 14/951,410.
US Office Action dated Sep. 23, 2013 in U.S. Appl. No. 13/479,137.
US Office Action dated Sep. 23, 2019 in U.S. Appl. No. 16/451,784.
US Office Action dated Sep. 30, 2020 in U.S. Appl. No. 16/254,434.
US Office Action dated Sep. 4, 2018 in U.S. Appl. No. 15/320,725.
U.S. Office Action for U.S. Appl. No. 16/327,789 dated Sep. 28, 2020.
U.S. Appl. No. 16/338,403, inventors Shrivastava et al., filed Mar. 29, 2019.
U.S. Appl. No. 62/102,515, inventors Nagar et al., filed Jan. 12, 2015.
U.S. Appl. No. 62/102,516, inventors Nagar et al., filed Jan. 12, 2015.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/171,871, inventors Gomez-Martinez et al., filed Apr. 7, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Pat. Appl. No. PCT/US2021/027418, inventors Makker et al., filed on Apr. 15, 2021.
U.S. Appl. No. 63/214,741, inventors Marquez et al., filed Jun. 24, 2021.
U.S. Appl. No. 17/899,019, inventors Trikha et al., filed Aug. 30, 2022.
U.S. Appl. No. 17/910,722, inventor Trikha et al., filed Sep. 9, 2022.
U.S. Appl. No. 17/916,986, inventors Makker et al., filed Oct. 4, 2022.
U.S. Appl. No. 18/281,913 inventors Trikha N, etal, filed Sep. 13, 2023.
U.S. Appl. No. 18/764,727, inventors Shrivastava D, et al., filed Jul. 5, 2024.
U.S. Appl. No. 18/797,037, inventors Brown S.C, et al., filed Aug. 7, 2024.
U.S. Appl. No. 18/819,746, inventors Hughes H, et al., filed Aug. 29, 2024.
US Preliminary Amendment dated Dec. 31, 2019 in U.S. Appl. No. 16/608,159.
U.S. Appl. No. 63/080,899, inventor Makker et al., filed Sep. 21, 2020.
U.S. Restriction Requirement dated Jan. 24, 2024 in U.S. Appl. No. 17/612,479.
U.S. Restriction requirement dated Mar. 15, 2023 in U.S. Appl. No. 17/385,810.
U.S. Supplemental Notice of Allowance dated Aug. 1, 2022 in U.S. Appl. No. 17/171,667.
WeBoost Connect 3G Cell Phone Booster 472205 [https://store.weboost.com/products/connect-3g-directional] retrieved Apr. 1, 2016, 12 pp.
Woods, D ., "The Alarm Problem and Directed Attention in Dynamic Fault Management.", Ergonomics, 1995, vol. 38, No. 11, pp. 2371-2393.
Yasin, T. et al., "A study on the efficiency of transparent patch antennas designed from conductive oxide films," IEEE International Symposium on Antennas and Propagation (APSURSI), Spokane, WA, Jul. 3-8, 2011, pp. 3085-3087.
Yasin, T., "Transparent antennas for solar cell integration," Utah State University, Dept. of Electrical Engineering, Doctoral Thesis, 2013, 98 pp.
Zheng, Z., et al., "Subscription to Multiple Stream Originators, Draft-zhou-netconf-multi-stream-originators-10," Internet Engineering Task Force, 2019, vol. 6, pp. 1-21.

* cited by examiner

PROVIDING ENHANCED CELLULAR COMMUNICATION IN A FACILITY

RELATED APPLICATIONS

This application is a National Phase entry of International Application No. PCT/US2022/028850, filed May 11, 2022, entitled "PROVIDING ENHANCED CELLULAR COMMUNICATION IN A FACILITY", which claims the benefit of U.S. Provisional Application No. 63/187,632, filed May 12, 2021, entitled "DYNAMIC SIGNAL ROUTING IN A FACILITY," and also claims the benefit of U.S. Provisional Application No. 63/265,653, filed Dec. 17, 2021, entitled "PROVIDING ENHANCED CELLULAR COMMUNICATION IN A FACILITY." All of these applications are assigned to the assignee hereof and incorporated by reference herein in their entirety.

BACKGROUND

Wireless Local Area Networks (WLAN), such as Wi-Fi networks, are frequently used to allow people within a coverage area served by the WLAN to access the Internet and/or other data networks. WLAN access points may have limited range compared to other wireless technologies such as cellular communication, so deployment of WLAN that covers an entire facility or campus can require relatively large number of access points, along with the associated wiring/set up. Further, many devices used by people within the coverage area served by a WLAN, such as cell phones, often have built-in cellular functionality.

SUMMARY

Various aspects disclosed herein alleviate as least part of the above referenced shortcomings.

As disclosed herein, extended cellular network can extend and enhance the cellular coverage of a traditional cellular carrier across a covered facility, campus, or other coverage region. The extended cellular network can be deployed using a distributed antenna system (DAS) that is operatively coupled to one or more small cell devices, for example. In some embodiments, different subscriber profiles may be established to enable different types of access to the extended cellular network, which may grant access to the Internet, a private network (e.g. a network of the facility/campus), or the like, and may grant different levels of access to those networks. In some embodiments, these networks may also provide a subscriber access to one or more building systems of a facility.

In another aspect, a method of establishing subscriber identity in a cellular network of a facility, the method comprises: receiving a request for a subscriber profile from a mobile device of a subscriber; determining a connectivity profile based at least in part on the request received, wherein the connectivity profile comprises one or more connectivity characteristics for providing access to the cellular network that facilitates control of one or more building systems of the facility; and sending the subscriber profile to the mobile device, wherein the subscriber profile is associated with the determined connectivity profile.

In some embodiments, the subscriber profile comprises an embedded Subscriber Identification Module (eSIM) profile. In some embodiments, the method further comprises: (i) receiving an acknowledgment that the subscriber profile has been installed on the mobile device; and (ii) responsive to receiving the acknowledgement, activating the subscriber profile on the cellular network of the facility. In some embodiments, activating the subscriber profile comprises sending an International Mobile Subscriber Identifier (IMSI) activation notification to a subscription database. In some embodiments, the cellular network of the facility is associated with a plurality of facilities, and wherein activating the subscriber profile comprises granting the mobile device access to the cellular network at least a subset of the plurality of facilities. In some embodiments, receiving the request comprises receiving a Uniform Resource Locator (URL). In some embodiments, the method further comprises prior to receiving the request: (i) generating an indicator of the URL; and (ii) providing the indicator to the subscriber. In some embodiments, the indicator comprises the URL, a HyperText Markup Language (HTML) link, a Quick Response (QR) code, or a bar code. In some embodiments, providing the indicator to the subscriber comprises sending the indicator to a display, a kiosk, a web portal, a user device, or the mobile device. In some embodiments, the URL is unique to the subscriber, subscriber type, event, facility, or venue. In some embodiments, the one or more connectivity characteristics comprise a Quality of Service (QOS) level, an access level, a time during which access to the cellular network is granted or denied, and/or a bandwidth setting. In some embodiments, the access level comprises a level of access to (i) information accessible via the cellular network, (ii) a data network accessible via cellular network, and/or (iii) a device operatively coupled with the cellular network. In some embodiments, facilitating control of one or more building systems of the facility comprises facilitating security, health, and/or environmental control of the facility. In some embodiments, the cellular network is operatively coupled to the one or more building systems. In some embodiments, the one or more building systems comprises a device ensemble having a housing that encloses the one or more devices that comprise: (i) sensors, (ii) a transceiver, or (iii) a sensor and an emitter. In some embodiments, the device ensemble is disposed in a fixture of the facility, or is attached to a fixture of the facility. In some embodiments, the fixture comprises a framing portion. In some embodiments, the one or more building systems comprise a tintable window. In some embodiments, the tintable window comprises an electrochromic window. In some embodiments, the cellular network comprises a wire configured to transit power and cellular communication. In some embodiments, the cellular communication abides by at least a fourth generation, or a fifth generation cellular communication protocol. In some embodiments, the cellular network is of facilities that include the facility.

In another aspect, a system for establishing subscriber identity in a cellular network of a facility, the system comprises a cellular network configured to transmit one or more signals associated with any of the methods disclosed above.

In another aspect, a non-transitory computer readable program instructions for establishing subscriber identity in a cellular network of a facility, which non-transitory computer readable program instructions, when executed by one or more processors operatively coupled to a cellular network, cause the one or more processors to execute, or direct execution of, one or more operations associated of the methods disclosed above.

In another aspect, an apparatus for establishing subscriber identity in a cellular network of a facility, the apparatus comprising at least one controller, which at least one controller is configured to execute, or direct execution of, one or more operations associated of the methods disclosed above.

In another aspect, an apparatus for establishing subscriber identity in a cellular network of a facility, the apparatus comprises a device ensemble of the facility, the device ensemble comprises sensors disposed in a housing, the sensors configured to facilitate the methods disclosed above.

In another aspect, a system for establishing subscriber identity in a cellular network of a facility, the system comprises: a communication network configured to: transmit a request for a subscriber profile from a mobile device of the subscriber; and transmit the subscriber profile to the mobile device, wherein: (i) a connectivity profile, determined based at least in part on the request, comprises one or more connectivity characteristics for providing access to the cellular network that facilitates control of one or more building systems of the facility; and (ii) the subscriber profile is associated with the determined connectivity profile.

In some embodiments, the communication network is configured to transmit communication abiding by a vehicle bus standard protocol. In some embodiments, the communication network is configured to utilize a wireless communication protocol to receive and/or transmit signals. In some embodiments, the wireless communication protocol is associated with a wireless personal area network. In some embodiments, the communication network is configured to transmit communication abiding by a communication bus protocol. In some embodiments, the communication bus protocol facilitates upstream communication and downstream communication. In some embodiments, the communication network is configured for power transmittance. In some embodiments, the communication network is configured to transmit one or more signals configured to facilitate adjustment of an environment of the facility. In some embodiments, the communication network is configured to transmit one or more signals that comprise, or are based at least in part on, environmental sensor measurements. In some embodiments, the communication network is configured to transmit one or more signals configured to facilitate management of energy usage in the facility. In some embodiments, the communication network is configured to transmit one or more protocols comprising at least one data communication protocol for automatic control of subsystems. In some embodiments, the communication network is configured to transmit infrared (IR) signal, and/or radio frequency (RF) signal. In some embodiments, the communication network comprises the cellular network. In some embodiments, the communication network is operatively coupled to a power source and configured for power transmission. In some embodiments, the power source optionally comprises a main power source, a backup power generator, or an uninterrupted power source (UPS). In some embodiments, the communication network is configured to transmit a signal indicating energy or power consumption, wherein the power consumption optionally includes power consumption by a heating system, a cooling system, and/or lighting, and wherein the signal optionally facilitates monitoring power consumption of individual rooms or a group of rooms of the facility. In some embodiments, the communication network is configured to utilize at least one wireless protocol that (i) utilizes radio frequency signals and/or (ii) facilitates communication with one or more sensors.

In another aspect, a non-transitory computer readable program instructions for establishing subscriber identity in a cellular network of a facility, which non-transitory computer readable program instructions, when executed by one or more processors operatively coupled to a communication network, cause the one or more processors to execute operations comprises: receiving, or directing receipt of, through the communication network a request for a subscriber profile from a mobile device of the subscriber; determining, or directing determination of, a connectivity profile based at least in part on the request received, wherein the connectivity profile comprises one or more connectivity characteristics for providing access to the cellular network that facilitates control of one or more building systems of the facility; and sending, or directing sending of, the subscriber profile to the mobile device, wherein the subscriber profile is associated with the determined connectivity profile.

In some embodiments, the communication network comprises the cellular network of the facility. In some embodiments, at least a portion of the program instructions are disposed remotely from the facility. In some embodiments, at least a portion of the program instructions are disposed in the cloud. In some embodiments, the program instructions are inscribed on a non-transitory computer readable medium or on non-transitory computer readable media. In some embodiments, the one or more processors comprise a processor disposed in a device ensemble of the facility, the device ensemble having a housing that encloses the one or more devices that comprise: (i) sensors, (ii) a transceiver, or (iii) a sensor and an emitter. In some embodiments, the one or more processors include (i) a microprocessor and/or (ii) a graphical processing unit.

In another aspect, an apparatus for establishing subscriber identity in a cellular network of a facility, the apparatus comprises at least one controller, which at least one controller is configured to: (i) receive, or direct receipt of, through a communication network a request for a subscriber profile from a mobile device of the subscriber; (ii) determine, or direct determination of, a connectivity profile based at least in part on the request received, wherein the connectivity profile comprises one or more connectivity characteristics for providing access to the cellular network that facilitates control of one or more building systems of the facility; and (iii) send, or direct sending of, the subscriber profile to the mobile device, wherein the subscriber profile is associated with the determined connectivity profile.

In some embodiments, the at least one controller is part of, or is configured to operatively couple to, a control system having more than two levels of control hierarchy. In some embodiments, the at least one controller comprises a controller that is disposed in, or attached to, a fixture of the facility. In some embodiments, the at least one controller comprises a controller that is disposed in a device ensemble of the facility, the device ensemble having a housing that encloses the one or more devices that comprise: (i) sensors, (ii) a transceiver, or (iii) a sensor and an emitter. In some embodiments, at least two operations of (i), (ii), and (iii) are executed by the same controller of the at least one controller. In some embodiments, at least two operations of (i), (ii), and (iii) are executed by the different controllers of the at least one controller.

In another aspect, an apparatus for establishing subscriber identity in a cellular network of a facility, the apparatus comprises: a device ensemble of the facility, the device ensemble having devices comprising (a) sensors, (b) a sensor and an emitter, or (c) a transceiver, the devices of the device ensemble are disposed in a housing, the device ensemble configured to (A) measure an environment of the facility and (B) output sensor measurements, the device ensemble is configure to be accessible to a mobile device of the subscriber, the mobile device operatively is configured to operatively couple with the communication at least in part by being configured to: (a) receive through the communication network a request for a subscriber profile from the mobile device of the subscriber; (b) determine a connectivity profile based at least in part on the request received, wherein the connectivity profile comprises one or more connectivity characteristics for providing access to the cellular network of the facility that facilitates control of one or more building systems of the facility; and (c) send the subscriber profile to the mobile device, wherein the subscriber profile is associated with the determined connectivity profile.

In some embodiments, the device ensemble is configured for disposition in a fixture of the facility, or attached to a fixture of the facility. In some embodiments, the fixture comprises a framing. In some embodiments, the framing comprises a mullion or a transom. In some embodiments, the device ensemble comprises a processor, or a controller. In some embodiments, the device ensemble is configured to operatively coupled to a control system of the facility. In some embodiments, the device ensemble is configured to facilitate environmental control of the facility.

In another aspect, a method of enabling a mobile device of a subscriber to communicate via a cellular network of a facility, the method comprises: receiving a request from the mobile device to access the cellular network of the facility, wherein: (i) the request comprises data from the mobile device based at least in part on a subscriber profile accessible by the network, and (ii) the subscriber profile is associated with a connectivity profile comprising one or more connectivity characteristics for providing access to the cellular network associated with the facility, the cellular network facilitating control of one or more building systems of the facility; and subsequent to receiving the request, providing the mobile device access to the cellular network of the facility in accordance with the one or more connectivity characteristics.

In some embodiments, the subscriber profile comprises an embedded Subscriber Identification Module (eSIM) profile. In some embodiments, the method further comprises: (i) receiving an acknowledgment that the subscriber profile has been installed on the mobile device; and (ii) responsive to receiving the acknowledgement, activating the subscriber profile on the cellular network of the facility. In some embodiments, activating the subscriber profile comprises sending an International Mobile Subscriber Identifier (IMSI) activation notification to a subscription database. In some embodiments, the cellular network of the facility is associated with a plurality of facilities, and wherein activating the subscriber profile comprises granting the mobile device access to the cellular network at least a subset of the plurality of facilities. In some embodiments, receiving the request comprises receiving a Uniform Resource Locator (URL). In some embodiments, the method further comprises prior to receiving the request: (i) generating an indicator of the URL; and (ii) providing the indicator to the subscriber. In some embodiments, the indicator comprises the URL, a HyperText Markup Language (HTML) link, a Quick Response (QR) code, or a bar code. In some embodiments, providing the indicator to the subscriber comprises sending the indicator to a display, a kiosk, a web portal, a user device, or the mobile device. In some embodiments, the URL is unique to the subscriber, subscriber type, event, facility, or venue. In some embodiments, the one or more connectivity characteristics comprise a Quality of Service (QOS) level, an access level, a time during which access to the cellular network is granted or denied, and/or a bandwidth setting. In some embodiments, the access level comprises a level of access to (i) information accessible via the cellular network, (ii) a data network accessible via cellular network, and/or (iii) a device operatively coupled with the cellular network. In some embodiments, facilitating control of one or more building systems of the facility comprises facilitating security, health, and/or environmental control of the facility. In some embodiments, the cellular network is operatively coupled to the one or more building systems. In some embodiments, the one or more building systems comprises a device ensemble having a housing that encloses the one or more devices that comprise: (i) sensors, (ii) a transceiver, or (iii) a sensor and an emitter. In some embodiments, the device ensemble is disposed in a fixture of the facility, or is attached to a fixture of the facility. In some embodiments, the fixture comprises a framing portion. In some embodiments, the one or more building systems comprise a tintable window. In some embodiments, the tintable window comprises an electrochromic window. In some embodiments, the cellular network comprises a wire configured to transit power and cellular communication. In some embodiments, the cellular communication abides by at least a fourth generation, or a fifth generation cellular communication protocol. In some embodiments, the cellular network is of facilities that include the facility.

In another aspect, a system for establishing subscriber identity in a communication network of a facility, the system comprises a communication network configured to transmit one or more signals associated with any of the methods disclosed above.

In another aspect, a non-transitory computer readable program instructions for establishing subscriber identity in a communication network of a facility, which non-transitory computer readable program instructions, when executed by one or more processors operatively coupled to a communication network, cause the one or more processors to execute, or direct execution of, one or more operations associated of the methods disclosed above.

In another aspect, an apparatus for establishing subscriber identity in a communication network of a facility, the apparatus comprises at least one controller, which at least one controller is configured to execute, or direct execution of, one or more operations associated of the methods disclosed above.

In another aspect, an apparatus for establishing subscriber identity in a communication network of a facility, the apparatus comprises a device ensemble of the facility, the device ensemble comprises sensors disposed in a housing, the sensors configured to facilitate the methods disclosed above.

In another aspect, a system for enabling a mobile device of a subscriber to communicate via a cellular network of a facility, the system comprises: a communication network configured to: transmit a request from the mobile device to access the cellular network of the facility, wherein: (i) the request comprises data from the mobile device based at least in part on a subscriber profile accessible by the network, and (ii) the subscriber profile is associated with a connectivity profile comprising one or more connectivity characteristics for providing access to the cellular network associated with the facility, the cellular network facilitating control of one or more building systems of the facility; and subsequent to receiving the request, provide the mobile device access to the cellular network of the facility in accordance with the one or more connectivity characteristics.

In some embodiments, the communication network is configured to transmit communication abiding by a vehicle bus standard protocol. In some embodiments, the communication network is configured to utilize a wireless communication protocol to receive and/or transmit signals. In some embodiments, the wireless communication protocol is associated with a wireless personal area network. In some embodiments, the communication network is configured to transmit communication abiding by a communication bus protocol. In some embodiments, the communication bus protocol facilitates upstream communication and downstream communication. In some embodiments, the communication network is configured for power transmittance. In some embodiments, the communication network is configured to transmit one or more signals configured to facilitate adjustment of an environment of the facility. In some embodiments, the communication network is configured to transmit one or more signals that comprise, or are based at least in part on, environmental sensor measurements. In some embodiments, the communication network is configured to transmit one or more signals configured to facilitate management of energy usage in the facility. In some embodiments, the communication network is configured to transmit one or more protocols comprising at least one data communication protocol for automatic control of subsystems. In some embodiments, the communication network is configured to transmit infrared (IR) signal, and/or radio frequency (RF) signal. In some embodiments, the communication network comprises the cellular network. In some embodiments, the communication network is operatively coupled to a power source and configured for power transmission. In some embodiments, the power source optionally comprises a main power source, a backup power generator, or an uninterrupted power source (UPS). In some embodiments, the communication network is configured to transmit a signal indicating energy or power consumption, wherein the power consumption optionally includes power consumption by a heating system, a cooling system, and/or lighting, and wherein the signal optionally facilitates monitoring power consumption of individual rooms or a group of rooms of the facility. In some embodiments, the communication network is configured to utilize at least one wireless protocol that (i) utilizes radio frequency signals and/or (ii) facilitates communication with one or more sensors.

In another aspect, a non-transitory computer readable program instructions for enabling a mobile device of a subscriber to communicate via a cellular network of a facility, which non-transitory computer readable program instructions, when executed by one or more processors, cause the one or more processors to execute operations comprises: receiving, or directing receipt of, a request from the mobile device to access the cellular network of the facility, wherein: (i) the request comprises data from the mobile device based at least in part on a subscriber profile accessible by the network, and (ii) the subscriber profile is associated with a connectivity profile comprising one or more connectivity characteristics for providing access to the cellular network associated with the facility, the cellular network facilitating control of one or more building systems of the facility; and subsequent to receiving the request, providing, or directing providing of, the mobile device access to the cellular network of the facility in accordance with the one or more connectivity characteristics.

In some embodiments, the communication network comprises the cellular network of the facility. In some embodiments, at least a portion of the program instructions are disposed remotely from the facility. In some embodiments, at least a portion of the program instructions are disposed in the cloud. In some embodiments, the program instructions are inscribed on a non-transitory computer readable medium or on non-transitory computer readable media. In some embodiments, the one or more processors comprise a processor disposed in a device ensemble of the facility, the device ensemble having a housing that encloses the one or more devices that comprise: (i) sensors, (ii) a transceiver, or (iii) a sensor and an emitter. In some embodiments, the one or more processors include (i) a microprocessor and/or (ii) a graphical processing unit.

In another aspect, an apparatus for enabling a mobile device of a subscriber to communicate via a cellular network of a facility, the apparatus comprises at least one controller, which at least one controller is configured to: receive, or direct receipt of, a request from the mobile device to access the cellular network of the facility, wherein: (i) the request comprises data from the mobile device based at least in part on a subscriber profile accessible by the network, and (ii) the subscriber profile is associated with a connectivity profile comprising one or more connectivity characteristics for providing access to the cellular network associated with the facility, the cellular network facilitating control of one or more building systems of the facility; and subsequent to receiving the request, provide, or direct providing of, the mobile device access to the cellular network of the facility in accordance with the one or more connectivity characteristics.

In some embodiments, the at least one controller is part of, or is configured to operatively couple to, a control system having more than two levels of control hierarchy. In some embodiments, the at least one controller comprises a controller that is disposed in, or attached to, a fixture of the facility. In some embodiments, the at least one controller comprises a controller that is disposed in a device ensemble of the facility, the device ensemble having a housing that encloses the one or more devices that comprise: (i) sensors, (ii) a transceiver, or (iii) a sensor and an emitter. In some embodiments, at least two operations of (i), (ii), and (iii) are executed by the same controller of the at least one controller. In some embodiments, at least two operations of (i), (ii), and (iii) are executed by the different controllers of the at least one controller.

In another aspect, an apparatus for enabling a mobile device of a subscriber to communicate via a cellular network of a facility, the apparatus comprises: a device ensemble of the facility, the device ensemble having devices comprising (a) sensors, (b) a sensor and an emitter, or (c) a transceiver, the devices of the device ensemble are disposed in a housing, the device ensemble configured to (A) measure an environment of the facility and (B) output sensor measurements, the device ensemble is configure to be accessible to a mobile device of the subscriber, the mobile device operatively is configured to operatively couple with the communication network of the facility at least in part by being configured to: receiving a request from the mobile device to access the cellular network of the facility, wherein: (i) the request comprises data from the mobile device based at least in part on a subscriber profile accessible by the network, and (ii) the subscriber profile is associated with a connectivity profile comprising one or more connectivity characteristics for providing access to the cellular network associated with the facility, the cellular network facilitating control of one or more building systems of the facility; and subsequent to receiving the request, providing the mobile device access to the cellular network of the facility in accordance with the one or more connectivity characteristics.

In some embodiments, the device ensemble is configured for disposition in a fixture of the facility, or attached to a fixture of the facility. In some embodiments, the fixture comprises a framing. In some embodiments, the framing comprises a mullion or a transom. In some embodiments, the device ensemble comprises a processor, or a controller. In some embodiments, the device ensemble is configured to operatively coupled to a control system of the facility. In some embodiments, the device ensemble is configured to facilitate environmental control of the facility. In some embodiments, the network is a local network (e.g., a network of a facility). In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, the present disclosure provides systems, apparatuses (e.g., controllers), and/or non-transitory computer-readable medium or media (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein. The at least one controller may implement any of the methods disclosed herein. In some embodiments, at least two operations (e.g., of the method) are directed/executed by the same controller. In some embodiments, at less at two operations are directed/executed by different controllers.

In some embodiments, one controller of the at least one controller is configured to perform two or more operations. In some embodiments, two different controllers of the at least one controller are configured to each perform a different operation.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product (e.g., inscribed on one or more non-transitory medium) in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable program instructions (e.g., included in a program product comprising one or more non-transitory medium) comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium or media comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium or media coupled thereto. The non-transitory computer-readable medium comprises machine-executable code that, upon execution by the one or more processors, implements any of the methods disclosed herein and/or effectuates directions of the controller(s) disclosed herein.

In another aspect, the present disclosure provides a non-transitory computer readable program instructions that, when read by one or more processors, causes the one or more processors to execute any operation of the methods disclosed herein, any operation performed (or configured to be performed) by the apparatuses disclosed herein, and/or any operation directed (or configured to be directed) by the apparatuses disclosed herein.

In some embodiments, the program instructions are inscribed in a non-transitory computer readable medium or media. In some embodiments, at least two of the operations are executed by one of the one or more processors. In some embodiments, at least two of the operations are each executed by different processors of the one or more processors.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

Figure 1:
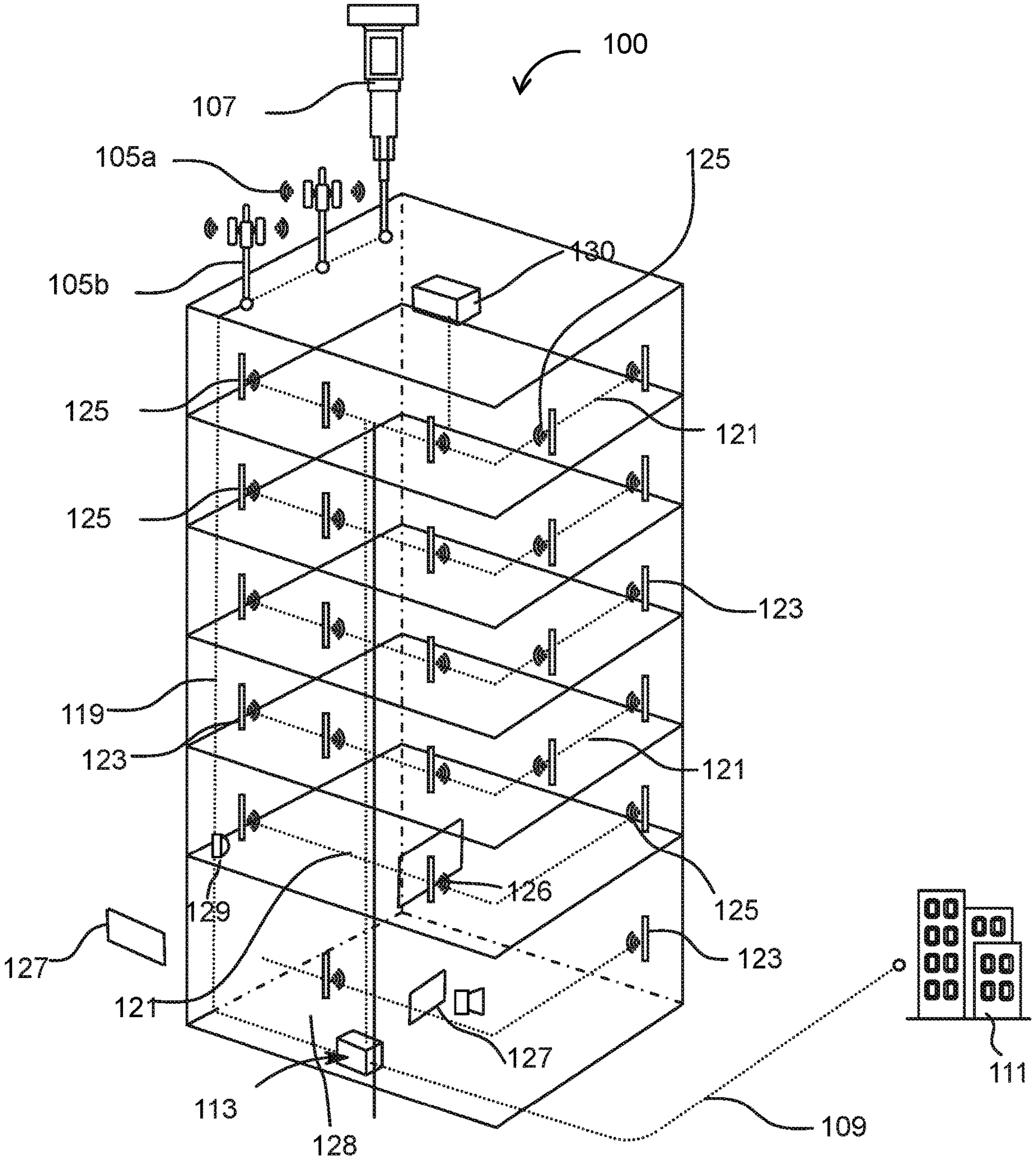
FIG. 1 schematically shows an infrastructure of a building.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

As used herein, including in the claims, the conjunction "and/or" in a phrase such as "including X, Y, and/or Z", refers to in inclusion of any combination or plurality of X, Y, and Z. For example, such phrase is meant to include X. For example, such phrase is meant to include Y. For example, such phrase is meant to include Z. For example, such phrase is meant to include X and Y. For example, such phrase is meant to include X and Z. For example, such phrase is meant to include Y and Z. For example, such phrase is meant to include a plurality of Xs. For example, such phrase is meant to include a plurality of Ys. For example, such phrase is meant to include a plurality of Zs. For example, such phrase is meant to include a plurality of Xs and a plurality of Ys. For example, such phrase is meant to include a plurality of Xs and a plurality of Zs. For example, such phrase is meant to include a plurality of Ys and a plurality of Zs. For example, such phrase is meant to include a plurality of Xs and Y. For example, such phrase is meant to include a plurality of Xs and Z. For example, such phrase is meant to include a plurality of Ys and Z. For example, such phrase is meant to include X and a plurality of Ys. For example, such phrase is meant to include X and a plurality of Zs. For example, such phrase is meant to include Y and a plurality of Zs.

The term "operatively coupled" or "operatively connected" refers to a first element (e.g., mechanism) that is coupled (e.g., connected) to a second element, to allow the intended operation of the second and/or first element. The coupling may comprise physical or non-physical coupling (e.g., communicative coupling). The non-physical coupling may comprise signal-induced coupling (e.g., wireless coupling). Coupled can include physical coupling (e.g., physically connected), or non-physical coupling (e.g., via wireless communication). Operatively coupled may comprise communicatively coupled.

An element (e.g., mechanism) that is "configured to" perform a function includes a structural feature that causes the element to perform this function. A structural feature may include an electrical feature, such as a circuitry or a circuit element. A structural feature may include an actuator. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions.

Programming instructions may be executable by at least one processor. Programming instructions may be stored or encoded on a medium accessible by one or more processors. Additionally, in the following description, the phrases "operable to," "adapted to," "configured to," "designed to," "programmed to," or "capable of" may be used interchangeably where appropriate.

In some embodiments, an enclosure comprises an area defined by at least one structure. The at least one structure may comprise at least one wall. An enclosure may comprise and/or enclose one or more sub-enclosures. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure at most about 30%, 20%, 10%, 5%, or 1% of the walls(s). The wall(s) may comprise a floor, a ceiling, or a side wall. The closable opening may be closed by at least one window or door. The enclosure may be at least a portion of a facility. The facility may comprise a building. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. The building may comprise a family home. The building may be an apartment building (e.g., multi residential building) or a single family home. A facility may comprise one or more buildings. In some embodiments, an enclosure may be stationary and/or movable (e.g., a train, an airplane, a ship, a vehicle (e.g., a car), or a rocket). In some embodiments, the facility may be stationary and/or movable (e.g., a train, a plane, a ship, a vehicle (e.g., a car), or a rocket). The facility may comprise a factory, a medical facility, a financial institution (e.g., a bank), in a hospitality institution (e.g., hotel), a shopping center, a restaurant, a distribution center, an educational facility (e.g., school, college or university), an office building, a mass transit station (e.g., train station, or an airport), or a governmental building. The facility can be a commercial and/or a residential building such as an apartment complex or a single family home.

In some embodiments, the enclosure encloses an atmosphere. The atmosphere may comprise one or more gases. The gases may include inert gases (e.g., comprising argon or nitrogen) and/or non-inert gases (e.g., comprising oxygen or carbon dioxide). The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), debris (e.g., dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), debris (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity of the gas in the enclosure may be (e.g., substantially) similar throughout the enclosure. The velocity of the gas in the enclosure may be different in different portions of the enclosure (e.g., by flowing gas through to a vent that is coupled with the enclosure).

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network. The network may be a local network. The network may comprise a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol (e.g., as defined by 3rd Generation Partnership Project (3GPP) and/or other cellular communication standards organizations). The communication may comprise media communication facilitating stills, music, or moving picture streams (e.g., movies or videos). The communication may comprise data communication (e.g., sensor data). The communication may comprise control communication, e.g., to control the one or more nodes operatively coupled to the networks. The network may comprise a first (e.g., cabling) network installed in the facility. The network may comprise a (e.g., cabling) network installed in an envelope of the facility (e.g., such as in an envelope of an enclosure of the facility. For example, in an envelope of a building included in the facility).

In another aspect, the present disclosure provides networks that are configured for transmission of any communication (e.g., signal) and/or (e.g., electrical) power facilitating any of the operations disclosed herein. The communication may comprise control communication, cellular communication, media communication, and/or data communication. The data communication may comprise sensor data communication and/or processed data communication. The networks may be configured to abide by one or more protocols facilitating such communication. For example, a communications protocol used by the network (e.g., with a BMS) can be a building automation and control networks protocol (BACnet). For example, a communication protocol may facilitate cellular communication abiding by at least a 2nd, 3rd, 4th, or 5th generation cellular communication protocol.

In another aspect, the present disclosure provides networks that are configured for transmission of any communication (e.g., signal) and/or (e.g., electrical) power facilitating any of the operations disclosed herein. The communication may comprise control communication, cellular communication, media communication, and/or data communication. The data communication may comprise sensor data communication and/or processed data communication. The networks may be configured to abide by one or more protocols facilitating such communication. For example, a communications protocol used by the network (e.g., with a BMS) can comprise a building automation and control networks protocol (BACnet). The network may be configured for (e.g., include hardware facilitating) communication protocols comprising BACnet (e.g., BACnet/SC), LonWorks, Modbus, KNX, European Home Systems Protocol (EHS), BatiBUS, European Installation Bus (EIB or Instabus), zigbee, Z-wave, Insteon, X10, Bluetooth, or WiFi. The network may be configure to transmit the control related protocol. A communication protocol may facilitate cellular communication abiding by at least a 2nd, 3rd, 4th, or 5th generation cellular communication protocol. The (e.g., cabling) network may comprise a tree, line, or star topologies. The network may comprise interworking and/or distributed application models for various tasks of the building automation. The control system may provide schemes for configuration and/or management of resources on the network. The network may permit binding of parts of a distributed application in different nodes operatively coupled to the network. The network may provide a communication system with a message protocol and models for the communication stack in each node (capable of hosting distributed applications (e.g., having a common Kernel). The control system may comprise programmable logic controller(s) (PLC(s)).

In some embodiments, the network infrastructure may comprise facility network that provides cellular functionality at a facility and/or enhances the cellular coverage of cellular network of a traditional carrier. This access to the cellular functionality of the facility network may be provided to staff or other personnel associated with the facility (e.g., to enable control communication related to the control of one or more building systems of the facility or access to a private network associated with the facility) via a mobile phone or other cellular device. Access to the cellular functionality of the facility network may be provided to other occupants (e.g., guests, patrons, customers, etc.) to allow enhanced access to a cellular network, the Internet, or facility-specific services. Network infrastructure across multiple billing facilities may be communicatively coupled to create a multi-facility network. A cellular device granted access at a first facility network of the multi-facility network may also be granted access to other facility networks in the multi-facility network, allowing persons (e.g., facility personnel, guests, patrons, etc.) cellular access to the multi-facility network at different facilities in different geographical locations. Registration of a mobile device or other cellular device within the facility network of a first facility can allow the device to automatically register with a facility network of a second facility, allowing the cellular device to automatically access the facility network of the second facility when wireless range of the second facility. In this manner, a user of a cellular device may be provided access to a multi-facility network once the cellular device is granted access to a first facility network within the multi-facility network. Unlike WLAN networks, the mobile device's use of an eSIM (or similar information) may obviate the need for the user to identify the proper service set identifier (SSID) or enter a password during set up.

In some embodiments, macro cells are used to provide cellular communication signals to a facility. For example, a macro cell may receive signals from, or transmit signals to, a service provider. The service provider may provide access to a cellular communication core network (e.g., a 4G core network, a 5G core network, or the like). In some embodiments, the core network is a telecommunication network's core part. The core network may offer numerous services to customers who are interconnected by the access network. In some embodiments, the core network is configured to direct cellular communication over the public-switched communication network. The access network can physically connect an end system to the immediate router (also known as the "edge router") on a path from the end system to any other distant end system. Examples of access networks are ISP, home network, enterprise network, ADSL, mobile network, FITH, and the like. The macro cell may be communicatively coupled with a router (e.g., a headend router) that rotes signals to Radio Access Units (RAUs) of a facility. For example, the router may capture downstream signals from the macro cell and route the downstream signals to one or more RAUs. The one or more RAUs may cause one or more antennas to transmit RF signals corresponding to the downstream signals. As another example, the router may capture upstream signals from one or more RAUs associated with the facility. The router may transmit the upstream signals to the macro cell. A macro cell may have various disadvantages. For example, to provide a strong signal with a far-reaching range, a macro cell may require an elevated location (e.g., on top of a tower, a hill, a building, or any other elevated location). A macro cell may heat up and may be expensive to cool. A macro cell may require dedicated hardware. A macro cell may provide a fixed coverage area for regions of a facility regardless of facility usage. Routing cables from a macro cell to a facility may be expensive as the cabling range may be extensive. The routing may require cabling configured for fast signal communication such as optical cables, that may contribute to the expense.

FIG. 1 shows an example of a building with device ensembles (e.g., assemblies). As points of connection, the building can include multiple rooftop donor antennas 105*a*, 105*b* as well as a sky sensor 107 for sending electromagnetic radiation (e.g., infrared, ultraviolet, and/or visible light). These wireless signals may allow a building services network to wirelessly interface with one or more communications service provider systems. The building has a control panel 113 for connecting to a provider's central office 111 via a physical line 109 (e.g., an optical fiber such as a single mode optical fiber). The control panel 113 (e.g., including a controller such as part of a control system) may include hardware and/or software configured to provide functions of, for example, a signal source carrier headend, a fiber distribution headend, and/or a (e.g., bi-directional) amplifier or repeater. The rooftop donor antennas 105*a* and 105*b* allow building occupants and/or devices to access a wireless system communications service of a (e.g., 3rd party) provider, the antenna and/or controller(s) may provide access to the same service provider system, a different service provider system, or some variation such as two interface elements providing access to a system of a first service provider, and a different interface element providing access to a system of a second service provider.

As shown in the example of FIG. 1, a vertical data plane may include a (e.g., high capacity, or high-speed) data carrying line 119 such as (e.g., single mode) optical fiber or UTP copper lines (of sufficient gauge). In some embodiments, at least one control panel could be provided on at least part of the floors of the building (e.g., on each floor). In some embodiments, one (e.g., high capacity) communication line can directly connect a control panel in the top floor with (e.g., main) control panel 113 in the bottom floor (or in the basement floor). Note that control panel 113 directly connects to rooftop antennas 105*a*, 105*b* and/or sky sensor 107, while control panel 113 also directly connects to the (e.g., 3rd party) service provider central office 111.

FIG. 1 shows an example of a horizontal data plane that may include one or more of the control panels and data carrying wiring (e.g., lines), which include trunk lines 121. In certain embodiments, the trunk lines are made from coaxial cable. The trunk lines may comprise any wiring disclosed herein. The control panels may be configured to provide data on the trunk lines 121 via a data communication protocol (such as MoCA and/or G.hn). The data communication protocol may comprise (i) a next generation home networking protocol (abbreviated herein as "G.hn" protocol), (ii) communications technology that transmits digital information over power lines that traditionally used to (e.g., only) deliver electrical power, or (iii) hardware devices designed for communication and transfer of data (e.g., Ethernet, USB and/or Wi-Fi) through electrical wiring of a building. The data transfer protocols may facilitate data transmission rates of at least 1 Gigabits per second (Gbit/s), 2 Gbit/s, 3 Gbit/s, 4 Gbit/s, or 5 Gbit/s. The data transfer protocol may operate over telephone wiring, coaxial cables, power lines, and/or (e.g., plastic) optical fiber. The data transfer protocol may be facilitated using a chip (e.g., comprising a semiconductor device).

Each horizontal data plane may provide high speed network access to one or more device ensembles 123 (e.g., a set of one or more devices in a housing comprising an assembly of devices) and/or antennas 125, some or all of which are optionally integrated with device ensembles 123. Antennas 125 (and associated radios, not shown) may be configured to provide wireless access by any of various protocols, including, e.g., cellular (e.g., one or more frequency bands at or proximate 28 GHZ), Wi-Fi (e.g., one or more frequency bands at 2.4, 5, and 60 GHZ), CBRS, and the like. Drop lines may connect device ensembles 123 to trunk lines 121. In some embodiments, a horizontal data plane is deployed on a floor of a building. The devices in the device ensemble may comprise a sensor, emitter, or antenna. The device ensemble may comprise a circuitry. The devices in the device ensemble may be operatively coupled to the circuitry. One or more donor antennas such as 105*a*, or 105*b* may connect to the control panel 113 via high speed lines (e.g., single mode optical fiber or copper). In the depicted example, the control panel 113 may be located in a lower floor of the building. The connection to the donor antenna(s) 105*a*, 105*b* may be via one or more vRAN radios and wiring (e.g., coaxial cable).

The communications service provider central office 111 connects to ground floor control panel 113 via a high speed line 109 (e.g., an optical fiber serving as part of a backhaul). This entry point of the service provider to the building is sometimes referred to as a Main Point of Entry (MPOE), and it may be configured to permit the building to distribute both voice and data traffic.

In some embodiments, data transmission (and in some embodiments voice services), may be provided in a building via wireless and/or wired communications. The communication may be provided to and/or from occupants of the building. The data transmission and/or voice services may become difficult due at least in part to attenuation by building structures (such as walls, floors, ceilings, and/or windows) in third, fourth, or fifth generation (3G, 4G, or 5G) cellular communication. Relative to 3G and 4G communication, the attenuation becomes more severe with higher frequencies such as those used by 5G. To address this challenge, a building can be outfitted with components that serve as gateways, or ports, for cellular signals. Such gateways may couple to infrastructure in the interior of the building that provide wireless service (e.g., via interior antennas and/or other infrastructure implementing Wi-Fi, small cell service (e.g., via microcell or femtocell devices), CBRS, etc.). The gateways, or points of entry, for such services may include high speed cable (e.g., underground) from a central office of a carrier and/or a wireless signal received at an antenna strategically located on the building exterior (e.g., a donor antenna and/or sky sensor on the building's roof). The high speed cable to the building can be referred to as "backhaul."

Figure 2:
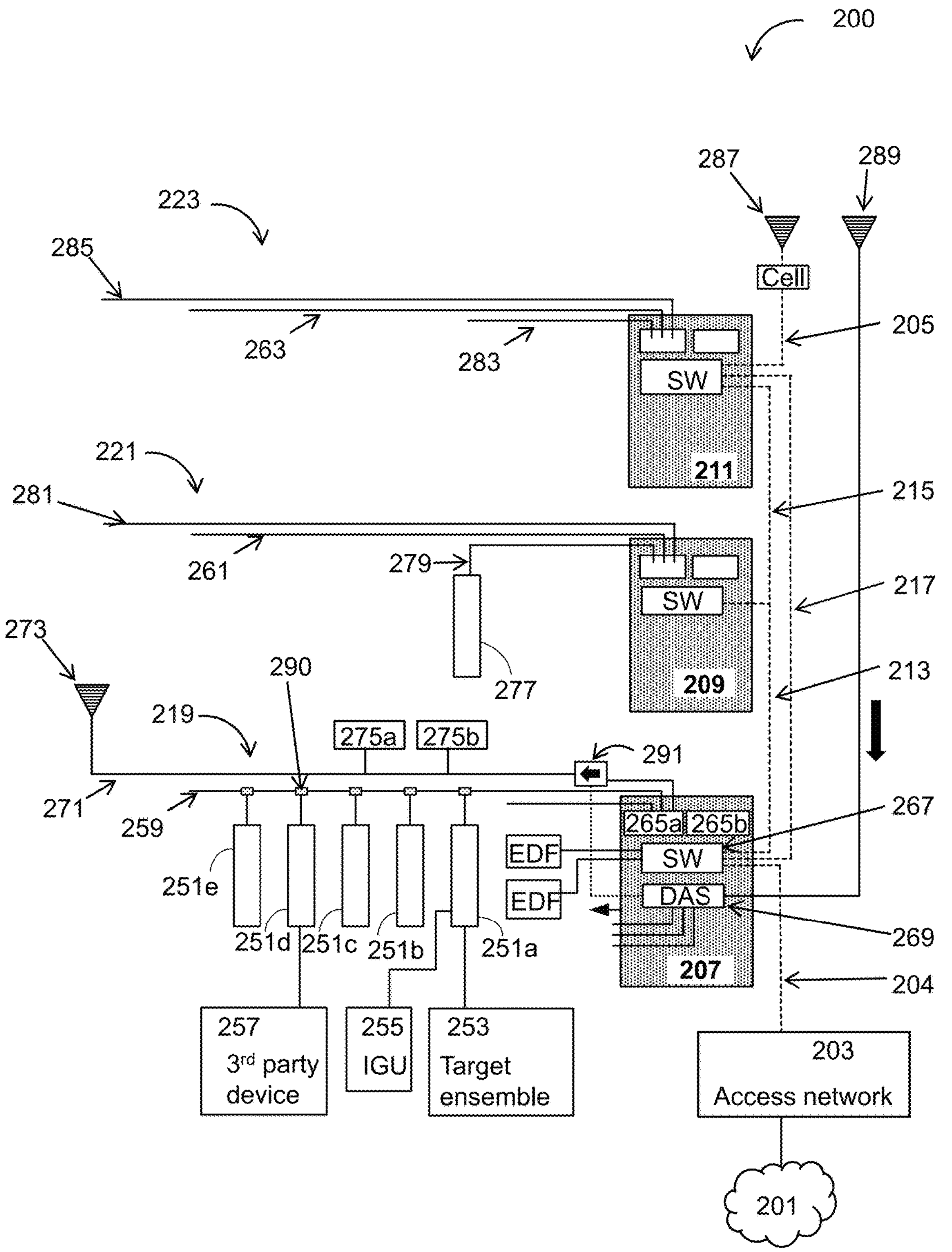
FIG. 2 schematically shows a network infrastructure of a building.

FIG. 2 presents an embodiment of a communications network 200 for an enclosure such as a building. The example shown in FIG. 2 depicts links that may comprise one or more cables (e.g., coaxial cables or twisted cables). The link may be a communication and/or electrical power line. The cables may be a cable bundle. The cable bundle can transmit electrical power and/or communication. The cable (e.g., coaxial cable) can transmit electrical power and/or communication. In the depicted embodiment, network 200 includes a vertically oriented network portion (including a vertical communication line 205) that connects network targets (e.g., components) on multiple floors of the enclosure (e.g., of the facility). In the example shown in FIG. 2, a vertical data plane comprises a first control panel 207 (e.g., comprising a floor controller) on a first floor, a second control panel 209 (e.g., comprising a floor controller) on a second floor, and a third control panel 211 (e.g., comprising a floor controller) on third floor. Physical (e.g., wired) communications and/or electrical power link 213 connects control panels 207 and 209. Physical communications and/or electrical power link 215 connects control panels 209 and 211. Physical communications and/or electrical power link 217 connects control panels 207 and 211. As illustrated, control panels 207, 209, and 211 along with physical communications and/or power links 213, 215, and 217 form a loop. The loop may provide redundancy in the network. As an example, physical communications and/or electrical power link 217 provides redundancy on the vertical plane if one of the other physical communications and/or electrical power links (e.g., link 213 or 215) should fail. Communications links 213, 215, and 217 may comprise electrical wires and/or optical fibers. Communications links 213, 215, and 217 may comprise a coaxial wire.

In the example shown in FIG. 2, control panel 207 is communicatively coupled (e.g., connected) to an external network 201 (e.g., external to the building and/or in the cloud) via an access network 203. Control panel 207 is communicatively coupled (e.g., connected) to access network 203 by a physical communications and/or electrical power link 204, which may comprise an optical fiber and/or an electrical wire. Control panel 207 is connected to an antenna 289 that is external to the building. The antennal 289 may be a receiving antenna (e.g., a donor antenna).

FIG. 2 shows an example of control panel 207 that is operatively coupled (e.g., connected) to a first horizontal network portion that is horizontal data plane 219. Control panel 209 is operatively coupled (e.g., connected) to a second horizontal network portion that is horizontal data plane 221. Control panel 211 is operatively coupled (e.g., connected) to a third horizontal network portion that is horizontal data plane 223. The horizontal data planes 219, 221, and 223 include multiple network targets (e.g., components and/or devices such as a device ensemble).

The network targets (e.g., components) can include client nodes. The client nodes can be located on respective floors of the building.

In the example shown in FIG. 2, horizontal data plane 219 includes network adaptors 251*a*-551*e*. The network adapter (e.g., 251*a*) is coupled to communication and/or electrical power line (e.g., trunk line) 259 via a distribution junction (e.g., 290). Network adaptor 251*a* is connected to a collection of targets (e.g., including a transceiver, sensor and/or emitter) 253 and connected to an IGU 255 that may be an optically switchable window. Network adaptor 251*a* is configured to provide electrical power and data to the collection of targets 253 (also referred to herein as "target ensemble"), e.g., using a Power over Ethernet protocol (PoE). Network adaptor 251*d* is connected to at least one third-party device 257 such as a computation device. Network adaptor 251*d* is configured to provide network connectivity to third party device 257. Providing the network connectivity may comprise logic implementing a link layer discovery protocol (LLDP) that supports, e.g., PoE. A target may comprise a device. The deice may comprise a transceiver, a sensor, an emitter, a display, a smart window, a processor, a controller (e.g., a local controller such as a microcontroller), a memory, an antenna, or a communication hub.

In the example shown in FIG. 2, control panel 207 is connected to network adaptors 251*a*-251*e* by a link (e.g., coaxial cable) 259. The connection can be by a coaxial or other type of (e.g., electrical and/or optical) cable, e.g., as disclosed herein. Control panel 209 is connected to client nodes on horizontal data plane 221 by a link (e.g., coaxial cable) 261. Control panel 211 is connected to client nodes on horizontal data plane 223 by a link (e.g., coaxial cable) 263. In the example shown in FIG. 2, control panel 207 comprises two head ends 265*a* and 265*b*, a switch 267 (abbreviated herein as "SW") and a distributed antenna system (abbreviated herein as "DAS") 269. The Switch is operatively coupled (e.g., connected to two edge distribution frame devices (abbreviated herein as "EDFs"). Head end 265*a* is connected to multiple links (e.g., coaxial cables), including link (e.g., coaxial cable) 259. While not shown, head end 265*b* is connected to at least one link (e.g., coaxial cable). Switch 267 is connected to (e.g., communication and/or electrical power) links 204, 213, and 217. The connection may be via optical and/or electrical cable(s). DAS 269 is configured to control and/or communicate with one or more antennas, including antenna 273, on horizontal data plane 219. The antenna may be an internal building antenna (e.g., 273) and/or or an external (e.g., donor) antenna (e.g., 289). In the example shown in FIG. 2, an electrical power and/or communications link (e.g., cable) 271 connects antenna 273 to control panel 207. Link 271 is also connected to a directional coupler (e.g., configured for directional data communication protocol such as MoCA or G.hn) Other client nodes 275*a* and 275*b* are connected to control panel 207 via electrical power and/or communications link (e.g., cable) 271. Head ends 265*a* and 265*b* are configured to send and/or receive data encoded in accordance with one or more protocols which comprise (i) a next generation home networking protocol (abbreviated herein as "G.hn" protocol), (ii) communications technology that transmits digital information over electrical power lines that traditionally used to (e.g., only) deliver electrical power, or (iii) hardware devices designed for communication and transfer of data (e.g., Ethernet, USB and Wi-Fi) through electrical wiring of a building. The data transfer protocols may facilitate data transmission rates of at least 1 Gigabits per second (Gbit/s), 2 Gbit/s, 3 Gbit/s, 4 Gbit/s, or 2 Gbit/s. The data transfer protocol may operate over telephone wiring, coaxial cables, electrical power lines, and/or (e.g., plastic) optical fiber. The data transfer protocol may be facilitated using a chip (e.g., comprising a semiconductor device). In the example shown in FIG. 2, Horizontal data plane 221 includes a network adaptor 277 connected to control panel 209 by a link (e.g., coaxial cable) 279. Horizontal data plane 221 includes a physical power (e.g., 48V DC) and/or (electrical power and/or communications) line 281 for connecting one or more antennas (not shown) to control panel 209. Horizontal data plane 223 includes, in addition to link (e.g., coaxial cable) 263, a second link (e.g., coaxial cable) 283 for connecting to one or more network adaptors or other client nodes (not shown) to control panel 211. Horizontal data plane 223 includes a physical (e.g., electrical power and/or communications) line 285 for connecting one or more antennas (not shown) to control panel 211. Control panel 211 is also connected to a (e.g., cellular) antenna 287.

In some embodiments, a router (e.g., a headend router) routes signals between one or more small cell devices associated with a facility and one or more RAUs associated with the facility. A router may be configured to route signals between one small cell device and one RAU, between two or more small cell devices and one RAU, and/or between two or more RAUs and one small cell device. The router may be configured to dynamically change routing of signals, based on, for example, a configuration received by a small cell controller. Dynamic change in routing may be implemented via a signal manipulator of a router. In some embodiments, the signal manipulator may be programmable. For example, in some embodiments, the signal manipulator may be programmed to split and/or combine signals from one or more small cell devices and/or one or more RAUs according to a configuration, e.g., received from a small cell controller.

As noted, network infrastructure such as the infrastructure illustrated in FIGS. 1 and 2 can be used to establish a facility network that provides cellular functionality at a facility and/or enhances the cellular coverage of cellular network of a traditional carrier. This facility network can be deployed at a variety of facilities types such as, for example, airports, malls, banks, hospitals, hotels, or stadiums, allowing persons within wireless range of the network infrastructure (e.g., in and around the facility) access to the facility network. Activating a cellular-enabled mobile device on the facility network may leverage an embedded subscriber identification module (eSIM) of the cellular-enabled mobile device, and involve multiple components including a subscription database, policy and billing system, and an eSIM portal. An example of this is shown in FIG. 3 and described below.

Figure 3:
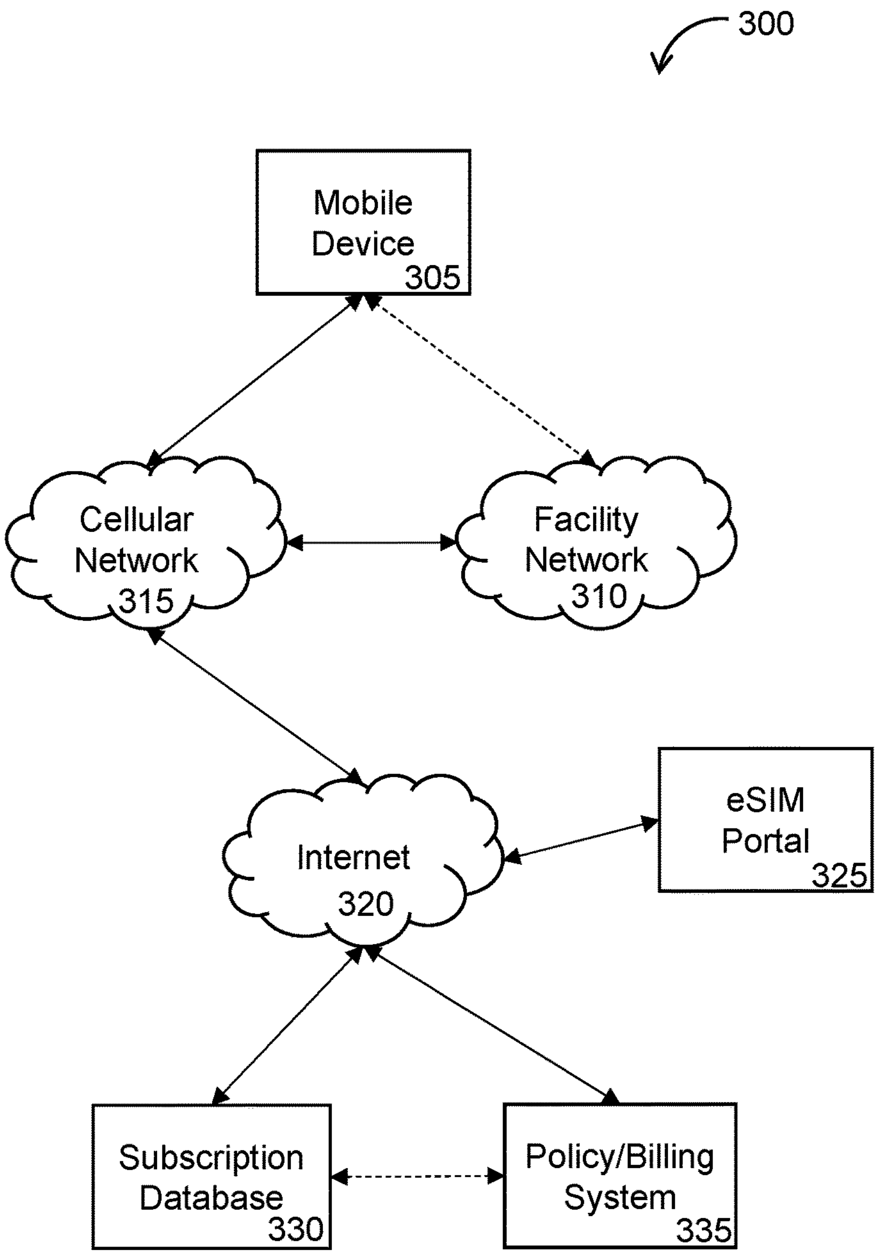
FIG. 3 shows an example system-level architecture for activating a mobile device on a facility network.

FIG. 3 shows an example system-level architecture 300 for activating a mobile device 305 on a facility network 315, according to an embodiment. The mobile device 305 may comprise a cellular device such as a mobile phone, laptop, or tablet. The facility network 310 may comprise a network architecture as previously described with regard to FIGS. 1 and 2. In particular, the facility network 310 may comprise a wireless network capable of providing cellular access to one or more buildings, including any of the previously-described facilities. As noted, some embodiments may comprise a multi-facility network. A cellular network 315 may comprise a cellular network (e.g., a 3G, 4G, or 5G cellular network, as previously described) provided by a traditional cellular carrier or by a separate provider (e.g., the provider of the facility network 310). In some embodiments, the facility network 310 may be seen as an extended cellular network providing a type of "roaming" access to the cellular network 315. The cellular network 315 may be communicatively coupled with the facility network 310, mobile device 305, and the Internet 320. In the example illustrated in FIG. 3, the cellular network 315 may provide the mobile device 305 and/or facility network 310 access to the Internet 320. In some embodiments, the facility network 310 and/or mobile device 305 may have access to the Internet 320 via other means. Additionally coupled with the Internet 320 are an eSIM portal 325, a subscription database 330, and policy/billing system 333 which can be used by the system-level architecture 300 to access and administer an eSIM to the mobile device 305 according to a subscriber profile, activate the eSIM to grant the mobile device 305 access to the facility network 310, and maintain policy and billing information with respect to the eSIM. Additional details regarding this process are provided below with regard to FIGS. 4-10.

Because a facility network (e.g., facility network 310) may be communicatively coupled with IoT devices of the facility, a mobile device activated on the facility network may enable an end user to access and/or control the IoT devices. This may enable control of one or more building systems of the facility by facilitating security, health, and/or environmental control of the facility (e.g., via control of HVAC systems, security cameras, etc.). Access to some or all of such IoT devices may be granted based on a connectivity profile associated with the mobile device, described in further detail hereinafter. The connectivity profile may be linked to security and/or other access type of the end user (e.g., administrator, staff, etc.). In some embodiments, user preferences may be obtained from the end-user. These user preferences may be obtained via questionnaire to the user as the user first accesses the facility network or obtained over time based on preferences observed by the mobile device and/or facility network. These preferences may include facility-related preferences such as preferred temperature, humidity, lighting/window tint, etc. In some embodiments, the facility network may be responsive to user preferences of one or more users located in the facility (e.g., based on the mobile device being connected with the facility network). In some embodiments, network-based positioning, such as multilateration and/or multiangulation based on measurements (e.g., round-trip time (RTT), received signal strength indicator (RSSI), etc.) of transmitted and/or received by the mobile device and a plurality of cellular access points may enable a more precise position determination of the mobile device, allowing for the facility network to implement preferences of a user associated with the mobile device for a room or other space within the facility in which the mobile device is located.

Figure 4:
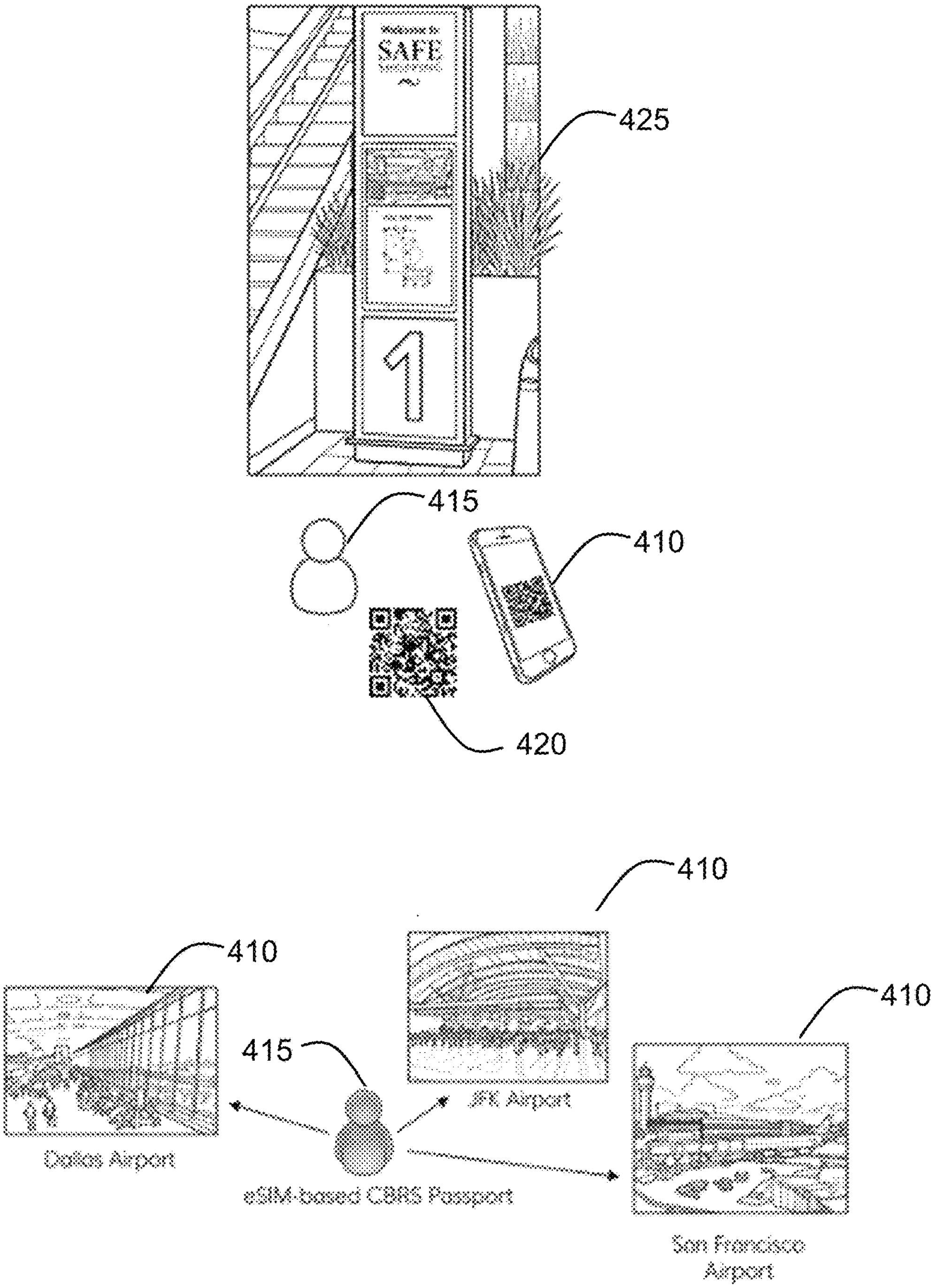
FIG. 4 is a diagram showing aspects of a user experience when activating and utilizing and eSIM-equipped mobile phone.

FIG. 4 is a diagram showing aspects of a user experience when activating and utilizing and eSIM-equipped mobile phone 410 at a facility network (e.g., facility network 310), in some embodiments. An eSIM-equipped mobile phone 410 is a mobile phone capable of downloading an eSIM profile and installing the eSIM (also known as an electric SIM or virtual SIM) and using it to access a cellular network in a manner similar to a physical subscriber identification module (SIM) card. Some mobile phones and other cellular devices may be capable of using one or more eSIMs in conjunction with one or more physical SIM cards to access multiple cellular networks, and eSIMs are designed to allow a mobile phone to access a cellular network via an eSIM without interfering with the cellular service provided via the physical SIM card.

As illustrated in FIG. 4, a user 415 of the eSIM-equipped mobile phone 410 may initiate the process of activating the mobile phone 410 on a facility network by obtaining a quick response (QR) code 420. When used by the mobile phone 410, the QR code 420 causes the mobile phone 410 to send a request to an eSIM portal (e.g. eSIM portal 325), which may be executed by a server, that provides a subscriber profile (e.g., eSIM profile) associated with the request. The request may be made via an existing Internet connection (e.g., via Wi-Fi or cellular network). As illustrated, the QR code 420 may be obtained via a kiosk 425 in or near the facility associated with the facility network. In some embodiments, the QR code 420 may be obtained via an online portal using any Internet-connected device. In some embodiments, the QR code 420 may be obtained via a sign, ticket, advertisement, or other visual marker located on the Internet (e.g., a website associated with the facility and/or facility network provider) and/or at or near the facility. In some embodiments, a barcode, HyperText Markup Language (HTML) link, or other indicator may be used by the mobile phone 410 to request the subscriber profile. The QR code 420 or other indicator may have an embedded Uniform Resource Locator (URL) that causes the mobile phone 410 to send the request via a browser or other application executed by the mobile phone 410.

Although the subscriber profile (e.g., eSIM profile) provided to the mobile phone 410 in response to the request sent to the eSIM portal may have a unique International Mobile Subscriber Identifier (IMSI), the QR code 420 used by the mobile phone 410 to make the request may be associated with a plurality of subscriber profiles. The mapping of QR code 420 to IMSI may therefore be 1:N where N is equal to or greater than one. In instances where N=1 the QR code 420 may be generated for specific user. In such instances, the QR code 420 may be generated based on personal or individualized data unique to the user 415, and may be generated on demand at the kiosk 425 or a web portal. In one example, the user 415 uses a kiosk 425 to purchase and eSIM to gain access to a facility network associated with one or more buildings or facilities. The user 415 selects particular connectivity options (bandwidth, time limits, etc.) and enters personal data (name, email address, etc.), and the eSIM portal uses this unique combination of information to generate a unique QR code 420 associated with a URL request that includes the unique information embedded therein. In this manner, each user of a facility network may have a corresponding unique QR code. In cases where N>1 the QR code 420 may be predetermined and associated with a certain user type. As noted, predetermined QR codes may be printed on signs, tickets, etc. different QR codes may be given to different user types (e.g., ticket holder, guest, staff, etc.). In one example, a first QR code associated with ticketholders at a stadium may be printed on tickets to a sporting event held at the stadium, while a second QR code associated with staff at the stadium may be provided on a sign in a room accessible only to the staff. (In some embodiments, digital signage may not be unique to a particular user, but may be updated over time with different QR codes to provide different types of access to the facility network at different times.) Groups defining different user types may be grouped by any of a variety of factors, including by venue, by payment tier (e.g., premium user or standard user), role with respect to a facility (e.g., guest, administrator, or employees/staff), etc. The QR code 420, whether used by a single user or many users of a user type, may be mapped to a connectivity profile that defines the type of connectivity the mobile phone 410 will have with the facility network once activated.

Although an eSIM may be associated with a single connectivity profile, several connectivity profiles may be defined to allow specific users or user groups customized access to the facility network. Customizable options defined in a connectivity profile may include, for example, a quality of service (QOS), security, network access, or device access. QOS may describe bandwidth, latency, and/or similar connection attributes for mobile phone. Security may include encryption and/or other means of secure communication. Network access may include access to different types of networks. Guests at a venue, for example, may be given access to the Internet, whereas administrators and staff at the venue also may be granted access to the venue's local area network (LAN). Network access may also include times during which the facility network may be accessed (e.g., during an event, at certain times of day, on a particular schedule, etc.). Device access may allow access to certain devices of a facility, including HVAC controls, window-dimming controls, temperature and/or other sensors, etc. Again, these options may be associated with a connectivity profile, which may be associated with a URL request of a particular QR code 420.

As previously noted, activation of a mobile phone on a facility network may not only provide a user access to the facility network at a particular facility, but may also provide the user access at other facilities. In the example illustrated in FIG. 4, for example, the user 415 is allowed access (labeled as an eSIM-based Citizens Broadband Radio Service (CBRS) passport) to facility networks at the Dallas airport 430, the JFK airport 440, and the San Francisco airport 450. In some embodiments, a user may be granted access to any number of different facilities maintained and/or networked with a facility network provider once a mobile device is activated on the facility network. According to some embodiments, once the mobile device is activated at a first facility, it may automatically log onto the facility network of the first facility and/or other facilities associated with the first facility once it is within wireless range of the facility network. As such, registration may be permanent in some embodiments; there may be no need to register or activate the mobile device more than once.

Figure 5:
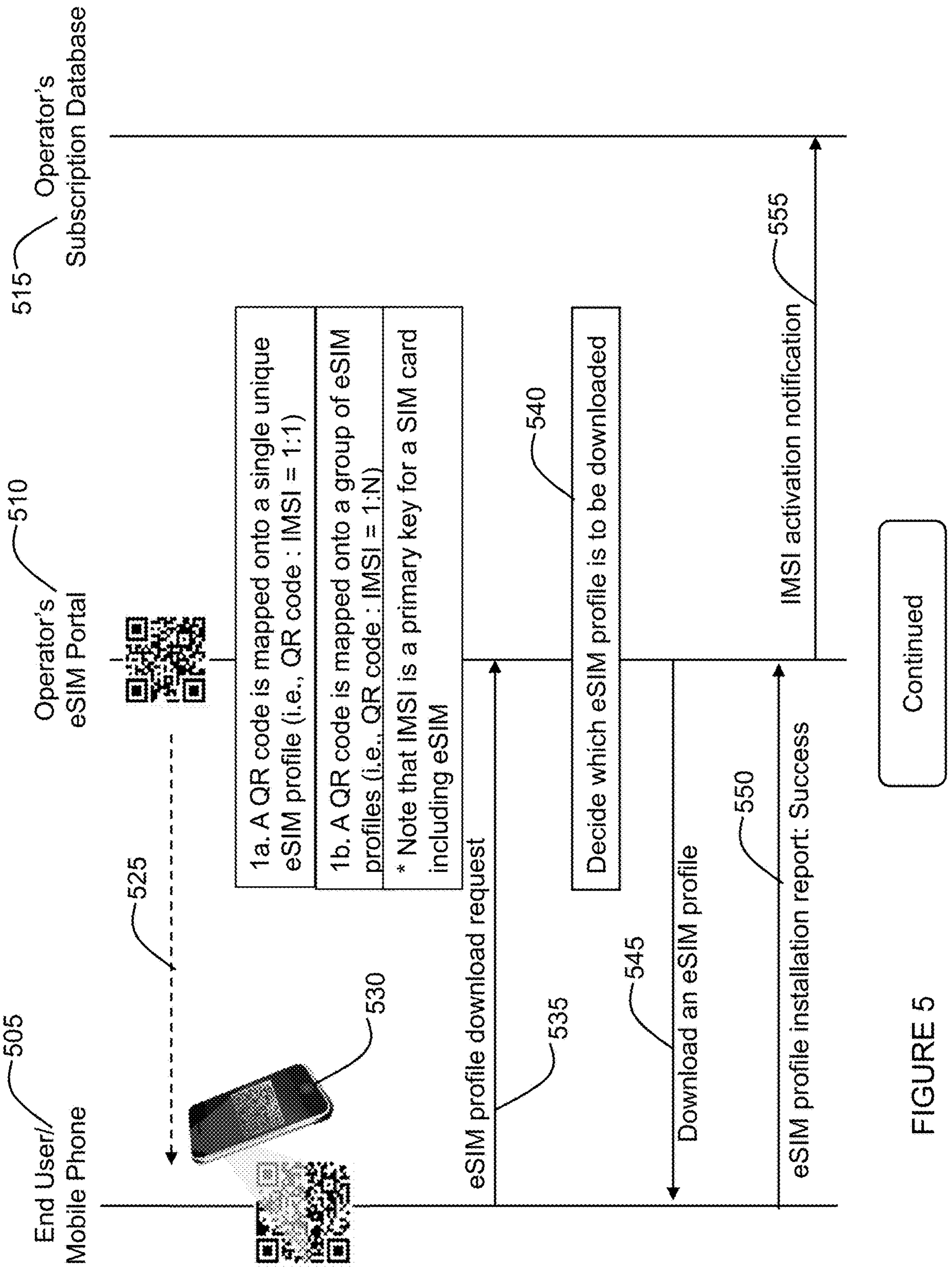
FIGS. 5 and 6 are swim-lane diagrams illustrating an example eSIM activation process.
Figure 6:
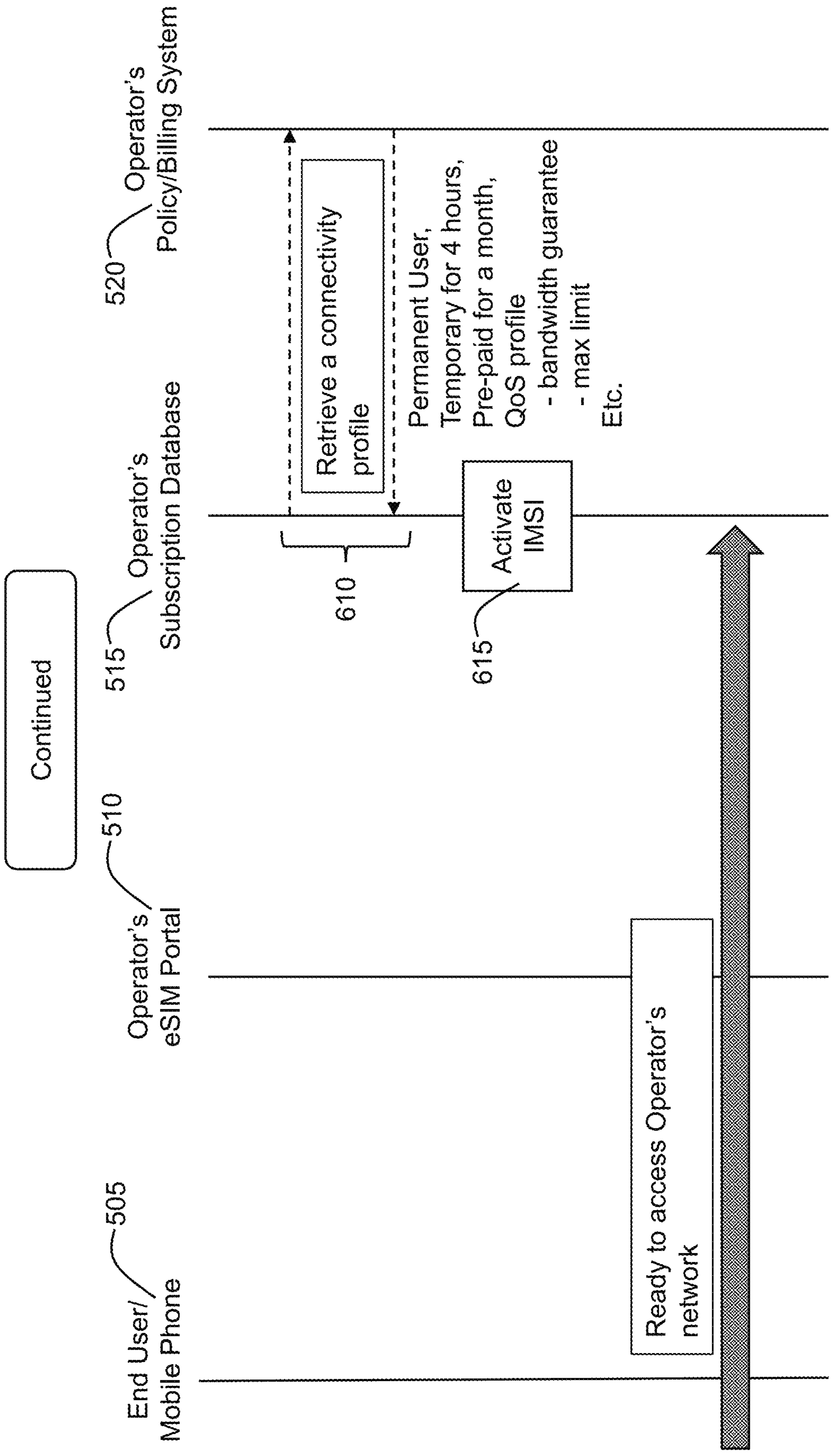

FIGS. 5 and 6 are swim-lane diagrams illustrating an eSIM activation process, according to an embodiment. The diagrams show interactions between various components involved, including the mobile phone 505, eSIM portal 510, subscription database 515, and policy/billing system 520. These components may correspond with counterparts illustrated in FIG. 3, described previously. Although FIGS. 5 and 6 indicate that the eSIM portal 510, subscription database 515, and policy/billing system 520 may all belong to a single operator (e.g., the operator of a facility network), embodiments are not so limited. In some embodiments, an eSIM portal may be operated and maintained by an entity different than the entity/entities operating the subscription database and/or the policy/billing system. In some embodiments, the eSIM portal, subscription database, and policy/billing system may be implemented by single physical server, or may be implemented using two or more physical servers, which may be at separate geographical locations.

In the embodiment illustrated in FIG. 5, the eSIM activation process may begin by the eSIM portal 510 providing the mobile phone 505 with a QR code, as illustrated by arrow 525. As previously noted and illustrated in FIG. 5, a QR code may be associated with a connection profile and may be mapped to a single IMSI or to multiple IMSIs. The eSIM portal 525 may provide the QR code via a kiosk (e.g., kiosk 425) or website in response to a purchase or other transaction initiated by the end user of the mobile phone 505, or may be provided on signage, tickets, and/or other materials. The mobile phone 505 can then be used to scan the QR code (as illustrated at action 530), which can prompt the mobile phone 505 to send a eSIM profile download request (e.g., via a URL) to the eSIM portal 510, as illustrated at arrow 535. This request may be sent via the Internet or other network connecting the mobile phone 505 with the eSIM portal 510, such as via an existing cellular network connection (e.g., as shown between mobile device 305 and cellular network 315 FIG. 3) or a Wi-Fi connection (which may be provided at the facility). If personalized (e.g., 1:1 QR code to IMSI ratio), the QR code may be generated on demand, and the corresponding download request may include personalized/unique information (e.g., via commands/parameters embedded in a URL). After receiving the request, the eSIM portal 510 can determine which eSIM profile is to be downloaded, as indicated at block 540.

In some embodiments, deciding which eSIM profile to be downloaded may be dependent on the connectivity profile or connectivity profile type associated with the QR code and subsequent eSIM profile download request. As noted, a network facility may establish different connectivity profiles to allow customizable connectivity for each user or user type, varying in features such as QOS, security, network accessibility, or device accessibility. The eSIM portal 510 may therefore determine the eSIM profile for the mobile phone 505 by associating an eSIM profile with a connectivity profile corresponding to the eSIM profile download request 535 or selecting an unused eSIM profile already associated with the correct connectivity profile. After downloading the eSIM profile, illustrated at arrow 545, the mobile phone 505 can install the eSIM profile and provide an acknowledgment of successful eSIM profile installation, as indicated at arrow 550. Responsive to the receipt of this acknowledgment, the eSIM portal 510 can provide an IMSI activation notification to the subscription database 515 to activate the IMSI on the facility network. In some embodiments, eSIM profile activation in the manner illustrated in FIGS. 5 and 6, or in an alternative manner for eSIM provisioning, may be provided in accordance with global standards (e.g., in accordance with related specifications of the Global System for Mobile Communications (GSM) Association).

FIG. 6 continues the process illustrated in FIG. 5, illustrating operations performed by the subscription database 515 and policy/billing system 520. After the subscription database 515 receives the IMSI activation notification, the subscription database 515 then retreat specifics regarding the connectivity profile for corresponding to the installed eSIM from the policy/billing system 520, as indicated at 610. In some embodiments, connectivity information associated with the eSIM profile by the eSIM portal 510 may be communicated to and maintained by the policy/billing system 520. In some embodiments, the connectivity information may be communicated to the subscription database 515 by the eSIM portal 510 together with the IMSI activation notification 555, and further relayed to the policy/billing system 520 (e.g., in the communication exchange indicated at 610). In some embodiments, the connectivity information provided to the policy/billing system 520 may comprise a general connectivity type (e.g., standard guest, premium guest, staff, or administrator), and the policy/billing system 520 can provide a specific connectivity profile (e.g., indicating QOS profile, access, etc., as shown in FIG. 6) associated with the connectivity type. In this manner, changes or updates to connectivity types may be maintained by the policy/billing system 520. In some embodiments, the connectivity information may be pre-provisioned by an operator such that each eSIM (and associated IMSI) corresponds to a particular connectivity profile. This enables the eSIM portal 510 to provide an eSIM to an end user that corresponds to the type of connectivity profile of the end-user. In such embodiments, when IMSI (or other information specific to an eSIM) is shared between the eSIM portal 510, subscription database 515, and/or policy/billing system 520, connectivity profile information (e.g., indicating QOS profile, access, etc.) can be determined from the IMSI. Depending on the billing arrangement (e.g., with the end-user), the policy/billing system 520 may be used to bill the end-user (e.g., on a one-time, scheduled, or periodic basis) and may therefore be used to verify payment has been made and, if so, the IMSI corresponding to the eSIM profile installed on the mobile phone 505 may be activated in the subscription database 515. Once the subscription database 515 verifies payment has been made and (e.g., optionally) the connectivity type from the policy/billing system 520, the subscription database 515 can then activate the IMSI on the facility network, as shown at block 615. If payment is not made and/or the end-user's subscription expires or lapses for some other reason, the policy/billing system 520 may indicate this to the subscription database 515, which can then deactivate the IMSI on the facility network.

Figure 7:
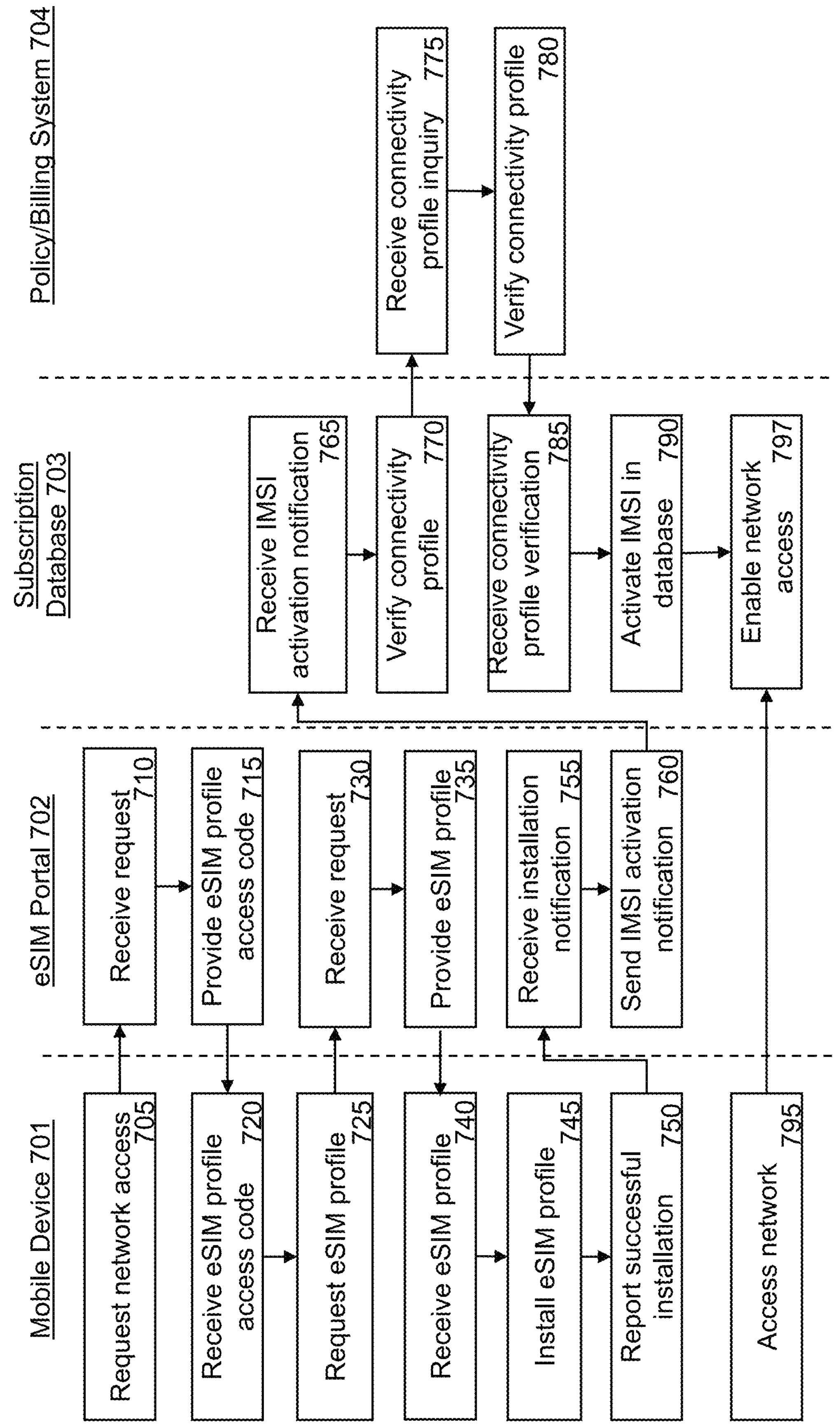
FIG. 7 is a swim-lane diagram illustrating another example eSIM activation process.
Figure 8:
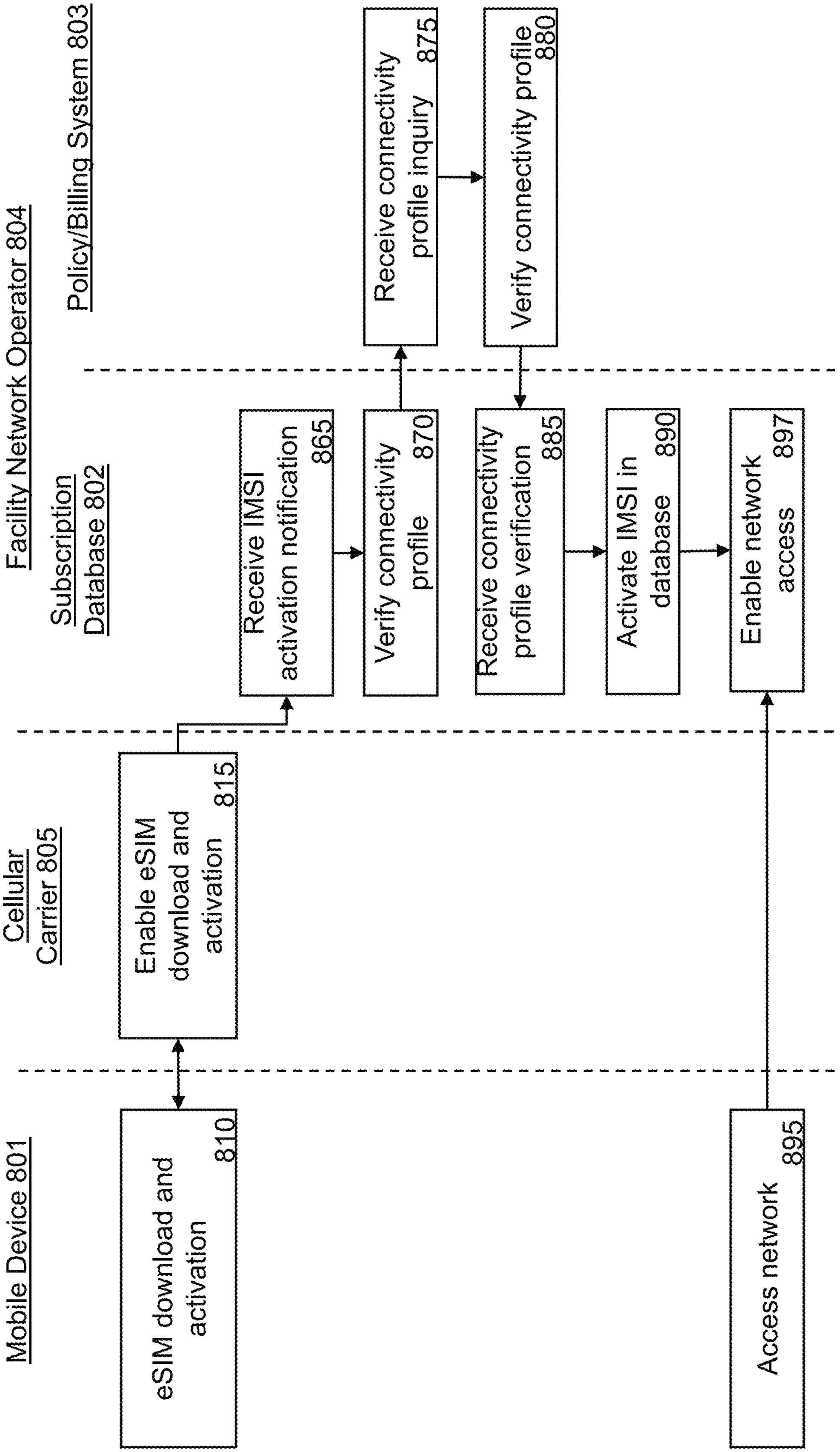
FIG. 8 is a swim-lane diagram illustrating yet another example eSIM activation process.

FIG. 7 is a swim-lane diagram showing another example eSIM activation process, according to an embodiment. In some aspects, FIG. 7 may be viewed as variation to or implementation of the eSIM activation process illustrated in FIGS. 5 and 6. In this example, components may comprise a mobile device 701, eSIM portal 702, subscription database 703, and policy/billing system 704. As noted, eSIM portal 702, subscription database 703, and policy/billing system 704 may be operated by a single operator or a combination of different operators (e.g., as illustrated in FIG. 8 and described hereafter). At block 705, the mobile device 701 requests network access from the eSIM portal 702. This request may be made via an existing Internet connection, for example, using a browser or app executed by the mobile device 701. At block 710, the eSIM portal 702 receives the network access request and provides an eSIM profile access code at block 715, which is received by the mobile device 701 at block 720. The eSIM profile access code may comprise a QR code (e.g., as indicated in previous figures), barcode, URL, and/or other information enabling the mobile device profile 701 to request the eSIM profile. In some embodiments, the eSIM profile access code may be customized to the mobile device 701 and may have information indicative of the customizations embedded therein. Responsive to receiving the eSIM profile access code, the mobile device 701 can then request to the eSIM profile at block 725, which is received by the eSIM portal 702 at block 730. The request may include information regarding any connectivity customizations for the mobile device 701. As noted, the eSIM portal 702 can then determine a particular eSIM profile corresponding to a connectivity profile or type associated with the eSIM profile access code. The eSIM portal 702 then provides the eSIM profile at block 735, which is received by the mobile device 701 at block 740. The mobile device 701 installs the eSIM profile at block 745, and sends a report of the successful installation at block 750, which is received by the eSIM portal 702 at block 755. The eSIM portal 702 then sends and IMSI activation notification at block 760, which is received by the subscription database 703 at block 765. At block 770, the subscription database 703 sends a connectivity profile inquiry to the policy/billing system 704, which is received at block 775. As noted, the policy/billing system 704 can verify a connectivity profile at block 780, verifying and/or providing specific profile information to the subscription database 703 and/or verifying payment that may be associated with the eSIM activation. The verification is received by the subscription database 703 at block 785, which, in turn, activates the IMSI in the subscription database 790. This enables the mobile device 701 to then access the network, as shown at block 795, which is enabled by the subscription database 703 at block 797, based on the active status of the IMSI in the subscription database 703.

FIG. 8 is a swim-lane diagram showing yet another example eSIM activation process, illustrating a variation to the processes shown in FIGS. 5-7. Similar to previous drawings, components include a mobile device 801, subscription database 802, and policy/billing system 803. In FIG. 8, however, the subscription database 802 and policy/billing system 803 our maintained by a facility network operator 804 that maintains and operates the facility network. Operations previously described as being performed by an eSIM portal (e.g., eSIM portal 710 or 702) may be performed by a cellular carrier 805 (e.g., a traditional cellular carrier), which may comprise, among other things, and eSIM portal similar to those previously described. At blocks 810 and 815, the mobile device 801 and a cellular carrier 805 may perform eSIM download inactivation, which may be performed in the manner shown in FIGS. 5-7, for example. In response to the activation, the cellular carrier may then send and IMSI activation notification 865 to the subscription database 802. The subscription database 802, policy/billing system 803, and mobile device 801 may then perform the functions shown at blocks 865-897 for activating the IMSI on the subscription database 802, which may correspond with blocks 765-797, the details of which are described above with regard to FIG. 7.

Figure 9:
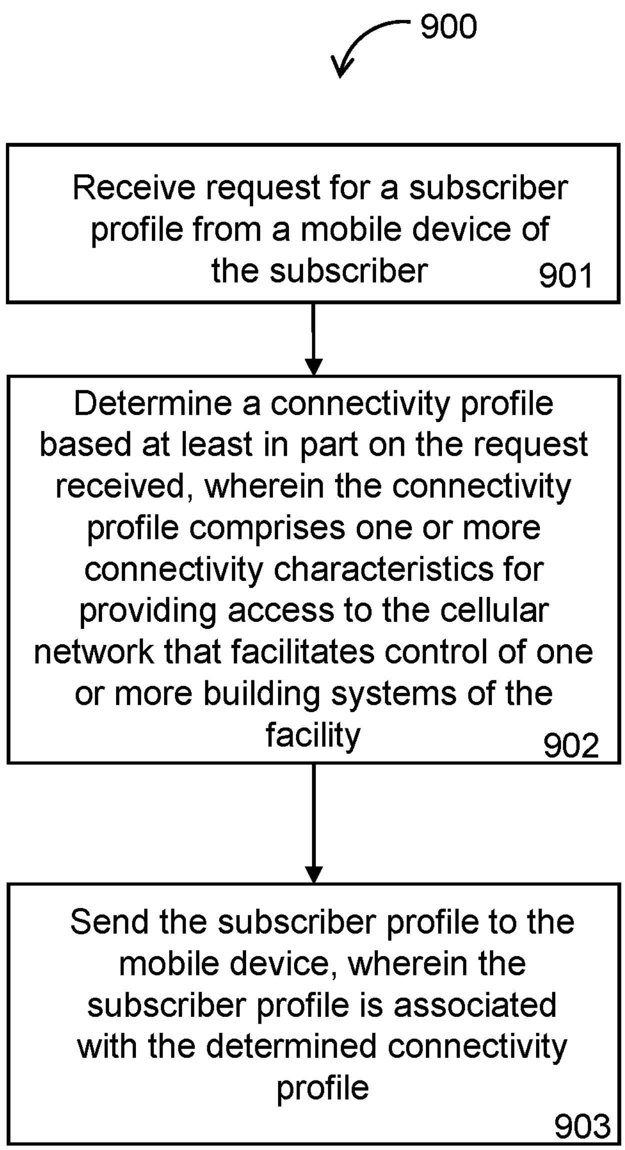
FIG. 9 shows a flowchart for a method for establishing enhanced cellular connectivity in a facility.

FIG. 9 shows a flowchart for a method 900 for of establishing subscriber identity in a cellular network of a facility, according to an embodiment. The method 900 may be performed by one or more components of the cellular network of the facility (e.g., an eSIM portal, subscription database, and/or policy/billing system) and/or a system comprising the cellular network of the facility. The method of FIG. 9 may be performed or directed by at least one controller (e.g., processor) coupled to the cellular network of the facility. The method of FIG. 9 may be performed or facilitated by a system comprising a network operatively coupled to the cellular network of the facility. The cellular network may comprise a wire configured to transit power and cellular communication. The cellular communication may abide by at least a fourth generation (4G), or a fifth generation (5G) cellular communication protocol (e.g., as defined by 3GPP or other wireless communication standards bodies). The cellular network may be of facilities that include the facility. The method 900 begins at 910, in which a request for a subscriber profile is received from a mobile device of the subscriber. As noted, the subscriber profile may comprise and eSIM profile and/or other information enabling the mobile device gain access to the cellular network of the facility. At 902, the method 900 comprises determining a connectivity profile based at least in part on the request received, wherein the connectivity profile comprises one or more connectivity characteristics for providing access to the cellular network that facilitates control of one or more building systems of the facility. The one or more connectivity characteristics may comprise a Qos level, an access level, a time during which access to the cellular network is granted or denied, and/or a bandwidth setting. The access level may comprise a level of access to (i) information accessible via the cellular network, (ii) a data network accessible via cellular network, and/or (iii) a device operatively coupled with the cellular network. Facilitating control of one or more building systems of the facility may comprise facilitating security, health, and/or environmental control of the facility. The cellular network may be operatively coupled to the one or more building systems. The one or more building systems may comprise a device ensemble having a housing that encloses the one or more devices that comprise: (i) sensors, (ii) a transceiver, or (iii) a sensor and an emitter. The device ensemble may be disposed in a fixture of the facility, or may be attached to a fixture of the facility. The fixture may comprise a framing portion. The one or more building systems may comprise a tintable window. The tintable window may comprise an electrochromic window. At 903, the functionality comprises sending the subscriber profile to the mobile device, wherein the subscriber profile is associated with the determined connectivity profile. As noted in the previously-described embodiments, the subscriber profile may comprise and/or be associated with an eSIM, which may be associated with a particular connectivity profile (e.g., in a subscriber database and/or policy/billing system).

In some embodiments, the method 900 may further (i) receiving an acknowledgment that the subscriber profile has been installed on the mobile device; and (ii) responsive to receiving the acknowledgement, activating the subscriber profile on the cellular network of the facility. Activating the subscriber profile may comprise sending an IMSI activation notification to a subscription database. The cellular network of the facility may be associated with a plurality of facilities, and activating the subscriber profile may comprise granting the mobile device access to the cellular network at least a subset of the plurality of facilities. Receiving the request (e.g., at block 902) may comprise receiving a URL. In such embodiments, the method 900 may further comprise, prior to receiving the request: (i) generating an indicator of the URL, and (ii) providing the indicator to the subscriber. The indicator may comprise the URL, a HyperText Markup Language (HTML) link, a QR code, or a bar code. Providing the indicator to the subscriber may comprise sending the indicator to a display, a kiosk, a web portal, a user device, or the mobile device. The URL may be unique to the subscriber, subscriber type, event, facility, or venue.

Figure 10:
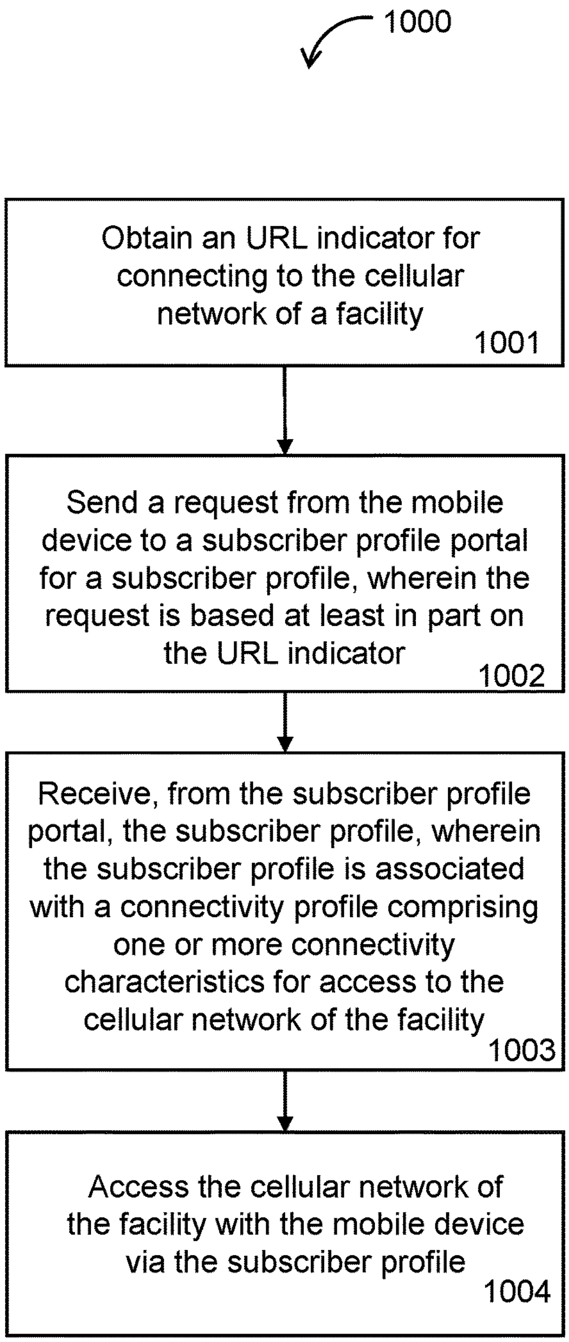
FIG. 10 shows a flowchart for a method for connecting a mobile device to a cellular network of a facility.

FIG. 10 shows a flowchart for a method 1000 for connecting a mobile device to a cellular network of a facility, according to an embodiment. The method 1000 may be performed by an eSIM-enabled (or similarly-enabled) mobile device. The method of FIG. 10 may be performed or facilitated by a system comprising a network operatively coupled to the cellular network of the facility. The cellular network may comprise a wire configured to transit power and cellular communication. The cellular communication may abide by at least a fourth generation (4G), or a fifth generation (5G) cellular communication protocol (e.g., as defined by 3GPP or other wireless communication standards bodies). The cellular network may be of facilities that include the facility. The method 1000 begins at 1010, in which a URL indicator for connecting to the cellular network of the facility is obtained. The indicator may comprise the URL, a HyperText Markup Language (HTML) link, a QR code, or a bar code. This may be obtained by the mobile device via a display, a kiosk, a web portal, a user device, or an application (e.g., app or browser) executed by the mobile device. The URL may be unique to the subscriber, subscriber type, event, facility, or venue. At 1002, a request from the mobile device is sent to a subscriber profile portal for a subscriber profile, wherein the request is based at least in part on the URL indicator. The URL indicator may, for example, have the request (which may include optional customizations) embedded therein. The subscriber profile may comprise and eSIM profile and/or other information enabling the mobile device gain access to the cellular network of the facility. At 1003, the subscriber profile is received from the subscriber profile portal, wherein the subscriber profile is associated with a connectivity profile comprising one or more connectivity characteristics for access to the cellular network of the facility. The one or more connectivity characteristics may comprise a QoS level, an access level, a time during which access to the cellular network is granted or denied, and/or a bandwidth setting. The access level may comprise a level of access to (i) information accessible via the cellular network, (ii) a data network accessible via cellular network, and/or (iii) a device operatively coupled with the cellular network. Facilitating control of one or more building systems of the facility may comprise facilitating security, health, and/or environmental control of the facility. The cellular network may be operatively coupled to the one or more building systems. The one or more building systems may comprise a device ensemble having a housing that encloses the one or more devices that comprise: (i) sensors, (ii) a transceiver, or (iii) a sensor and an emitter. The device ensemble may be disposed in a fixture of the facility, or may be attached to a fixture of the facility. The fixture may comprise a framing portion. The one or more building systems may comprise a tintable window. The tintable window may comprise an electrochromic window. At 1004, the functionality comprises accessing the cellular network of the facility with the mobile device via the subscriber profile. As noted in the previously-described embodiments, the subscriber profile may comprise and/or be associated with an eSIM, which may be associated with a particular connectivity profile (e.g., in a subscriber database and/or policy/billing system). Accessing the network may comprise installing the eSIM and confirming successful installation with the network.

In some embodiments, a controller receives inputs from various sources. For example, in some embodiments, the controller may receive inputs associated with cellular communications signals transmitted and/or received by one or more mobile devices within a facility, including a mobile device accessing a facility network via the methods described herein with respect to FIGS. 3-10. The inputs associated with the cellular communications signals may indicate a strength of the signal, a current usage of cellular communication by the one or more mobile devices (e.g., an amount of data transferred over a previous time window), or the like. As another example, in some embodiments, the controller may receive inputs that indicate a current or predicted occupancy of one or more regions of the facility. In some embodiments, inputs may be from one or more sensors that indicate current occupancy information of one or more particular regions (e.g., wings, floors, rooms, offices, common areas, outside areas, and/or other regions) of the facility. Example types of sensor data that may be received by a controller include electromagnetic radiation data (e.g., data associated with electromagnetic radiation in a visual spectrum, in an infrared spectrum, a radio frequency spectrum, ultrawideband radiation, or any combination thereof), geolocation signals (e.g., GPS signals, ultrawideband signals (UWB), short-range wireless signals, Bluetooth signals (BLE), ultra-high frequency signals (UHF), and/or other geolocation related signals), heat signatures determined by an infrared sensor, and/or any combination thereof. In some embodiments, inputs may be from scheduling information associated with the facility. For example, the scheduling information may indicate planned events (e.g., meetings, parties, and/or other planned events) that will occur in particular regions of the facility. The scheduling information may indicate timing information associated with a planned event, a planned location, a number of expected people at the planned event, or other suitable event information. Inputs (e.g., sensor data, scheduling information, and/or any other inputs) may be received from a cloud, from a server, and/or directly provided to the controller (e.g., by a user).

In some embodiments, a user is locatable in the enclosure (e.g., facility such as a building). The user can be located using one or more sensors, e.g., operatively couped to the network. The user may carry a tag (e.g., ID tag). The tag may include geolocation technology (e.g., geolocation chip such as a microchip). The geolocation technology and/or tag may include radio frequency identification (e.g., RFID) technology (e.g., transceiver), Bluetooth technology, and/or Global Positional System (GPS) technology. The radio frequency may comprise ultrawide band radio frequency. The tag may be sensed by one or more sensors disposed in the enclosure. The sensor(s) may be disposed in a device ensemble (e.g., ensemble of targets). The device ensemble may comprise a sensor or an emitter. The sensor(s) may be operatively (e.g., communicatively) coupled to the network. The network may have low latency communication, e.g., within the enclosure. The radio waves (e.g., emitted and/or sensed by the tag) may comprise wide band, or ultra-wideband radio signals. The radio waves may comprise pulse radio waves. The radio waves may comprise radio waves utilized in communication. The radio waves may be at a medium frequency of at least about 300 kilohertz (KHz), 500 KHz, 800 KHz, 1000 KHz, 1500 KHz, 2000 KHz, or 2500 KHz. The radio waves may be at a medium frequency of at most about 500 KHz, 800 KHz, 1000 KHz, 1500 KHz, 2000 KHz, 2500 KHz, or 3000 KHz. The radio waves may be at any frequency between the aforementioned frequency ranges (e.g., from about 300 KHz to about 3000 KHz). The radio waves may be at a high frequency of at least about 3 megahertz (MHz), 5 MHZ, 8 MHZ, 10 MHZ, 15 MHZ, 20 MHz, or 25 MHz. The radio waves may be at a high frequency of at most about 5 MHz, 8 MHZ, 10 MHZ, 15 MHZ, 20 MHZ, 25 MHZ, or 30 MHz. The radio waves may be at any frequency between the aforementioned frequency ranges (e.g., from about 3 MHz to about 30 MHZ). The radio waves may be at a very high frequency of at least about 30 Megahertz (MHZ), 50 MHZ, 80 MHZ, 100 MHZ, 150 MHZ, 200 MHZ, or 250 MHz. The radio waves may be at a very high frequency of at most about 50 MHz, 80 MHZ, 100 MHZ, 150 MHZ, 200 MHZ, 250 MHz, or 300 MHz. The radio waves may be at any frequency between the aforementioned frequency ranges (e.g., from about 30 MHz to about 300 MHZ). The radio waves may be at an ultra-high frequency of at least about 300 kilohertz (MHz), 500 MHZ, 800 MHZ, 1000 MHz, 1500 MHZ, 2000 MHZ, or 2500 MHz. The radio waves may be at an ultra-high frequency of at most about 500 MHz, 800 MHZ, 1000 MHZ, 1500 MHZ, 2000 MHZ, 2500 MHZ, or 3000 MHz. The radio waves may be at any frequency between the aforementioned frequency ranges (e.g., from about 300 MHz to about 3000 MHZ). The radio waves may be at a super high frequency of at least about 3 gigahertz (GHz), 5 GHZ, 8 GHZ, 10 GHZ, 15 GHZ, 20 GHZ, or 25 GHz. The radio waves may be at a super high frequency of at most about 5 GHZ, 8 GHZ, 10 GHZ, 15 GHZ, 20 GHz, 25 GHZ, or 30 GHz. The radio waves may be at any frequency between the aforementioned frequency ranges (e.g., from about 3 GHz to about 30 GHZ).

In some embodiments, the identification tag of the occupant comprises a location device. The location device (also referred to herein as "locating device") may compromise a radio emitter and/or receiver (e.g., a wide band, or ultra-wide band radio emitter and/or receiver). The locating device may include a Global Positioning System (GPS) device. The locating device may include a Bluetooth device. The locating device may include a radio wave transmitter and/or receiver. The radio waves may comprise wide band, or ultra-wideband radio signals. The radio waves may comprise pulse radio waves. The radio waves may comprise radio waves utilized in communication. The radio waves may be at a medium frequency of at least about 300 kilohertz (KHz), 500 KHz, 800 KHz, 1000 KHz, 1500 KHz, 2000 KHz, or 2500 KHz. The radio waves may be at a medium frequency of at most about 500 KHz, 800 KHz, 1000 KHz, 1500 KHz, 2000 KHz, 2500 KHz, or 3000 KHz. The radio waves may be at any frequency between the aforementioned frequency ranges (e.g., from about 300 KHz to about 3000 KHz). The radio waves may be at a high frequency of at least about 3 megahertz (MHz), 5 MHz, 8 MHZ, 10 MHZ, 15 MHZ, 20 MHZ, or 25 MHz. The radio waves may be at a high frequency of at most about 5 MHZ, 8 MHZ, 10 MHZ, 15 MHZ, 20 MHz, 25 MHZ, or 30 MHz. The radio waves may be at any frequency between the aforementioned frequency ranges (e.g., from about 3 MHz to about 30 MHZ). The radio waves may be at a very high frequency of at least about 30 Megahertz (MHz), 50 MHZ, 80 MHZ, 100 MHz, 150 MHZ, 200 MHZ, or 250 MHz. The radio waves may be at a very high frequency of at most about 50 MHZ, 80 MHZ, 100 MHZ, 150 MHZ, 200 MHZ, 250 MHz, or 300 MHz. The radio waves may be at any frequency between the aforementioned frequency ranges (e.g., from about 30 MHz to about 300 MHZ). The radio waves may be at an ultra-high frequency of at least about 300 kilohertz (MHz), 500 MHZ, 800 MHZ, 1000 MHZ, 1500 MHZ, 2000 MHZ, or 2500 MHz. The radio waves may be at an ultra-high frequency of at most about 500 MHZ, 800 MHZ, 1000 MHZ, 1500 MHZ, 2000 MHZ, 2500 MHZ, or 3000 MHz. The radio waves may be at any frequency between the aforementioned frequency ranges (e.g., from about 300 MHz to about 3000 MHZ). The radio waves may be at a super high frequency of at least about 3 gigahertz (GHz), 5 GHZ, 8 GHz, 10 GHZ, 15 GHZ, 20 GHZ, or 25 GHz. The radio waves may be at a super high frequency of at most about 5 GHZ, 8 GHZ, 10 GHZ, 15

GHZ, 20 GHZ, 25 GHZ, or 30 GHz. The radio waves may be at any frequency between the aforementioned frequency ranges (e.g., from about 3 GHZ to about 30 GHZ).

In some embodiments, a controller (e.g., as part of the control system) receives inputs from a server and/or from another controller, e.g., which predicts future occupancy information in one or more regions of a facility. In some embodiments, predictions may be generated using a neural network. For example, a neural network may take, as inputs, sensor data (e.g., that indicates occupancy information) and/or scheduling information, and may generate, as an output, a prediction of an occupancy level for a particular region of a building at a particular time or within a particular time window. An example prediction may be that a cafeteria region of the facility is likely to have a particular predicted occupancy (e.g., from about 50-100 people, from about 100-200 people, etc.) between 11 a.m.-1 p.m. Another example prediction may be that an auditorium region of the facility is likely to have a particular predicted occupancy (e.g., from about 10-20 people, from about 20-30 people, etc.) on a particular day of the week at a particular time (e.g., time window, or time period), for example, a day and time corresponding to a weekly staff meeting. A neural network may generate predictions based at least in part on sensor data obtained over any suitable time period (e.g., a previous week, a previous month, a previous year, and/or any other time period). In some embodiments, the neural network may be updated based on newly obtained sensor data to generate updated occupancy predictions. The neural network may comprise a machine learning computational scheme. A neural network may be a deep neural network (e.g., a Convolutional Neural Network, a Recurrent Neural Network, a Long Short-Term Memory Network, or the like). In some embodiments, the neural network may be a classifier that generates a prediction that an occupancy of a particular region of a facility will fall within a particular occupancy range.

Figure 11:
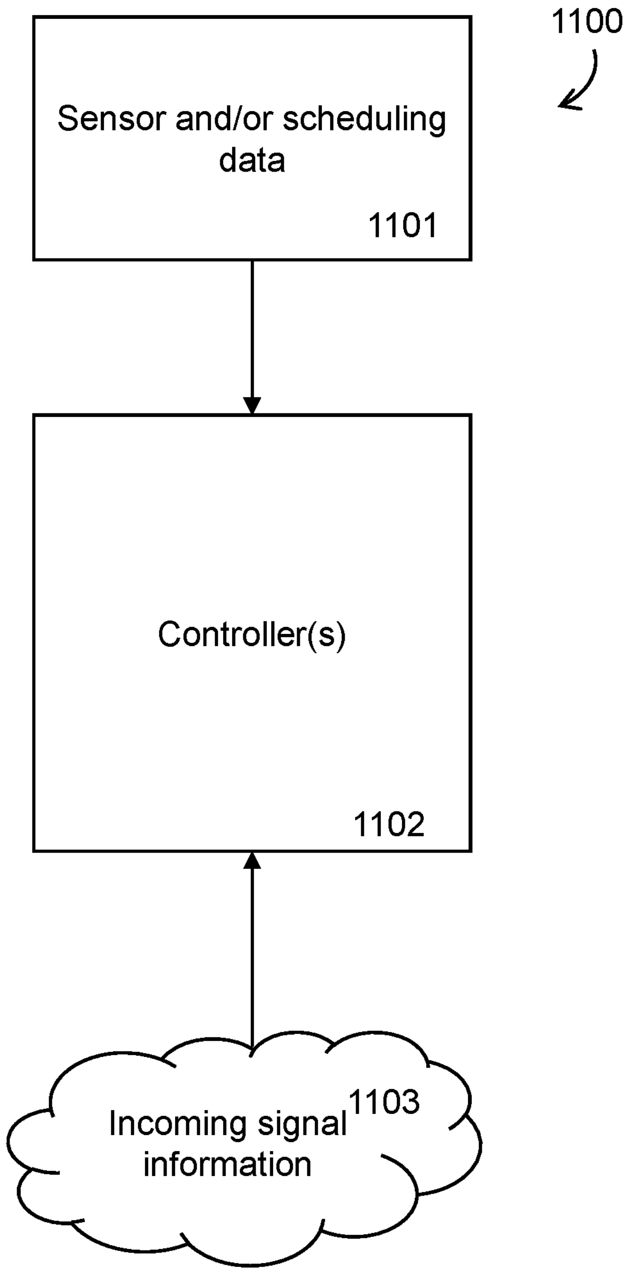
FIG. 11 is a system diagram of an example system for routing signals.

FIG. 11 shows an example of a schematic diagram 1100 of information sources for a controller. In the example shown in FIG. 11, one or more controller(s) 1102 receives sensor and/or scheduling data 1101. The one or more controller(s) 1102 may be local controllers (e.g., local to the facility, coupled to a local network of the facility, or other local controllers). In some embodiments, the one or more controller(s) 1102 may have a cloud component. The sensor and/or scheduling data 1101 may be received from a cloud, from a server, and/or may be directly provided to controller(s) 1102.

In some embodiments, data is analyzed by an artificial intelligence learning module. The data can be sensor data, schedule data, and/or user input. The learning module may comprise at least one rational decision making process, and/or learning that utilizes the data (e.g., as a learning set). The analysis of the data may be utilized to adjust and environment, e.g., by adjusting one or more components that affect the environment of the enclosure. The analysis of the data may be utilized to control a certain target apparatus, e.g., to produce a product, according to user preferences, and/or choose the certain target apparatus (e.g., based on user preference and/or user location). The data analysis may be performed by a machine based system (e.g., comprising a circuitry). The circuitry may be of a processor. The sensor data analysis may utilize artificial intelligence. The data analysis may rely on one or more models (e.g., mathematical models). In some embodiments, the data analysis comprises linear regression, least squares fit, Gaussian process regression, kernel regression, nonparametric multiplicative regression (NPMR), regression trees, local regression, semiparametric regression, isotonic regression, multivariate adaptive regression splines (MARS), logistic regression, robust regression, polynomial regression, stepwise regression, ridge regression, lasso regression, elasticnet regression, principal component analysis (PCA), singular value decomposition, fuzzy measure theory, Borel measure, Han measure, risk-neutral measure, Lebesgue measure, group method of data handling (GMDH), Naive Bayes classifiers, k-nearest neighbors algorithm (k-NN), support vector machines (SVMs), neural networks, support vector machines, classification and regression trees (CART), random forest, gradient boosting, or generalized linear model (GLM) technique. The data analysis may include a deep learning algorithm and/or artificial neural networks (ANN). The data analysis may comprise a learning schemes with a plurality of layers in the network (e.g., ANN). The learning of the learning module may be supervised, semi-supervised, or unsupervised. The deep learning architecture may comprise deep neural networks, deep belief networks, recurrent neural networks, or convolutional neural networks. The learning schemes may be ones utilized in computer vision, machine vision, speech recognition, natural language processing, audio recognition, social network filtering, machine translation, bioinformatics, drug design, medical image analysis, material inspection programs, and/or board game programs.

In some embodiments, a controller (e.g., a small cell controller) associated with a facility determines a configuration for routing signals between one or more small cell devices and one or more RAUs. The controller may determine the configuration based on signal information (e.g., current signal strength information, current cellular communication network usage information, and/or any other signal information), current occupancy information, predicted occupancy information, and/or any combination thereof. In some embodiments, signal strength information may be predicted based at least in part on factors such as a building shape, locations of antennas with respect to locations of mobile devices, building construction material, or the like. For example, a relatively weak signal strength may be predicted in instances in which a mobile device is relatively far from one or more antennas, in instances in which a mobile device is in a region of the facility that has a particular type of wall that blocks radio frequency (RF) signals, and/or any combination thereof.

In some embodiments, current and/or predicted occupancy information is used to determine a configuration for routing signals between one or more small cell devices and one or more RAUs. For example, a configuration may be determined that allocates two or more small cell devices to a single RAU associated with a particular floor or region of the facility, e.g., in response to receiving input information that indicates more than a predetermined occupancy (e.g., current and/or predicted occupancy) in the particular floor or region of the facility associated with the single RAU. The predetermined occupancy may be a number of people (e.g., a measured or predicted number of people), a relative occupancy increases relative to normal or typical occupancy (e.g., a 10% increase, a 20% increase, and/or any other suitable increase), and/or any other suitable occupancy metric. The increase may be measured in percentages or in headcount. As another example, a configuration may be determined that allocates one small cell device to one or more RAUs associated with particular floors or regions of the facility in response to receiving input information that indicates less than a predetermined occupancy (e.g., current and/or predicted occupancy) in the particular floors or regions of the facility associated with the one or more RAUS.

In some embodiments, a configuration is based at least in part on capacities of one or more small cell devices. For example, a configuration may be determined based at least in part on a flex or reserve capacity of a small cell device. A flex or reserve capacity of a small cell device may indicate a capacity headroom of the small cell device beyond typical (e.g., average) usage of the small cell device. For example, a configuration may be determined such that a small cell device is to route signals to and from a plurality of RAUs, where a number of RAUs in the plurality of RAUs is determined based at least in part on the flex or reserve capacity (e.g., such that the number of RAUs does not cause the small cell device to exceed its capacity). Capacity of a small cell device may be determined based at least in part on a bandwidth of the small cell device. A bandwidth of a small cell device may indicate a number of devices (e.g., mobile devices or UEs) the small cell device can support.

In some embodiments, a configuration for routing signals between one or more small cell device(s) of a facility and one or more RAUs associated with the facility is based at least in part on usage information associated with the facility. The usage information may comprise occupancy information in the facility. The occupancy information may comprise current occupancy information associated with the facility and/or predicted occupancy information associated with the facility. Occupancy information may be determined based at least in part on sensor data, scheduling information, outputs of one or more machine learning models, and/or any combination thereof. The sensor data may be obtained by occupancy sensors. The occupancy sensors may comprise visible sensors (e.g., camera), IR sensors (e.g., IR camera), geolocation sensors, identification tags, sound sensors, carbon dioxide sensors, VOC sensors, oxygen sensors, particulate matter sensors, or humidity sensors. At times, sensor data may be analyzed (e.g., integrated), and the analysis of the sensor data may provide occupancy determination and/or prediction. The analysis may be directed and/or performed by the controller(s). The analysis may be performed by processors operatively coupled to the controller(s) (e.g., as part of the control system of the facility). The sensors may be couped to the network of the facility. At least one of the sensors may be disposed internally in the facility (e.g., in the building). At least one of the sensors may be disposed externally to the facility (e.g., outside the building).

In some embodiments, current occupancy information indicates a number of people (personnel) at particular locations or regions of a facility at a present time. Examples of current occupancy information include X people currently in the cafeteria, Y people currently on the $10^{th}$ floor, Z people currently on the outside patio, etc., where X, Y and Z are integers. In some embodiments, current occupancy information may be determined based at least in part on sensor data. Examples of sensor data that may be used to determine current occupancy information include sensor data from shortrange wireless beacon devices (e.g., ID tags), RF sensing data, geolocation data (e.g., GPS data, or other positioning data), data from ultrawideband tags or beacons, infrared data (e.g., that indicate presence of a person in a particular region), data from one or more camera devices, and/or any combination thereof. In some embodiments, current occupancy information may be estimated. Current occupancy information may be estimated based at least in part on sensor data, scheduling information, or any combination thereof. For example, in some embodiments, current occupancy information may be estimated based at least in part on scheduling information (e.g., based at least in part on a calendared event that is associated with a particular number of invitees) and adjusted based at least in part on sensor data.

In some embodiments, predicted occupancy information indicates a number of people (personnel) at particular locations or regions of a facility at a future time. In some embodiments, predicted occupancy information may be for a specific future date and/or time, such as for a date and/or time at which an event has been scheduled (e.g., as indicated in one or more calendars associated with the facility). In some embodiments, predicted occupancy information may be for a recurring day of the week, day of the month, or the like. For example, predicted occupancy information may indicate an estimation of X people in an auditorium region of a facility at a day of the week and time of day corresponding to a weekly meeting, an estimation of Y people in an entryway of a facility on weekdays at times of day corresponding to a typical work start time or end time, or the like. In some embodiments, predicted occupancy information may be determined using a trained machine learning model (e.g., using AI). For example, the trained machine learning model may generate outputs that indicated predicted occupancies at particular days and/or times of day. In one example, the trained machine learning model may predict occupancy information for particular recurring days of the week, days of the month, times of day, etc. In other example, the trained machine learning model may identify occupancy information at particular times that correspond to a start time and/or end time of a typical workday. As another example, the trained machine learning model may identify occupancy information that indicates that people tend to gather on Friday evenings in a particular region. A trained machine learning model may take sensor data, scheduling information, or any combination thereof as inputs (e.g., as a learning set). The learning set may comprise historical occupancy data, e.g., obtained by any of the occupancy means described herein. A machine learning model may be retrained, for example, once per week, once per month, and/or at any other timepoints. The machine learning model may be trained (or re-trained) in real time and/or in times of low occupancy in the facility (e.g., during the night or work hours for a home; during off work hours, weekend, and holidays for a workplace; during weekdays for a recreational center or for a shopping mall).

Figure 12:
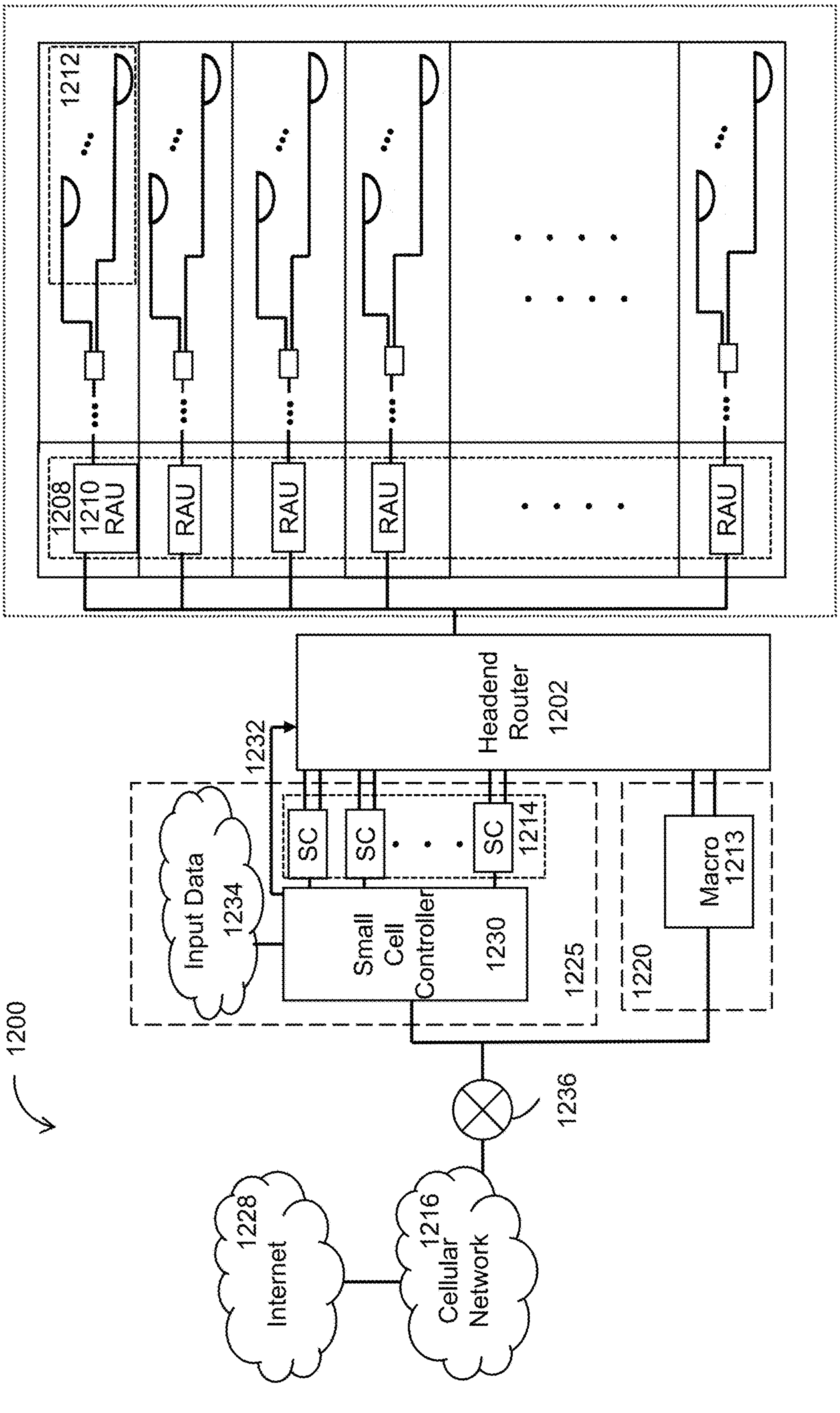
FIG. 12 schematically shows routing of signals associated with a facility.

FIG. 12 shows an example a schematic diagram 1200 of an example of a system for routing signals. In the example shown in FIG. 12, a headend router 1202 routes signals between a macro cell 1204 and RAUs 1208. Each RAU of RAUs 1208 is communicatively coupled to one or more antennas (e.g., a DAS). For example, RAU 1210 is communicatively coupled to antennas 1212. Each RAU may be associated with a coverage area (e.g., a part of, or an entire, floor of a building). Macro cell 1213 and small cell devices 1214 are communicatively coupled to a cellular network 1216. Cellular network 1216 provides a connection between macro cell 1204 and Internet 1228. PDN GW 1218 acts as an interface between the cellular network 1216 and other packet data networks, such as Internet 1228 and/or Session Initiation Protocol (SIP)-based IP Multimedia Subsystem (IMS) networks.

A small cell controller 1230 determines a configuration for headend router 1202 to route signals between small cell devices 1214 and RAUs 1208. The small cell controller 1230 can be part of control system, e.g., as disclosed herein. Small cell controller 1230 provides a control signal 1232 to headend router 1202. The control signal 1232 may indicate the configuration for headend router 1202 to route signals between small cell devices 1214 and RAUs 1208. Small cell controller 1230 determines the configuration based at least in part on input data 1234. Input data 1234 may be obtained from one or more servers or control systems associated with the building. Switch 1236 connects network 1216 to small cell controller 1230. Switch 1236 operatively couples to network 1216 to a network of the facility (e.g., a local network of a building). Operatively coupling may comprise communication and/or power coupling.

In some embodiments, the cellular network 1216 may comprise a 5G network. In such embodiments, headend router 1202 may optionally receive a 5G signal from a macro gNodeB (gNB) cell. A cellular network 1216 comprising a 5G network may include a Session Management Function (SMF), a User Plane Function (UPF), and an Access and Mobility Function (AMF). A cellular network 1216 comprising a 5G network may provide a connection between small cell devices 1214 and Internet 1228. An SMF may be responsible for interacting a decoupled data plane, creating, updating, and/or removing Protocol Data Unit (PDU) sessions, managing session context with a UPF, allocating IP addresses of User Equipment (UE) devices, any combination thereof, or other functions. A UPF may be responsible for (1) packet routing and/or forwarding, (2) packet buffering for UEs in an idle mode, (3) any combination thereof, or (4) other functions. An AMF may be responsible for handling connection and/or mobility management tasks.

In some embodiments, the cellular network 1216 may comprise a 4G network. In such embodiments, the cellular network 1216 comprising the 4G network may include a Packet Data Network (PDN) Gateway (GW), a serving GW, and/or a mobility management entity (MME). A serving GW may perform various functions, such as (i) routing and forwarding user plane data packets, (ii) serving as a mobility anchor point during handovers between the 4G core network and other core networks (e.g., a 2G network, a 3G network, and/or other networks) in the user plane, (iii) buffering downlink data packets for UEs in an idle mode, and/or (iv) any combination thereof. An MME may perform various functions, such as (I) selecting PDN gateways and/or serving GWs, (II) authenticating a user (e.g., by interacting with a Home Subscriber Server), (III) paging and tagging UEs in idle mode, (IV) providing control plane mobility between the 4G core network and other core networks (e.g., a 2G network, a 3G network, and/or other networks), and/or (V) any combination thereof.

In some embodiments, at least one small cell controller (e.g., as part of a control system) dynamically adjusts the coverage areas of one or more small cell devices in a facility (e.g., comprising a building). The coverage area of at least one (e.g., each) small cell device may be changed to different locations and coverage ranges throughout the facility, e.g., based at least in part on actual and/or predicted usage needs. For example, a small cell device that currently serves a particular coverage area on the first floor of a building may be reassigned to serve a coverage area on the sixth floor of the building. For example, a small cell device that currently serves a first building of a facility may be reassigned to serve a coverage area on a second building of the facility. A plurality of coverage areas currently served by a plurality of small cell devices may be reassigned to be served by a single small cell device. A single coverage area currently served by a single small cell device may be reassigned to be served by a plurality of small cell devices (e.g., having a contacting or an overlapping range). In some embodiments, the ability of the small cell controller(s) to dynamically adjust the coverage areas of a small cell device promotes efficient use of the capacity of the small cell device through flexible allocation.

In some embodiments, the small cell controller(s) adjusts coverage areas of one or more small cell devices. The small cell controller(s) may adjust the coverage areas of one or more small cell devices by changing the routing of signals between one or more small cell devices and one or more Radio Access Units (RAUs) associated with the facility. The RAUs may be geographically dispersed in the facility (e.g., having a plurality of enclosures). An RAU may be communicatively coupled to one or more antennas. The one or more antennas may collectively function as a distributed antenna system (DAS). The one or more antennas may correspond to a particular coverage area. For example, an RAU may serve a dedicated region of a facility. For example, a particular RAU may be placed on a particular floor of a building, in a particular wing of a building, in a particular building of the facility, or any combination thereof. By changing the routing of signals between small cell devices and RAUs, the small cell controller can enlarge, reduce, re-locate, and/or otherwise change the coverage area of at least one (e.g., each) small cell device, thereby modifying how small cell capacity is deployed throughout the facility.

In some embodiments, signals are routed between one or more small cell devices and one or more RAUs. The signals being routed between a small cell device and an RAU comprise upstream and downstream cellular communication signals along the path between a User Equipment device (UE) and a network, such as a cellular communication core network (e.g., a 5G core network). The network may be configured to transmit and/or receive data according to at least a second generation (2G), third generation (3G), fourth generation (4G), or fifth generation (5G) cellular communication protocol. The network may provide a connection to the Internet. Communications between the network and a UE may be bidirectional or monodirectional. For example, communications between the network and a UE may be bidirectional, including downstream data (e.g., from the core network to a UE) and upstream data (e.g., from a UE to the core network). Along this path, the signals routed between small cell devices(s) and the RAU(s) may be analog signals or digital signals. In instances in which the signals comprise analog signals, the signals may comprise baseband signals or intermediate frequency (IF) signals. For example, in the downstream direction, a small cell device may modulate downstream data (e.g., bits representing network traffic, audio signals, and/or other data) from the network and modulate the downstream data into a downstream baseband or IF signal, which is routed to an RAU. The RAU may upconvert the downstream baseband or IF signal to a radio frequency (RF) frequency for transmission to UEs within a particular coverage area. In the upstream direction, a UE may transmit an RF frequency signal that is received by an RAU. The RAU may down-convert the RF signal to an upstream baseband or IF signal, which may be routed to a small cell device. The small cell device may demodulate the upstream baseband, or IF signal, into upstream data (e.g., bits representing network traffic, audio signals, and/or other data), and send the upstream data to the core network. In instances in which the signals routed between small cell device(s) and the RAU(s) are digital signals, the RAU(s) may receive digital signals (e.g., digitized representations of downstream signals from a cellular core communication core network). The RAU(s) may up-sample and/or upconvert the digital signals to an RF frequency signal. An RAU may then cause one or more antennas (e.g., a DAS) to transmit the RF frequency signal. In the downstream direction, the RAU may down-convert a received RF signal. The RAU may down-sample the down-converted RF signal. The down-converted RF signal may be transmitted to one or more small cell devices as a digitized representation of the received RF signal.

In some embodiments, the small cell device(s) and the RAU(s) are operatively coupled to a router. The router (e.g., a headend router) may provide a physical switching capability for routing signals between one or more small cell devices and one or more RAUs associated with the facility. The physical switching capability may be provided according to a programmable routing configuration. The programmable routing configuration may be dynamically altered, e.g., in real time. The programmable routing configuration may be pre-programmed. A small cell controller may provide the routing configuration and, e.g., thereby control the router. The small cell controller may determine the configuration based at least in part on input data. The input data may be received though the network. For example, the input data may be received from a control system, from sensor(s) and/or from server associated with a facility. The control system may include, or be separate from, the small cell controller. In some embodiments, a control system configured to control the facility includes the small cell controller.

In certain embodiments, a building network infrastructure has a vertical data plane (between building floors) and a horizontal data plane (all within a single floor or multiple (e.g., contiguous) floors). In some cases, the horizontal and vertical data planes have at least one (e.g., all) data carrying capabilities and/or components that is (e.g., substantially) the same or similar data. In other cases, these two data planes have at least one (e.g., all) different data carrying capabilities and/or components. For example, the vertical data plane may contain one or more components for fast data transmission rates and/or bandwidths. In one example, the vertical data plane contains components that support at least about 10 Gigabit/second (Gbit/s) or faster (e.g., Ethernet) data transmissions (e.g., using a first type of wiring (e.g., UTP wires and/or fiber optic cables)), while the horizontal data plane contains components that support at most about 8 Gbit/s, 5 Gbit/s, or 1 Gbit/s (e.g., Ethernet) data transmissions, e.g., via a second type of wiring (e.g., coaxial cable). In some cases, the horizontal data plane supports data transmission via G.hn or Multimedia over Coax Alliance (MoCA) standards (e.g., MoCA 2.5 or MoCA 3.0). In some embodiments, G.hn is a specification for local (e.g., facility such as home) networking. The G.hn specification may facilitate operation over four types of wires comprising telephone wiring, coaxial cables, power lines, or plastic optical fiber. A G.hn semiconductor device may be able to network over any of the supported wire types in the facility (e.g., lowering installation and/or deployment costs). In some embodiments, MoCA publishes standard specifications for networking (e.g., Ethernet link) over coaxial cables. In certain embodiments, connections between floors on the vertical data plane employ control panels with high speed (e.g., Ethernet) switches that pair communication between the horizontal and vertical data planes and/or between the different types of wiring. These control panels can communicate with (e.g., IP) addressable nodes (e.g., devices) on a given floor via the communication (e.g., G.hn or MoCA) interface and associated wiring (e.g., coaxial cables, twisted cables, and/or optical cables) on the horizontal data plane. Horizontal and vertical data planes in a single building structure are depicted in FIG. 1.

In some embodiments, a small cell controller transmits a configuration for routing signals between one or more small cell devices associated with a facility (e.g., a building) and one or more RAUs associated with the facility. The small cell controller may determine the configuration, e.g., based at least in part on current and/or predicted (e.g., future) usage of the small cell devices by one or more mobile devices in the facility.

In some embodiments, the headend router receives the configuration from the controller(s) (e.g., from the small cell controller). The controller can be part of the control system, e.g., as disclosed herein. The headend router may route downstream signals based at least in part on the configuration. For example, a small cell device of the one or more small cell devices may receive downstream data (e.g., bits representing network traffic, audio signals, and/or other data) from a network (e.g., a 4G network, a 5G network, or other network). The small cell device is communicatively coupled to the network. The downstream data may be for a particular UE (e.g., mobile device) in the facility. Downstream signals transmitted from one or more small cell devices to one or more RAUs may be analog signals or digital signals. In an instance in which the signals are analog signals, in response to receiving the downstream data, the small cell device may modulate the downstream data into a downstream signal (e.g., baseband or intermediate frequency (IF) signal). In an instance in which the downstream signals are digital signals, the small cell device may transmit a digitized representation of the received downstream signal. For example, the digitized representation may comprise the received downstream signal sampled at a particular sampling rate (e.g., at least about the Nyquist frequency). The small cell device may transmit the downstream signal to the headend router. The headend router may manipulate one or more downstream signals, including the downstream signal received from the small cell device. Manipulation of the downstream signals may be programmable. For example, in an instance in which the configuration indicates that downstream signals from two or more small cell devices (e.g., two, three, five, ten, or the like) including the small cell device that transmitted the downstream signal are to be routed to a single RAU, the headend router may combine downstream signals from the two or more small cell devices. In some embodiments, such as in an instance in which the downstream signals are analog signals, the headend router may combine downstream signals from the two or more small cell devices, each occupying a different frequency band, into a single broadband signal and route the broadband signal to the RAU. In some embodiments, such as in an instance in which the downstream signals are digital signals, the headend router may combine the digital signals from the two or more small cell devices and route the combined digital signals to the RAU. As another example, in an instance in which the configuration indicates that downstream signals from one small cell device are to be routed to two or more RAUs (e.g., two, three, five, ten, or the like), the headend router may split the downstream signal from the one small device into a plurality of versions of the same downstream signal and route each version to a corresponding one of the two or more RAUs.

In some embodiments, the downstream signals are be provided to the one or more RAUs via one or more cables. In some embodiments, the one or more cables may be optical cables, coaxial cables, twisted cable, and/or any combination thereof. The one or more cables may be any cable disclosed herein. The cabling may be considered part of a network of the facility (e.g., part of a local network of the facility). For example, in some embodiments, one or more optical cables may be used to carry downstream signals from the headend router to a particular floor or region of the facility. In some embodiments, one or more coaxial cables may be used to carry downstream signals within a particular floor or region of the facility to a particular RAU. In some embodiments, for example, in instances in which the downstream signal comprises analog signals, the headend router may amplify the downstream signal. For example, in some embodiments, the headend router may amplify the downstream signal according to information received from the small cell controller. Examples for cabling, network, targets (e.g., devices) and control system can be found in International Patent Application Serial No. PCT/US21/17946, filed Feb. 12, 2021; and in U.S. patent application Ser. No. 17/083,128, filed Oct. 28, 2020, each of which is incorporated herein by reference in its entirety.

In some embodiments, an RAU receives a downstream signal from the headend router. The RAU may then up-convert the downstream signal. For example, the RAU may up-convert the downstream signal to an RF frequency band associated with one or more antennas communicatively coupled to the RAU. In instances in which the downstream signal received from the headend router comprises digital signals, the RAU may up-sample the downstream signal. The RAU may then up-convert the up-sampled downstream signal. For example, the RAU may up-convert the up-sampled downstream signal to an RF frequency associated with one or more antennas communicatively coupled to the RAU. The RAU may cause the one or more antennas to transmit the up-converted downstream signal. In some embodiments, the one or more antennas may amplify the downstream signal.

In some embodiments, the headend router routes upstream signals based at least in part on the configuration. For example, an RAU receives an upstream signal from one or more antennas communicatively coupled to the RAU. The RAU may then down-convert the upstream signal. For example, in an instance in which upstream signals transmitted from the RAU to one or more small cell devices comprise analog signals, the RAU may down-convert the upstream signal to a baseband frequency or an intermediate frequency (abbreviated herein as "IF"). The RAU may transmit the down-converted upstream signal to the headend router. As another example, in an instance in which the upstream signals transmitted from the RAU to the one or more small cell devices comprise digital signals, the RAU may down-convert the upstream signal to a baseband frequency or an IF. The RAU may down-sample the down-converted upstream signal to generate a digitized representation of the upstream signal.

In some embodiments, the upstream signals are provided to the headend router from the RAU via one or more cables. In some embodiments, the one or more cables may be optical cables, coaxial cables, and/or any combination thereof. The cabling may be considered part of a network of the facility (e.g., part of a local network of the facility). For example, in some embodiments, one or more optical cables may be used to carry upstream signals from an RAU on a particular floor or in a particular region of the facility to the headend router. In some embodiments, one or more coaxial cables may be used to carry upstream signals within a particular floor or region of the facility to a particular RAU.

The headend router may manipulate one or more upstream signals, including the upstream signal received from the RAU. Manipulation of the upstream signals may be programmable. For example, in an instance in which the configuration indicates that upstream signals from two or more RAUs (e.g., two, three, five, ten, or the like) including the RAU that transmitted the upstream signal are to be routed to a single small cell device, the headend router may combine upstream signals from the two or more RAUs. In some embodiments, the headend router may combine upstream signals from the two or more RAUs to be routed to the small cell device. For example, in an instance in which the upstream signals comprise analog signals, the headend router may combine the upstream signals from the two or more RAUs to a single frequency band. As another example, in an instance in which the configuration indicates that upstream signals from one RAU are to be routed to two or more small cell devices (e.g., two, three, five, ten, or the like), the headend router may split the upstream signal from the one RAU into a plurality of upstream signals and route each upstream signal to a corresponding small cell device. For example, in an instance in which the upstream signals comprise analog signals, the headend router the plurality of upstream signals may be associated with different frequency bands.

In some embodiments, a controller determines a configuration for routing signals between one or more small cell devices and one or more RAUs. The controller may be a small cell controller that transmits an indication of the configuration, for example, to a router (e.g., a headend router) associated with a facility. In some embodiments, at least a portion of the controller may have a cloud component. In some embodiments, the controller may be part of a control system associated with the facility. For example, the controller may be part of a control system associated with the facility that controls a lighting system, an HVAC system, or the like.

In some embodiments, current and/or predicted occupancy information is determined based at least in part on scheduling information. The scheduling information may comprise calendar information, such as one or more calendars associated with the facility. The calendars may be associated with particular regions, floors, rooms, etc. of the facility, such as a calendar to reserve a particular location for an event. The calendars may be associated with one or more people, for example, who work in the facility, who manage the facility, or the like.

In some embodiments, usage information associated with devices in a facility is used to determine a channel sharing protocol for a plurality of small cells routed to an RAU. The device may be a service device (e.g., device that is utilized by personnel in the facility). The service device may be a factory machinery, a printer, or a vending machine. For example, in instances in which small cells transmit analog data, usage information may be used to determine a channel sharing protocol such that a plurality of small cells share a channel allocated to a single RAU. Examples of channel sharing protocols include Frequency-division multiple access (FDMA), time-divisional multiple access (TDMA), code-division multiple access (CDMA), and/or space-division multiple access (SDMA).

In some embodiments, the control system is operatively coupled to one or more targets of the facility, and is configured to control the one or more targets (e.g., devices). For example, the control system may control mechanical, electrical, electromechanical, and/or electromagnetic (e.g., optical and/or thermal) actions of the target. For example, the control system may control a physical action of the target. For example, the control system may control if the target apparatus is turned on or off, if any controllable compartment thereof is open or closed, direct directionality (e.g., left, right, up, down), enter and/or change settings, enable or deny access, transfer data to memory, reset data in the memory, upload and/or download software or executable code to the target apparatus, cause executable code to be run by a processor associated with and/or incorporated in the target apparatus, change channels, change volume, causing an action to return to a default setting and/or mode. The control system may change a set-point stored in a data set associated with the target, configure or reconfigure software associated with the target. The memory can be associated with and/or be part of the target. The control system may include the small cell controller(s).

In some embodiments, the target is operatively (e.g., communicatively) coupled to the network (e.g., communication, power and/or control network) of the facility. Once the target becomes operatively coupled to the network of the facility, it may be part of the targets controlled via the control system. A target may be a device (e.g., a sensor or an emitter). A target (e.g., third party target) may offer one or more services to a user. For example, the target (e.g., target apparatus) may be a dispenser. The dispenser may dispense food, beverage, and/or equipment, upon a command. The target may be a service device. The service device may include media players (e.g., which media may include music, video, television, and/or internet), manufacturing equipment, medical device, and/or exercise equipment. The target apparatus may comprise a television, recording device (e.g., video cassette recorder (VCR), digital video recorder (DVR), or any non-volatile memory), Digital Versatile Disc or Digital Video Disc (DVD) player, digital audio file player (e.g., MP3 player), cable and/or satellite converter set-top box ("STBs"), amplifier, compact disk (CD) player, game console, home lighting, electrically controlled drapery (e.g., blinds), tintable window (e.g., electrochromic window), fan, HVAC system, thermostat, personal computer, dispenser (e.g., soap, beverage, food, or equipment dispenser), washing machine, or dryer. In some embodiments, the target (e.g., target apparatus) excludes entertainment an entertainment device (e.g., a television, recording device (e.g., video cassette recorder (VCR), digital video recorder (DVR), or any non-volatile memory), Digital Versatile Disc or Digital Video Disc (DVD) player, digital audio file player (e.g., MP3 player), cable and/or satellite converter set-top box ("STBs"), amplifier, compact disk (CD) player, and/or game console). The target may be a control target. In some embodiments, the one or more devices comprises a service, office and/or factory apparatus.

In some embodiments, the facility comprises a local network. The network may be operatively coupled to the control system. The network may be a network of the facility (e.g., of the building). The network may be configured to transmit communication and/or power. The network may be any network disclosed herein. The network may extend to a room, a floor, several rooms, several floors, the building, or several buildings of the facility. The network may operatively (e.g., to facilitate power and/or communication) couple to a control system (e.g., as disclosed herein), to sensor(s), emitter(s), antenna, router(s), power supply, building management system (and/or its components). The network may be operatively coupled to personal computers of users (e.g., occupants) associated with the facility (e.g., employees and/or tenants). At least part of the network may be installed as the initial network of the facility, and/or disposed in an envelope structure of the facility. At least a portion of the network may be the first network deployed in the facility, e.g., upon its creation. The network may be operatively coupled to one or more targets (e.g., devices) in the facility that perform operations for, or associated with, the facility (e.g., production machinery, communication machinery, and/or service devices such as service machinery). The production machinery may include computers, factory related machinery, and/or any other machinery configured to produce product(s) (e.g., printers and/or dispensers). The service machinery may include food and/or beverage related machinery, hygiene related machinery (e.g., mask dispenser, and/or disinfectant dispensers). The communication machinery may include media projectors, media display, touch screens, speakers, and/or lighting (e.g., entry, exit, and/or security lighting).

In some embodiments, usage information is used to determine power specifications (e.g., for transmitting and/or receiving upstream and/or downstream signals) for one or more components of the facility. For example, a small cell controller may transmit instructions to one or more RAUs of the facility instructing the one or more RAUs to amplify downstream signals received from a router (e.g., a headend router) prior to causing one or more antennas operatively coupled to the RAU to transmit the signal. As another example, a small cell controller may transmit instructions to one or more RAUs of the facility instructing the one or more RAUs to amplify upstream signals received from one or more antennas operatively coupled to the one or more RAUs prior to transmitting the upstream signals to a router (e.g., the headend router). In some embodiments, the small cell controller may identify RAUs that are to amplify upstream and/or downstream signals based at least in part on the usage information. For example, in an instance in which the usage information indicates that one or more devices receiving information from antennas operatively coupled to a particular RAU are outside of a predetermined proximity to the antennas, the small cell controller may instruct the RAU to amplify upstream and/or downstream signals. The usage information may include a proximity of one or more devices to one or more antennas in a facility and/or an indication of a line of sight between one or more devices to one or more antennas in a facility (e.g., whether the one or more devices are blocked by a wall or other structure to the one or more antennas). In some embodiments, line of sight information (including materials of particular walls and/or other structures) may be determined based at least in part on blueprint information and/or other architectural information. For example, line of sight information may utilized a BMI (e.g., such as a Revit file). In some embodiments, the small cell controller may instruct one or more active antennas in the facility to amplify upstream and/or downstream signals based at least in part on usage information. In some embodiments, the controller may be operatively coupled to a BMI file.

In some embodiments, a facility in which small cell devices and/or a small cell controller is deployed may also be equipped with one or more windows, such as tintable (e.g., electrochromic) windows. In some embodiments, a control system may be shared between the small cell devices and the one or more windows (e.g., and be part of a control system of the facility). In some embodiments, various networks, connectors, cables, or the like may be shared between a control system associated with one or more small cell devices and one or more controllable devices in a facility (e.g., one or more tintable windows). In various embodiments, a network infrastructure supports a control system for one or more windows such as tintable (e.g., electrochromic) windows. The control system may comprise one or more controllers operatively coupled (e.g., directly or indirectly) to one or more windows. While the disclosed embodiments describe tintable windows (also referred to herein as "optically switchable windows," or "smart windows") such as electrochromic windows, the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, bus, train, airplane, helicopter, ship, or boat.

In some embodiments, a tintable window exhibits a (e.g., controllable and/or reversible) change in at least one optical property of the window, e.g., when a stimulus is applied. The change may be a continuous change. A change may be to discrete tint levels (e.g., to at least about 2, 4, 8, 16, or 32 tint levels). The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. Pat. No. 10,359,681, issued Jul. 23, 2019, filed May 15, 2015, titled "MULTI-PANE WINDOWS INCLUDING ELECTROCHROMIC DEVICES AND ELECTROMECHANICAL SYSTEMS DEVICES," and incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD), or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g., noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions ($Li+$) and/or hydrogen ions ($H+$) (i.e., protons). In some implementations, other ions can be suitable. Intercalation of the cations may be into an (e.g., metal) oxide. A change in the intercalation state of the ions (e.g., cations) into the oxide may induce a visible change in a tint (e.g., color) of the oxide. For example, the oxide may transition from a colorless to a colored state. For example, intercalation of lithium ions into tungsten oxide ($WO3-y$ $(0<y\leq\sim 0.3)$) may cause the tungsten oxide to change from a transparent state to a colored (e.g., blue) state. EC device coatings as described herein are located within the viewable portion of the tintable window such that the tinting of the EC device coating can be used to control the optical state of the tintable window.

Figure 13:
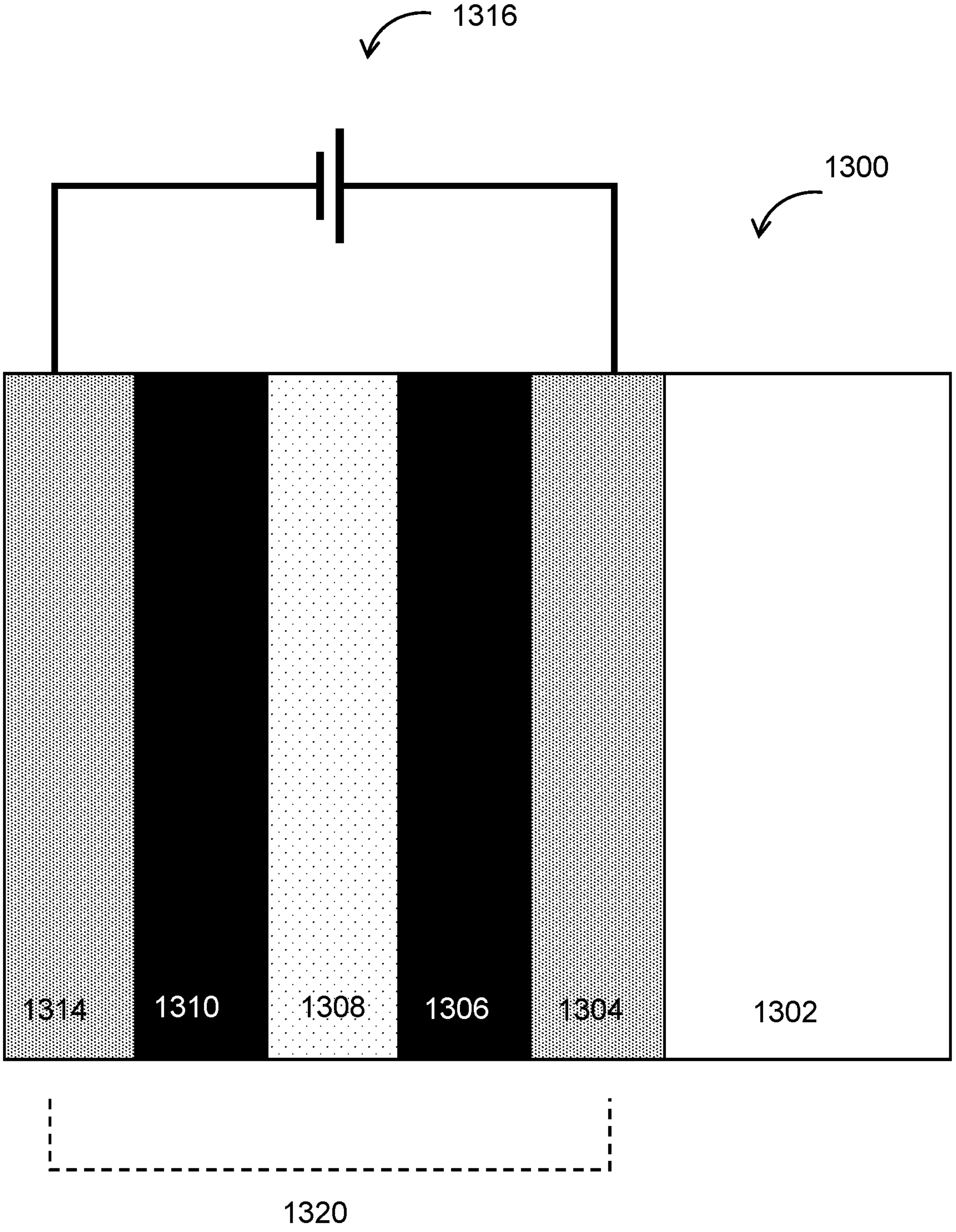
FIG. 13 schematically shows an electrochromic device.

FIG. 13 shows an example of a schematic cross-section of an electrochromic device 1300 in accordance with some embodiments is shown in FIG. 13. The EC device coating is attached to a substrate 1302, a transparent conductive layer (TCL) 1304, an electrochromic layer (EC) 1306 (sometimes also referred to as a cathodically coloring layer or a cathodically tinting layer), an ion conducting layer or region (IC) 1308, a counter electrode layer (CE) 1310 (sometimes also referred to as an anodically coloring layer or anodically tinting layer), and a second TCL 1314.

Elements 1304, 1306, 1308, 1310, and 1314 are collectively referred to as an electrochromic stack 1320. A voltage source 1316 operable to apply an electric potential across the electrochromic stack 1320 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL.

In various embodiments, the ion conductor region (e.g., 1308) may form from a portion of the EC layer (e.g., 1306) and/or from a portion of the CE layer (e.g., 1310). In such embodiments, the electrochromic stack (e.g., 1320) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725, filed May 2, 2012, titled "ELECTROCHROMIC DEVICES," that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 1320. Various layers, including transparent conducting layers (such as 1304 and 1314), can be treated with anti-reflective and/or protective layers (e.g., oxide and/or nitride layers).

In certain embodiments, the electrochromic device is configured to (e.g., substantially) reversibly cycle between a clear state and a tinted state. Reversible may be within an expected lifetime of the ECD. The expected lifetime can be at least about 5, 10, 15, 25, 50, 75, or 100 years. The expected lifetime can be any value between the aforementioned values (e.g., from about 5 years to about 100 years, from about 5 years to about 50 years, or from about 50 years to about 100 years). A potential can be applied to the electrochromic stack (e.g., 1320) such that available ions in the stack that can cause the electrochromic material (e.g., 1306) to be in the tinted state reside primarily in the counter electrode (e.g., 1310) when the window is in a first tint state (e.g., clear). When the potential applied to the electrochromic stack is reversed, the ions can be transported across the ion conducting layer (e.g., 1308) to the electrochromic material and cause the material to enter the second tint state (e.g., tinted state).

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, and/or transparent-opaque. In some embodiments, the terms "clear" and "bleached" refer to an optically neutral state, e.g., untinted, transparent and/or translucent. In some embodiments, the "color" or "tint" of an electrochromic transition is not limited to any wavelength or range of wavelengths. The choice of appropriate electrochromic material and counter electrode materials may govern the relevant optical transition (e.g., from tinted to untinted state).

In certain embodiments, at least a portion (e.g., all of) the materials making up electrochromic stack are inorganic, solid (i.e., in the solid state), or both inorganic and solid. Because various organic materials tend to degrade over time, particularly when exposed to heat and UV light as tinted building windows are, inorganic materials offer an advantage of a reliable electrochromic stack that can function for extended periods of time. In some embodiments, materials in the solid state can offer the advantage of being minimally contaminated and minimizing leakage issues, as materials in the liquid state sometimes do. One or more of the layers in the stack may contain some amount of organic material (e.g., that is measurable). The ECD or any portion thereof (e.g., one or more of the layers) may contain little or no measurable organic matter. The ECD or any portion thereof (e.g., one or more of the layers) may contain one or more liquids that may be present in little amounts. Little may be of at most about 100 ppm, 10 ppm, or 1 ppm of the ECD. Solid state material may be deposited (or otherwise formed) using one or more processes employing liquid components, such as certain processes employing sol-gels, physical vapor deposition, and/or chemical vapor deposition.

Figure 14:
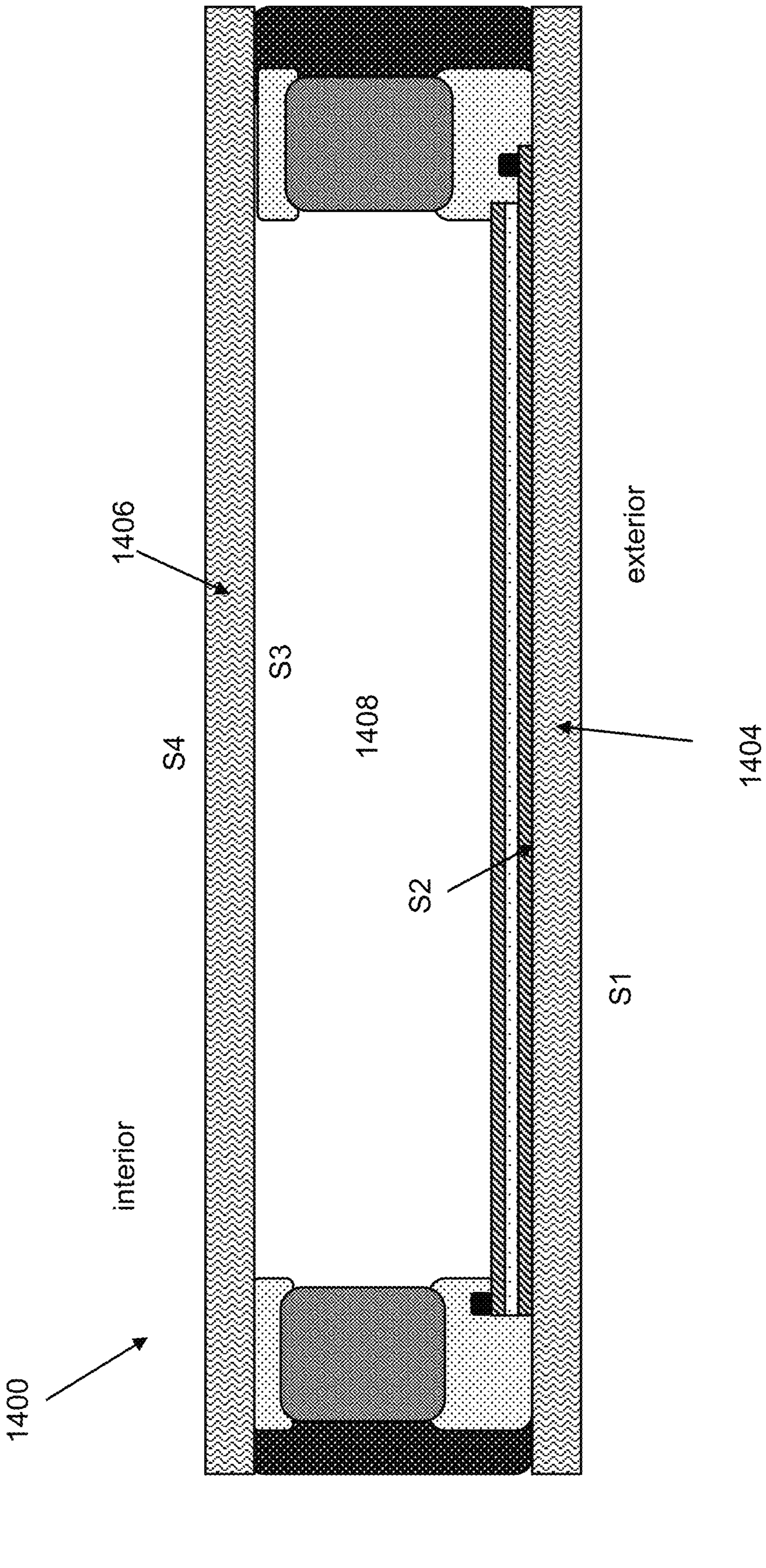
FIG. 14 schematically shows a cross-section of a tintable window.

FIG. 14 show an example of a cross-sectional view of a tintable window embodied in an insulated glass unit ("IGU") 1400, in accordance with some implementations. The terms "IGU," "tintable window," and "optically switchable window" can be used interchangeably herein. It can be desirable to have IGUs serve as the fundamental constructs for holding electrochromic panes (also referred to herein as "lites") when provided for installation in a building. An IGU lite may be a single substrate or a multi-substrate construct. The lite may comprise a laminate, e.g., of two substrates. IGUs (e.g., having double- or triple-pane configurations) can provide a number of advantages over single pane configurations. For example, multi-pane configurations can provide enhanced thermal insulation, noise insulation, environmental protection and/or durability, when compared with single-pane configurations. A multi-pane configuration can provide increased protection for an ECD. For example, the electrochromic films (e.g., as well as associated layers and conductive interconnects) can be formed on an interior surface of the multi-pane IGU and be protected by an inert gas fill in the interior volume (e.g., 1408) of the IGU. The inert gas fill may provide at least some (heat) insulating function for an IGU. Electrochromic IGUs may have heat blocking capability, e.g., by virtue of a tintable coating that absorbs (and/or reflects) heat and light.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g., connect) one or more electrochromic devices to a voltage source, switches and the like, and may include a frame that supports the IGU or laminate. A window assembly may include a window controller, and/or components of a window controller (e.g., a dock).

FIG. 14 shows an example implementation of an IGU 1400 that includes a first pane 1404 having a first surface S1 and a second surface S2. In some implementations, the first surface S1 of the first pane 1404 faces an exterior environment, such as an outdoors or outside environment. The IGU 1400 also includes a second pane 1406 having a first surface S3 and a second surface S4. In some implementations, the second surface (e.g., S4) of the second pane (e.g., 1406) faces an interior environment, such as an inside environment of a home, building, vehicle, or compartment thereof (e.g., an enclosure therein such as a room).

In some implementations, the first and the second panes (e.g., 1404 and 1406) are transparent or translucent, e.g., at least to light in the visible spectrum. For example, each of the panes (e.g., 1404 and 1406) can be formed of a glass material. The glass material may include architectural glass, and/or shatter-resistant glass. The glass may comprise a silicon oxide ($SO_x$). The glass may comprise a soda-lime glass or float glass. The glass may comprise at least about 75% silica ($SiO_2$). The glass may comprise oxides such as $Na_2O$, or CaO. The glass may comprise alkali or alkali-earth oxides. The glass may comprise one or more additives. The first and/or the second panes can include any material having suitable optical, electrical, thermal, and/or mechanical properties. Other materials (e.g., substrates) that can be included in the first and/or the second panes are plastic, semi-plastic and/or thermoplastic materials, for example, poly(methyl methacrylate), polystyrene, polycarbonate, allyl diglycol carbonate, SAN (styrene acrylonitrile copolymer), poly(4-methyl-1-pentene), polyester, and/or polyamide. The first and/or second pane may include mirror material (e.g., silver). In some implementations, the first and/or the second panes can be strengthened. The strengthening may include tempering, heating, and/or chemically strengthening.

In some embodiments, an enclosure includes one or more sensors. The sensor may facilitate controlling the environment of the enclosure such that inhabitants of the enclosure may have an environment that is more comfortable, delightful, beautiful, healthy, productive (e.g., in terms of inhabitant performance), easer to live (e.g., work) in, or any combination thereof. The sensor(s) may be configured as low or high resolution sensors. Sensor may provide on/off indications of the occurrence and/or presence of a particular environmental event (e.g., one pixel sensors). In some embodiments, the accuracy and/or resolution of a sensor may be improved via artificial intelligence analysis of its measurements. Examples of artificial intelligence techniques that may be used include: reactive, limited memory, theory of mind, and/or self-aware techniques know to those skilled in the art). Sensors may be configured to process, measure, analyze, detect and/or react to one or more of: data, temperature, humidity, sound, force, pressure, electromagnetic waves, position, distance, movement, flow, acceleration, speed, vibration, dust, light, glare, color, gas(es), and/or other aspects (e.g., characteristics) of an environment (e.g., of an enclosure). The gases may include volatile organic compounds (VOCs). The gases may include carbon monoxide, carbon dioxide, water vapor (e.g., humidity), oxygen, radon, and/or hydrogen sulfide. The one or more sensors may be calibrated in a factory setting and/or at the target environment (e.g., deployment site). A sensor may be optimized to be capable of performing accurate measurements of one or more environmental characteristics present in the factory setting and/or at the target environment. In some instances, a factory calibrated sensor may be less optimized for operation in a target environment. For example, a factory setting may comprise a different environment than a target environment. The target environment can be an environment in which the sensor is deployed. The target environment can be an environment in which the sensor is expected and/or destined to operate. The target environment may differ from a factory environment. A factory environment corresponds to a location at which the sensor was assembled and/or built. The target environment may comprise a factory in which the sensor was not assembled and/or built. In some instances, the factory setting may differ from the target environment, e.g., to the extent that sensor readings captured in the target environment are erroneous (e.g., to a measurable extent). In this context, "erroneous" may refer to sensor readings that deviate from a specified accuracy (e.g., specified by a manufacture of the sensor). In some situations, a factory-calibrated sensor may provide readings that do not meet accuracy specifications (e.g., by a manufacturer) when operated in the target environments.

In some embodiments, the control system is operatively (e.g., communicatively) coupled to an ensemble of devices (e.g., sensors and/or emitters). One or more sensors may be configured to process, measure, analyze, detect and/or react to: data, temperature, humidity, sound, force, pressure, concentration, electromagnetic waves, position, distance, movement, flow, acceleration, speed, vibration, dust, light, glare, color, gas(es) type, and/or other aspects (e.g., characteristics) of an environment (e.g., of an enclosure). The gases may include volatile organic compounds (VOCs). The gases may include carbon monoxide, carbon dioxide, water vapor (e.g., humidity), oxygen, radon, and/or hydrogen sulfide. The one or more sensors may be calibrated in a factory setting and/or in the facility. A sensor may be optimized to performing accurate measurements of one or more environmental characteristics present in the factory setting and/or in the facility in which it is deployed. The environmental characteristic may comprise temperature, humidity, pressure, $CO_2$, CO, VOC, debris (e.g., smoke, particulates), radon, sound, sound emitter, temperature, or electromagnetic radiation (e.g., UV having wavelength range of from about 10 nanometers (nm) to about 400 nm, IR having wavelength range of from about 700 nm to about 1 mm, or visible light having wavelength range of from about 400 to about 700 nm). A device ensemble may include $CO_2$, VOC, temperature, humidity, electromagnetic light, pressure, and/or noise sensors. The sensor may comprise a gesture sensor (e.g., RGB gesture sensor), an acetometer, or a sound sensor. The VOC sensor may be configured to measure Total VOC (abbreviated herein as "TVOC," or "tVOC"). In some embodiments, the ensemble facilitates the control of the environment and/or the alert. The control may utilize a control scheme such as feedback control, or any other control scheme delineated herein. The ensemble may comprise at least one sensor configured to sense electromagnetic radiation. The electromagnetic radiation may be (humanly) visible, infrared (IR), or ultraviolet (UV) radiation. The at least one sensor may comprise an array of sensors. For example, the ensemble may comprise an IR sensor array (e.g., a far infrared thermal array such as the one by Melexis). The IR sensor array may have a resolution of at least 32×24 pixels. The IR sensor may be coupled to a digital interface. The ensemble may comprise an IR camera. The ensemble may comprise a sound detector. The ensemble may comprise a microphone. The ensemble may comprise any sensor and/or emitter disclosed herein. The ensemble may include $CO_2$, VOC, temperature, humidity, electromagnetic light, pressure, and/or noise sensors. The sensor may comprise a gesture sensor (e.g., RGB gesture sensor), an acetometer, or a sound sensor. The sounds sensor may comprise an audio decibel level detector. The sensor may comprise a meter driver. The ensemble may include a microphone and/or a processor. The ensemble may comprise a camera (e.g., a 4K pixel camera), a UWB sensor and/or emitter, a Bluetooth (BLE) sensor and/or emitter, a processor. The camera may have any camera resolution disclosed herein. One or more of the devices (e.g., sensors) can be integrated on a chip. The device (e.g., sensor) ensemble may be utilized to determine presence of occupants in an enclosure, their number and/or identity (e.g., using the camera). The device ensemble may be utilized to control (e.g., monitor and/or adjust) one or more environmental characteristics in the enclosure environment.

The sensors coupled to the network may be configured to sense properties comprising temperature, Relative Humidity (RH), Illuminance (e.g., in Lux), temperature (in degrees Celsius), correlated color temperature (CCT, e.g., in degrees Kelvin), carbon dioxide (e.g., in parts per million (ppm)), volatile organic compounds (VOC, e.g., as an index value), pressure (e.g., as sound pressure in Decibels), pulverous material, infrared, ultraviolet, or visible light. The sensor may have an accuracy. The sensor may have a random variability. The random variability (e.g., statistical measures of long-term random variability). The random variability of the temperature sensor may be at most about 0.5 degrees Celsius (° C.), 0.3° C., 0.2° C. or 0.1° C. The random variability of the RH sensor may be at most about 3%, 2%, 1.5%, or 1%. The random variability of the Illuminance sensor may be at most about 20 LUX, 15 LUX, 10 LUX, or 5 LUX. The random variability of the CCT sensor may be at most about 250 Kelvin (K), 220K, 210K, 200K, 190K, or 150K. The random variability of the carbon dioxide sensor may be at most about 25 ppm, 23 ppm, 20 ppm, 19 ppm, or 15 ppm. The random variability of the VOC sensor may be at most about 15 index value (IV), 12 IV, 11 IV, 10 IV, or 5 IV. The random variability of the sound pressure sensor may be at most about 10 Decibels (dB), 8 dB, 5 dB, 4 dB, or 2 dB. At times, a sensor ensemble may comprise measuring the temperature in the device ensemble (e.g., internal device ensemble temperature) and/or out of the device ensemble (e.g., external device ensemble temperature such as temperature in a room in which the device ensemble is disposed). In some embodiments, data from the sensor(s) undergoes processing and/or analysis.

In some embodiments, a plurality of devices may be operatively (e.g., communicatively) coupled to the control system. The plurality of devices may be disposed in a facility (e.g., including a building and/or room). The control system may comprise the hierarchy of controllers. The devices may comprise an emitter, a sensor, or a window (e.g., IGU). The device may be any device as disclosed herein. At least two of the plurality of devices may be of the same type. For example, two or more IGUs may be coupled to the control system. At least two of the plurality of devices may be of different types. For example, a sensor and an emitter may be coupled to the control system. At times, the plurality of devices may comprise at least 20, 50, 100, 500, 1000, 2500, 5000, 7500, 10000, 50000, 100000, or 500000 devices. The plurality of devices may be of any number between the aforementioned numbers (e.g., from 20 devices to 500000 devices, from 20 devices to 50 devices, from 50 devices to 500 devices, from 500 devices to 2500 devices, from 1000 devices to 5000 devices, from 5000 devices to 10000 devices, from 10000 devices to 100000 devices, or from 100000 devices to 500000 devices). For example, the number of windows in a floor may be at least 5, 10, 15, 20, 25, 30, 40, or 50. The number of windows in a floor can be any number between the aforementioned numbers (e.g., from 5 to 50, from 5 to 25, or from 25 to 50). At times, the devices may be in a multi-story building. At least a portion of the floors of the multi-story building may have devices controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 150 $m^2$, 250 $m^2$, 500 $m^2$, 1000 $m^2$, 1500 $m^2$, or 2000 square meters ($m^2$). The floor may have an area between any of the aforementioned floor area values (e.g., from about 150 $m^2$ to about 2000 $m^2$, from about 150 $m^2$ to about 500 $m^2$, from about 250 $m^2$ to about 1000 $m^2$, or from about 1000 $m^2$ to about 2000 $m^2$). The building may comprise an area of at least about 1000 square feet (sqft), 2000 sqft, 5000 sqft, 10000 sqft, 100000 sqft, 150000 sqft, 200000 sqft, or 500000 sqft. The building may comprise an area between any of the above mentioned areas (e.g., from about 1000 sqft to about 5000 sqft, from about 5000 sqft to about 500000 sqft, or from about 1000 sqft to about 500000 sqft). The building may comprise an area of at least about 100 $m^2$, 200 $m^2$, 500 $m^2$, 1000 $m^2$, 5000 $m^2$, 10000 $m^2$, 25000 $m^2$, or 50000 $m^2$. The building may comprise an area between any of the above mentioned areas (e.g., from about 100 $m^2$ to about 1000 $m^2$, from about 500 $m^2$ to about 25000 $m^2$, from about 100 $m^2$ to about 50000 $m^2$). The facility may comprise a commercial or a residential building. The commercial building may include tenant(s) and/or owner(s). The residential facility may comprise a multi or a single family building. The residential facility may comprise an apartment complex. The residential facility may comprise a single family home. The residential facility may comprise multifamily homes (e.g., apartments). The residential facility may comprise townhouses. The facility may comprise residential and commercial portions. The facility may comprise at least about 1, 2, 5, 10, 50, 100, 150, 200, 250, 300, 350, 400, 420, 450, 500, or 550 windows (e.g., tintable windows). The windows may be divided into zones (e.g., based at least in part on the location, façade, floor, ownership, utilization of the enclosure (e.g., room) in which they are disposed, any other assignment metric, random assignment, or any combination thereof. Allocation of windows to the zone may be static or dynamic (e.g., based on a heuristic). There may be at least about 2, 5, 10, 12, 15, 30, 40, or 46 windows per zone. The facility may comprise a commercial or a residential building. The residential facility may comprise a multi or a single family building.

In some embodiments, the sensor(s) are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may include circuitry, electrical wiring, optical wiring, socket, and/or outlet. A controller may deliver an output. A controller may comprise multiple (e.g., sub-) controllers. The controller may be a part of a control system. A control system may comprise a master controller, floor (e.g., comprising network controller) controller, or a local controller. The local controller may be a window controller (e.g., controlling an optically switchable window), enclosure controller, or component controller. The controller can be a device controller (e.g., any device disclosed herein). For example, a controller may be a part of a hierarchal control system (e.g., comprising a main controller that directs one or more controllers, e.g., floor controllers, local controllers (e.g., window controllers), enclosure controllers, and/or component controllers). A physical location of the controller type in the hierarchal control system may be changing. For example, at a first time: a first processor may assume a role of a main controller, a second processor may assume a role of a floor controller, and a third processor may assume the role of a local controller. At a second time: the second processor may assume a role of a main controller, the first processor may assume a role of a floor controller, and the third processor may remain with the role of a local controller. At a third time: the third processor may assume a role of a main controller, the second processor may assume a role of a floor controller, and the first processor may assume the role of a local controller. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer.

Figure 15:
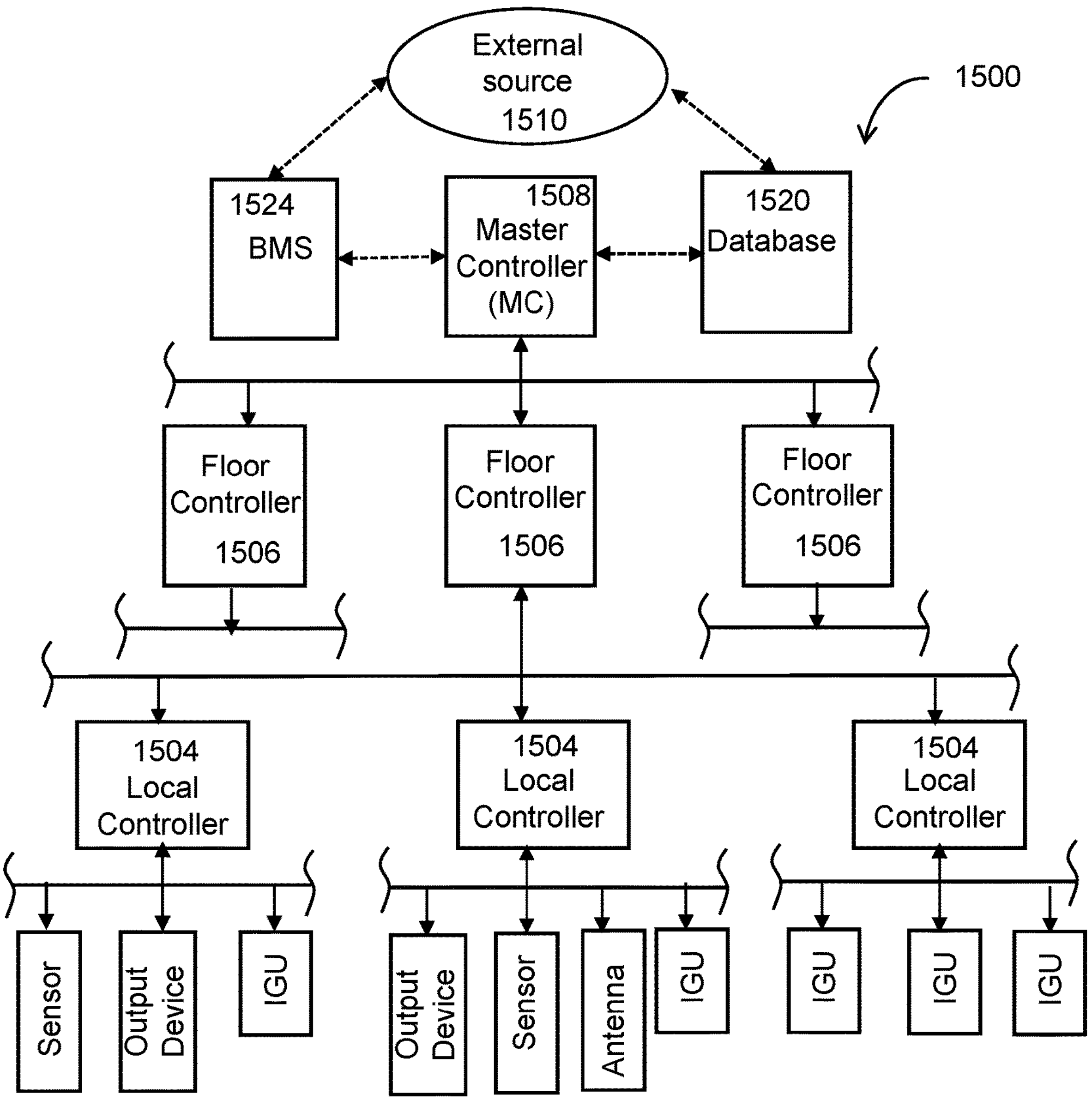
FIG. 15 schematically shows an example of a control system architecture.

FIG. 15 shows an example of a control system architecture 1500 comprising a master controller 1508 that controls floor controllers 1506, that in turn control local controllers 1504. In some embodiments, a local controller controls one or more IGUs, one or more sensors, one or more output devices (e.g., one or more emitters), or any combination thereof. FIG. 15 shows an example of a configuration in which the master controller is operatively coupled (e.g., wirelessly and/or wired) to a building management system (BMS) 1524 and to a database 1520. Arrows in FIG. 15 represents communication pathways. A controller may be operatively coupled (e.g., directly/indirectly and/or wired and/wirelessly) to an external source 1510. The external source may comprise a network. The external source may comprise one or more sensor or output device. The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 15, the communication all communication arrows are meant to be bidirectional. The local controller 1504 may be (e.g., directly) operatively coupled to any of the targets (e.g., devices) disclosed herein. Directly operatively coupled refers to an absence of any other controller therebetween. The control system 1500 may be operatively coupled to any of the targets (e.g., devices) disclosed herein.

In some embodiments, a BMS is disposed in a facility. The facility can comprise a building such as a multistory building. The BMS may functions at least to control the environment in the building. The control system and/or BMS may control at least one environmental characteristic of the enclosure. The at least one environmental characteristic may comprise temperature, humidity, fine spray (e.g., aerosol), sound, electromagnetic waves (e.g., light glare, color), gas makeup, gas concentration, gas speed, vibration, volatile compounds (VOCs), debris (e.g., dust), or biological matter (e.g., gas borne bacteria and/or virus). The gas(es) may comprise oxygen, nitrogen, carbon dioxide, carbon monoxide, hydrogen sulfide, Nitric oxide (NO) and nitrogen dioxide ($NO_2$), inert gas, Nobel gas (e.g., radon), cholorophore, ozone, formaldehyde, methane, or ethane. For example, a BMS may control temperature, carbon dioxide levels, and/or humidity within an enclosure. Mechanical devices that can be controlled by a BMS and/or control system may comprise lighting, a heater, air conditioner, blower, or vent. To control the enclosure (e.g., building) environment, a BMS and/or control system may turn on and off one or more of the devices it controls, e.g., under defined conditions. A (e.g., core) function of a BMS and/or control system may be to maintain a comfortable environment for the occupants of the enclosure, e.g., while minimizing energy consumption (e.g., while minimizing heating and cooling costs/demand). A BMS and/or control system can be used to control (e.g., monitor), and/or to optimize the synergy between various systems, for example, to conserve energy and/or lower enclosure (e.g., facility) operation costs.

The controller may monitor and/or direct (e.g., physical) alteration of the operating conditions of the apparatuses, software, and/or methods described herein. Control may comprise regulate, manipulate, restrict, direct, monitor, adjust, modulate, vary, alter, restrain, check, guide, or manage. Controlled (e.g., by a controller) may include attenuated, modulated, varied, managed, curbed, disciplined, regulated, restrained, supervised, manipulated, and/or guided. The control may comprise controlling a control variable (e.g., temperature, power, voltage, and/or profile). The control can comprise real time or off-line control. A calculation utilized by the controller can be done in real time, and/or off-line. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from at least one sensor). The controller may deliver an output. The controller may comprise multiple (e.g., sub-) controllers. The controller may be a part of a control system. The control system may comprise a master controller, floor controller, local controller (e.g., enclosure controller, or window controller). The controller may receive one or more inputs. The controller may generate one or more outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise (or operatively coupled to) a keyboard, keypad, mouse, touch screen, microphone, speech recognition package, camera, imaging system, or any combination thereof. The outputs may include a display (e.g., screen), speaker, or printer.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

Figure 16:
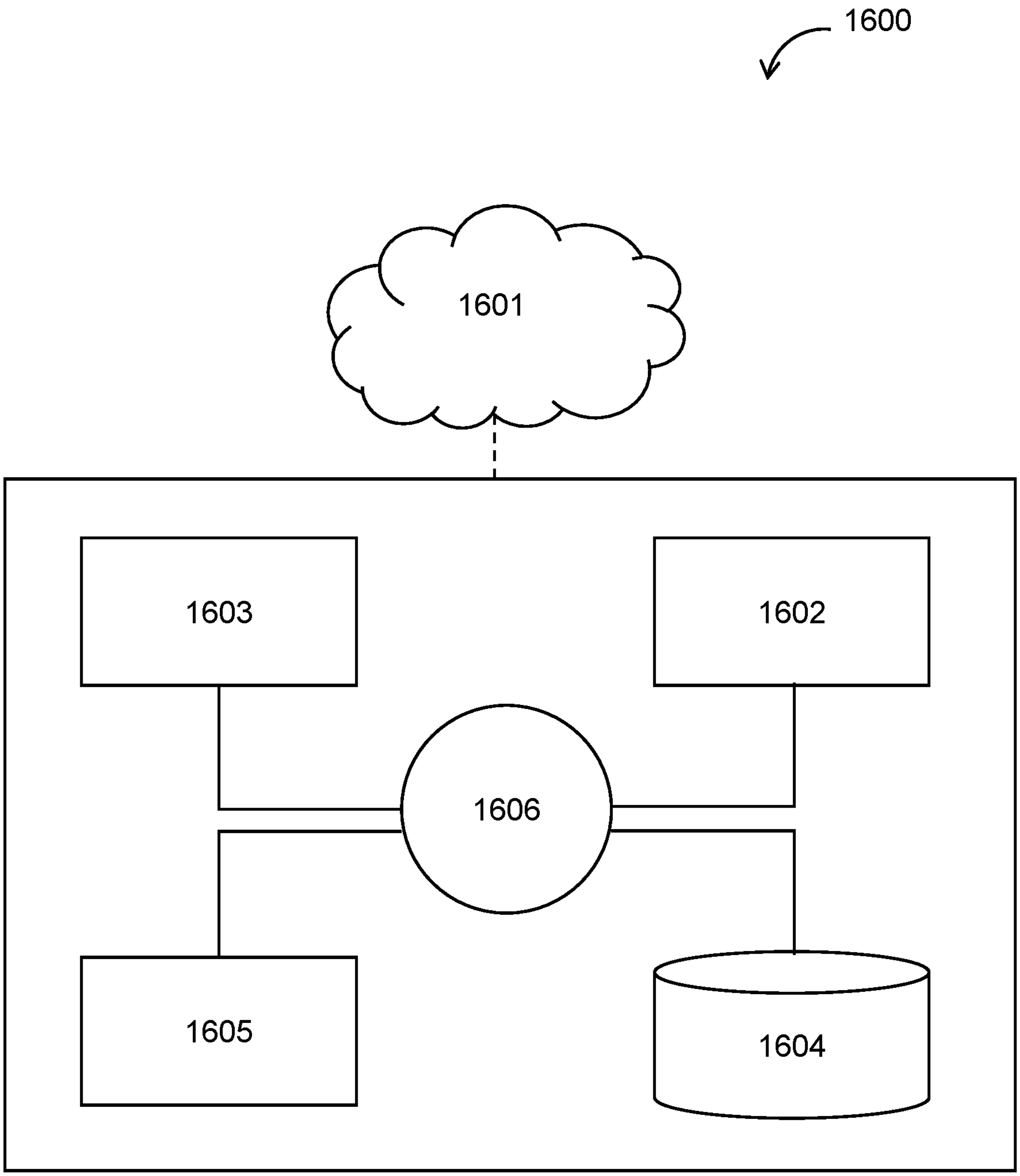
FIG. 16 schematically shows an example computer system.

FIG. 16 shows a schematic example of a computer system 1600 that is programmed or otherwise configured to one or more operations of any of the methods provided herein. The computer system can control (e.g., direct, monitor, and/or regulate) various features of the methods, apparatuses, and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 1606) (also "processor," "computer" and "computer processor" used herein). The computer system may include memory or memory location (e.g., 1602) (e.g., random-access memory, read-only memory, flash memory), electronic storage unit (e.g., 1604) (e.g., hard disk), communication interface (e.g., 1603) (e.g., network adapter) for communicating with one or more other systems, and peripheral devices (e.g., 1605), such as cache, other memory, data storage and/or electronic display adapters. In the example shown in FIG. 16, the memory 1602, storage unit 1604, interface 1603, and peripheral devices 1605 are in communication with the processing unit 1606 through a communication bus (solid lines), such as a motherboard. The storage unit can be a data storage unit (or data repository) for storing data. The computer system can be operatively coupled to a computer network ("network") (e.g., 1601) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 1602. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 1600 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The processing unit (e.g., computer system) can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user can access the computer system via the network. The processing unit may comprise a CPU or a GPU. The processing unit may comprise a media player. The processing unit may be included in a circuit board. The circuit board may comprise a Jetson Nano™ Developer Kit by NVIDIA®, (e.g., 2 GB or 4 GB developer kit) or Raspberry-Pi kit (e.g., 1 GB, 2 GB, 4 GB, or 8 GB developer kit). The processing unit may be operatively coupled to a plurality of ports comprising at least one media port (e.g., a DisplayPort, HDMI, and/or micro-HDMI), USB, or an audio-video jack, e.g., that may be included in the circuit board. The processing unit may be operatively coupled to a Camera Serial Interface (CSI), or a Display Serial Interface (DSI), e.g., as part of the circuit board. The processing unit is configured to support communication such as ethernet (e.g., Gigabit Ethernet). The circuitry board may comprise a Wi-Fi functionality, a Bluetooth functionality, or a wireless adapter. The wireless adapter may be configured to comply with a wireless networking standard in the 802.11 set of protocols (e.g., USB 802.11ac). The wireless adapter may be configured to provide a high-throughput wireless local area networks (WLANs), e.g., on at least about a 5 GHz band. The USB port may have a transfer speed of at least about 480 megabits per second (Mbps), 4,800 Mbps, or 10,000 Mbps. The at least one processor may comprise a synchronous (e.g., clocked) processor. The clock speed of the processor may be of at least about 1.2 GigaHertz (GHZ), 1.3 GHZ, 1.4 GHz, 1.5 GHZ, or 1.6 GHz. The processing unit may comprise a random access memory (RAM). The RAM may comprise a double data rate synchronous dynamic RAM (SDRAM). The RAM may be configured for mobile devices (e.g., laptop, pad, or mobile phone such as cellular phone). The RAM may comprise a Low-Power Double Data Rate (LPDDR) RAM. The RAM may be configured to permit a channel that is at least about 16, 32, or 64 bit wide. A user (e.g., client) can access the computer system via the network.

Methods as described herein can be implemented by way of machine (e.g., computer processor) executable code stored on an electronic storage location of the computer system, such as, for example, on the memory 1602 or electronic storage unit 1604. The machine executable or machine-readable code can be provided in the form of software. During use, the processor 1606 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion.

In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible, infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

In view of this description embodiments may include different combinations of features. Implementation examples are described in the following numbered clauses:

Clause 1. A method of establishing subscriber identity in a cellular network of a facility, the method comprising: receiving a request for a subscriber profile from a mobile device of a subscriber; determining a connectivity profile based at least in part on the request received, wherein the connectivity profile comprises one or more connectivity characteristics for providing access to the cellular network that facilitates control of one or more building systems of the facility; and sending the subscriber profile to the mobile device, wherein the subscriber profile is associated with the determined connectivity profile.

Clause 2. The method of clause 1, wherein the subscriber profile comprises an embedded Subscriber Identification Module (eSIM) profile.

Clause 3. The method of any one of clauses 1-2 further comprising (i) receiving an acknowledgment that the subscriber profile has been installed on the mobile device; and (ii) responsive to receiving the acknowledgement, activating the subscriber profile on the cellular network of the facility.

Clause 4. The method of clause 3 wherein activating the subscriber profile comprises sending an International Mobile Subscriber Identifier (IMSI) activation notification to a subscription database.

Clause 5. The method of any one of clauses 3-4 wherein the cellular network of the facility is associated with a plurality of facilities, and wherein activating the subscriber profile comprises granting the mobile device access to the cellular network at least a subset of the plurality of facilities.

Clause 6. The method of any one of clauses 1-5 wherein receiving the request comprises receiving a Uniform Resource Locator (URL).

Clause 7. The method of clause 6 further comprising prior to receiving the request: (i) generating an indicator of the URL; and (ii) providing the indicator to the subscriber.

Clause 8. The method of clause 7 wherein the indicator comprises the URL, a HyperText Markup Language (HTML) link, a Quick Response (QR) code, or a bar code.

Clause 9. The method of any one of clauses 7-8 wherein providing the indicator to the subscriber comprises sending the indicator to a display, a kiosk, a web portal, a user device, or the mobile device.

Clause 10. The method of any one of clauses 6-9 wherein the URL is unique to the subscriber, subscriber type, event, facility, or venue.

Clause 11. The method of any one of clauses 1-10 wherein the one or more connectivity characteristics comprise a Quality of Service (QOS) level, an access level, a time during which access to the cellular network is granted or denied, and/or a bandwidth setting.

Clause 12. The method of clause 11 wherein the access level comprises a level of access to (i) information accessible via the cellular network, (ii) a data network accessible via cellular network, and/or (iii) a device operatively coupled with the cellular network.

Clause 13. The method of any one of clauses 1-12 wherein facilitating control of one or more building systems of the facility comprises facilitating security, health, and/or environmental control of the facility.

Clause 14. The method of any one of clauses 1-13 wherein the cellular network is operatively coupled to the one or more building systems.

Clause 15. The method of clause 14 wherein the one or more building systems comprises a device ensemble having a housing that encloses the one or more devices that comprise: (i) sensors, (ii) a transceiver, or (iii) a sensor and an emitter.

Clause 16. The method of clause 15 wherein the device ensemble is disposed in a fixture of the facility, or is attached to a fixture of the facility.

Clause 17. The method of clause 16 wherein the fixture comprises a framing portion.

Clause 18. The method of any one of clauses 14-17 wherein the one or more building systems comprise a tintable window.

Clause 19. The method of clause 18 wherein the tintable window comprises an electrochromic window.

Clause 20. The method of any one of clauses 1-19 wherein the cellular network comprises a wire configured to transit power and cellular communication.

Clause 21. The method of clause 20 wherein the cellular communication abides by at least a fourth generation, or a fifth generation cellular communication protocol.

Clause 22. The method of any one of clauses 1-21 wherein the cellular network is of facilities that include the facility.

Clause 23. A system for establishing subscriber identity in a cellular network of a facility, the system comprising a cellular network configured to transmit one or more signals associated with any one of the methods of clauses 1 to 22.

Clause 24. A non-transitory computer readable program instructions for establishing subscriber identity in a cellular network of a facility, which non-transitory computer readable program instructions, when executed by one or more processors operatively coupled to a cellular network, cause the one or more processors to execute, or direct execution of, any one of the methods of clauses 1 to 22.

Clause 25. An apparatus for establishing subscriber identity in a cellular network of a facility, the apparatus comprising at least one controller, which at least one controller is configured to execute, or direct execution of, any one of the methods of clauses 1 to 22.

Clause 26. An apparatus for establishing subscriber identity in a cellular network of a facility, the apparatus comprising a device ensemble of the facility, the device ensemble comprising sensors disposed in a housing, the sensors configured to facilitate any one of the methods of clauses 1 to 22.

Clause 27. A system for establishing subscriber identity in a cellular network of a facility, the system comprising: a communication network configured to: transmit a request for a subscriber profile from a mobile device of the subscriber; and transmit the subscriber profile to the mobile device, wherein: a connectivity profile, determined based at least in part on the request, comprises one or more connectivity characteristics for providing access to the cellular network that facilitates control of one or more building systems of the facility; and the subscriber profile is associated with the determined connectivity profile.

Clause 28. The system of clause 27, wherein the communication network is configured to transmit communication abiding by a vehicle bus standard protocol.

Clause 29. The system of any one of clauses 27-28 wherein the communication network is configured to utilize a wireless communication protocol to receive and/or transmit signals.

Clause 30. The system of clause 29 wherein the wireless communication protocol is associated with a wireless personal area network.

Clause 31. The system of any one of clauses 27-30 wherein the communication network is configured to transmit communication abiding by a communication bus protocol.

Clause 32. The system of clause 31 wherein the communication bus protocol facilitates upstream communication and downstream communication.

Clause 33. The system of any one of clauses 27-32 wherein the communication network is configured for power transmittance.

Clause 34. The system of any one of clauses 27-33 wherein the communication network is configured to transmit one or more signals configured to facilitate adjustment of an environment of the facility.

Clause 35. The system of any one of clauses 27-34 wherein the communication network is configured to transmit one or more signals that comprise, or are based at least in part on, environmental sensor measurements.

Clause 36. The system of any one of clauses 27-35 wherein the communication network is configured to transmit one or more signals configured to facilitate management of energy usage in the facility.

Clause 37. The system of any one of clauses 27-36 wherein the communication network is configured to transmit one or more protocols comprising at least one data communication protocol for automatic control of subsystems.

Clause 38. The system of any one of clauses 27-37 wherein the communication network is configured to transmit infrared (IR) signal, and/or radio frequency (RF) signal.

Clause 39. The system of any one of clauses 27-38 wherein the communication network comprises the cellular network.

Clause 40. The system of any one of clauses 27-39 wherein the communication network is operatively coupled to a power source and configured for power transmission.

Clause 41. The system of clause 40 wherein the power source optionally comprises a main power source, a backup power generator, or an uninterrupted power source (UPS).

Clause 42. The system of any one of clauses 27-41 wherein the communication network is configured to transmit a signal indicating energy or power consumption, wherein the power consumption optionally includes power consumption by a heating system, a cooling system, and/or lighting, and wherein the signal optionally facilitates monitoring power consumption of individual rooms or a group of rooms of the facility.

Clause 43. The system of any one of clauses 27-42 wherein the communication network is configured to utilize at least one wireless protocol that (i) utilizes radio frequency signals and/or (ii) facilitates communication with one or more sensors.

Clause 44. A non-transitory computer readable program instructions for establishing subscriber identity in a cellular network of a facility, which non-transitory computer readable program instructions, when executed by one or more processors operatively coupled to a communication network, cause the one or more processors to execute operations comprising: receiving, or directing receipt of, through the communication network a request for a subscriber profile from a mobile device of the subscriber; determining, or directing determination of, a connectivity profile based at least in part on the request received, wherein the connectivity profile comprises one or more connectivity characteristics for providing access to the cellular network that facilitates control of one or more building systems of the facility; and sending, or directing sending of, the subscriber profile to the mobile device, wherein the subscriber profile is associated with the determined connectivity profile.

Clause 45. The non-transitory computer readable program instructions of clause 44, wherein the communication network comprises the cellular network of the facility.

Clause 46. The non-transitory computer readable program instructions of any one of clauses 44-45 wherein at least a portion of the program instructions are disposed remotely from the facility.

Clause 47. The non-transitory computer readable program instructions of any one of clauses 44-46 wherein at least a portion of the program instructions are disposed in the cloud.

Clause 48. The non-transitory computer readable program instructions of any one of clauses 44-47 wherein the program instructions are inscribed on a non-transitory computer readable medium or on non-transitory computer readable media.

Clause 49. The non-transitory computer readable program instructions of any one of clauses 44-48 wherein the one or more processors comprise a processor disposed in a device ensemble of the facility, the device ensemble having a housing that encloses the one or more devices that comprise: (i) sensors, (ii) a transceiver, or (iii) a sensor and an emitter.

Clause 50. The non-transitory computer readable program instructions of any one of clauses 44-49 wherein the one or more processors include (i) a microprocessor and/or (ii) a graphical processing unit.

Clause 51. An apparatus for establishing subscriber identity in a cellular network of a facility, the apparatus comprising at least one controller, which at least one controller is configured to: (i) receive, or direct receipt of, through a communication network a request for a subscriber profile from a mobile device of the subscriber; (ii) determine, or direct determination of, a connectivity profile based at least in part on the request received, wherein the connectivity profile comprises one or more connectivity characteristics for providing access to the cellular network that facilitates control of one or more building systems of the facility; and (iii) send, or direct sending of, the subscriber profile to the mobile device, wherein the subscriber profile is associated with the determined connectivity profile.

Clause 52. The apparatus of clause 51, wherein the at least one controller is part of, or is configured to operatively couple to, a control system having more than two levels of control hierarchy.

Clause 53. The apparatus of any one of clauses 51-52 wherein the at least one controller comprises a controller that is disposed in, or attached to, a fixture of the facility.

Clause 54. The apparatus of any one of clauses 51-53 wherein the at least one controller comprises a controller that is disposed in a device ensemble of the facility, the device ensemble having a housing that encloses the one or more devices that comprise: (i) sensors, (ii) a transceiver, or (iii) a sensor and an emitter.

Clause 55. The apparatus of any one of clauses 51-54 wherein at least two operations of (i), (ii), and (iii) are executed by the same controller of the at least one controller.

Clause 56. The apparatus of any one of clauses 51-55 wherein at least two operations of (i), (ii), and (iii) are executed by the different controllers of the at least one controller.

Clause 57. An apparatus for establishing subscriber identity in a cellular network of a facility, the apparatus comprising: a device ensemble of the facility, the device ensemble having devices comprising (a) sensors, (b) a sensor and an emitter, or (c) a transceiver, the devices of the device ensemble are disposed in a housing, the device ensemble configured to (A) measure an environment of the facility and (B) output sensor measurements, the device ensemble is configure to be accessible to a mobile device of the subscriber, the mobile device operatively is configured to operatively couple with the communication at least in part by being configured to: (a) receive through the communication network a request for a subscriber profile from the mobile device of the subscriber; (b) determine a connectivity profile based at least in part on the request received, wherein the connectivity profile comprises one or more connectivity characteristics for providing access to the cellular network of the facility that facilitates control of one or more building systems of the facility; and (c) send the subscriber profile to the mobile device, wherein the subscriber profile is associated with the determined connectivity profile.

Clause 58. The apparatus of clause 57, wherein the device ensemble is configured for disposition in a fixture of the facility, or attached to a fixture of the facility.

Clause 59. The apparatus of clause 58 wherein the fixture comprises a framing.

Clause 60. The apparatus of clause 59 wherein the framing comprises a mullion or a transom.

Clause 61. The apparatus of any one of clauses 57-60 wherein the device ensemble comprises a processor, or a controller.

Clause 62. The apparatus of any one of clauses 57-61 wherein the device ensemble is configured to operatively couple to a control system of the facility.

Clause 63. The apparatus of any one of clauses 57-62 wherein the device ensemble is configured to facilitate environmental control of the facility.

Clause 64. A method of enabling a mobile device of a subscriber to communicate via a cellular network of a facility, the method comprising: receiving a request from the mobile device to access the cellular network of the facility, wherein: the request comprises data from the mobile device based at least in part on a subscriber profile accessible by the network, and the subscriber profile is associated with a connectivity profile comprising one or more connectivity characteristics for providing access to the cellular network associated with the facility, the cellular network facilitating control of one or more building systems of the facility; and subsequent to receiving the request, providing the mobile device access to the cellular network of the facility in accordance with the one or more connectivity characteristics.

Clause 65. The method of clause 64, wherein the subscriber profile comprises an embedded Subscriber Identification Module (eSIM) profile.

Clause 66. The method of any one of clauses 64-65 further comprising (i) receiving an acknowledgment that the subscriber profile has been installed on the mobile device; and (ii) responsive to receiving the acknowledgement, activating the subscriber profile on the cellular network of the facility.

Clause 67. The method of clause 66 wherein activating the subscriber profile comprises sending an International Mobile Subscriber Identifier (IMSI) activation notification to a subscription database.

Clause 68. The method of any one of clauses 66-67 wherein the cellular network of the facility is associated with a plurality of facilities, and wherein activating the subscriber profile comprises granting the mobile device access to the cellular network at least a subset of the plurality of facilities.

Clause 69. The method of any one of clauses 66-68 wherein receiving the request comprises receiving a Uniform Resource Locator (URL).

Clause 70. The method of clause 69 further comprising prior to receiving the request: (i) generating an indicator of the URL; and (ii) providing the indicator to the subscriber.

Clause 71. The method of clause 70 wherein the indicator comprises the URL, a HyperText Markup Language (HTML) link, a Quick Response (QR) code, or a bar code.

Clause 72. The method of any one of clauses 60-71 wherein providing the indicator to the subscriber comprises sending the indicator to a display, a kiosk, a web portal, a user device, or the mobile device.

Clause 73. The method of any one of clauses 69-72 wherein the URL is unique to the subscriber, subscriber type, event, facility, or venue.

Clause 74. The method of any one of clauses 64-73 wherein the one or more connectivity characteristics comprise a Quality of Service (QOS) level, an access level, a time during which access to the cellular network is granted or denied, and/or a bandwidth setting.

Clause 75. The method of clause 74 wherein the access level comprises a level of access to (i) information accessible via the cellular network, (ii) a data network accessible via cellular network, and/or (iii) a device operatively coupled with the cellular network.

Clause 76. The method of any one of clauses 64-75 wherein facilitating control of one or more building systems of the facility comprises facilitating security, health, and/or environmental control of the facility.

Clause 77. The method of any one of clauses 64-76 wherein the cellular network is operatively coupled to the one or more building systems.

Clause 78. The method of clause 77 wherein the one or more building systems comprises a device ensemble having a housing that encloses the one or more devices that comprise: (i) sensors, (ii) a transceiver, or (iii) a sensor and an emitter.

Clause 79. The method of clause 78 wherein the device ensemble is disposed in a fixture of the facility, or is attached to a fixture of the facility.

Clause 80. The method of clause 79 wherein the fixture comprises a framing portion.

Clause 81. The method of any one of clauses 77-80 wherein the one or more building systems comprise a tintable window.

Clause 82. The method of clause 81 wherein the tintable window comprises an electrochromic window.

Clause 83. The method of any one of clauses 64-82 wherein the cellular network comprises a wire configured to transit power and cellular communication.

Clause 84. The method of clause 83 wherein the cellular communication abides by at least a fourth generation, or a fifth generation cellular communication protocol.

Clause 85. The method of any one of clauses 64-84 wherein the cellular network is of facilities that include the facility.

Clause 86. A system for establishing subscriber identity in a communication network of a facility, the system comprising a communication network configured to transmit one or more signals associated with any of the methods of clauses 64 to 85.

Clause 87. A non-transitory computer readable program instructions for establishing subscriber identity in a communication network of a facility, which non-transitory computer readable program instructions, when executed by one or more processors operatively coupled to a communication network, cause the one or more processors to execute, or direct execution of, any one of the methods of clauses 64 to 85.

Clause 88. An apparatus for establishing subscriber identity in a communication network of a facility, the apparatus comprising at least one controller, which at least one controller is configured to execute, or direct execution of, any one of the methods of clauses 64 to 85.

Clause 89. An apparatus for establishing subscriber identity in a communication network of a facility, the apparatus comprising a device ensemble of the facility, the device ensemble comprising sensors disposed in a housing, the sensors configured to facilitate any one of the methods of clauses 64 to 85.

Clause 90. A system for enabling a mobile device of a subscriber to communicate via a cellular network of a facility, the system comprising: a communication network configured to: transmit a request from the mobile device to access the cellular network of the facility, wherein: the request comprises data from the mobile device based at least in part on a subscriber profile accessible by the network, and the subscriber profile is associated with a connectivity profile comprising one or more connectivity characteristics for providing access to the cellular network associated with the facility, the cellular network facilitating control of one or more building systems of the facility; and subsequent to receiving the request, provide the mobile device access to the cellular network of the facility in accordance with the one or more connectivity characteristics.

Clause 91. The system of clause 90, wherein the communication network is configured to transmit communication abiding by a vehicle bus standard protocol.

Clause 92. The system of any one of clauses 90-91 wherein the communication network is configured to utilize a wireless communication protocol to receive and/or transmit signals.

Clause 93. The system of clause 92 wherein the wireless communication protocol is associated with a wireless personal area network.

Clause 94. The system of any one of clauses 90-93 wherein the communication network is configured to transmit communication abiding by a communication bus protocol.

Clause 95. The system of clause 94 wherein the communication bus protocol facilitates upstream communication and downstream communication.

Clause 96. The system of any one of clauses 90-95 wherein the communication network is configured for power transmittance.

Clause 97. The system of any one of clauses 90-96 wherein the communication network is configured to transmit one or more signals configured to facilitate adjustment of an environment of the facility.

Clause 98. The system of any one of clauses 90-97 wherein the communication network is configured to transmit one or more signals that comprise, or are based at least in part on, environmental sensor measurements.

Clause 99. The system of any one of clauses 90-98 wherein the communication network is configured to transmit one or more signals configured to facilitate management of energy usage in the facility.

Clause 100. The system of any one of clauses 90-99 wherein the communication network is configured to transmit one or more protocols comprising at least one data communication protocol for automatic control of subsystems.

Clause 101. The system of any one of clauses 90-100 wherein the communication network is configured to transmit infrared (IR) signal, and/or radio frequency (RF) signal.

Clause 102. The system of any one of clauses 90-101 wherein the communication network comprises the cellular network.

Clause 103. The system of any one of clauses 90-102 wherein the communication network is operatively coupled to a power source and configured for power transmission.

Clause 104. The system of clause 103 wherein the power source optionally comprises a main power source, a backup power generator, or an uninterrupted power source (UPS).

Clause 105. The system of any one of clauses 90-104 wherein the communication network is configured to transmit a signal indicating energy or power consumption, wherein the power consumption optionally includes power consumption by a heating system, a cooling system, and/or lighting, and wherein the signal optionally facilitates monitoring power consumption of individual rooms or a group of rooms of the facility.

Clause 106. The system of any one of clauses 90-105 wherein the communication network is configured to utilize at least one wireless protocol that (i) utilizes radio frequency signals and/or (ii) facilitates communication with one or more sensors.

Clause 107. A non-transitory computer readable program instructions for enabling a mobile device of a subscriber to communicate via a cellular network of a facility, which non-transitory computer readable program instructions, when executed by one or more processors, cause the one or more processors to execute operations comprising: receiving, or directing receipt of, a request from the mobile device to access the cellular network of the facility, wherein: the request comprises data from the mobile device based at least in part on a subscriber profile accessible by the network, and the subscriber profile is associated with a connectivity profile comprising one or more connectivity characteristics for providing access to the cellular network associated with the facility, the cellular network facilitating control of one or more building systems of the facility; and subsequent to receiving the request, providing, or directing providing of, the mobile device access to the cellular network of the facility in accordance with the one or more connectivity characteristics.

Clause 108. The non-transitory computer readable program instructions of clause 107, wherein the communication network comprises the cellular network of the facility.

Clause 109. The non-transitory computer readable program instructions of any one of clauses 107-108 wherein at least a portion of the program instructions are disposed remotely from the facility.

Clause 110. The non-transitory computer readable program instructions of any one of clauses 107-109 wherein at least a portion of the program instructions are disposed in the cloud.

Clause 111. The non-transitory computer readable program instructions of any one of clauses 107-110 wherein the program instructions are inscribed on a non-transitory computer readable medium or on non-transitory computer readable media.

Clause 112. The non-transitory computer readable program instructions of any one of clauses 107-111 wherein the one or more processors comprise a processor disposed in a device ensemble of the facility, the device ensemble having a housing that encloses the one or more devices that comprise: (i) sensors, (ii) a transceiver, or (iii) a sensor and an emitter.

Clause 113. The non-transitory computer readable program instructions of any one of clauses 107-112 wherein the one or more processors include (i) a microprocessor and/or (ii) a graphical processing unit.

Clause 114. An apparatus for enabling a mobile device of a subscriber to communicate via a cellular network of a facility, the apparatus comprising at least one controller, which at least one controller is configured to: receive, or direct receipt of, a request from the mobile device to access the cellular network of the facility, wherein: the request comprises data from the mobile device based at least in part on a subscriber profile accessible by the network, and the subscriber profile is associated with a connectivity profile comprising one or more connectivity characteristics for providing access to the cellular network associated with the facility, the cellular network facilitating control of one or more building systems of the facility; and subsequent to receiving the request, provide, or direct providing of, the mobile device access to the cellular network of the facility in accordance with the one or more connectivity characteristics.

Clause 115. The apparatus of clause 114, wherein the at least one controller is part of, or is configured to operatively couple to, a control system having more than two levels of control hierarchy.

Clause 116. The apparatus of any one of clauses 114-115 wherein the at least one controller comprises a controller that is disposed in, or attached to, a fixture of the facility.

Clause 117. The apparatus of any one of clauses 114-116 wherein the at least one controller comprises a controller that is disposed in a device ensemble of the facility, the device ensemble having a housing that encloses the one or more devices that comprise: (i) sensors, (ii) a transceiver, or (iii) a sensor and an emitter.

Clause 118. The apparatus of any one of clauses 114-117 wherein at least two operations of (i), (ii), and (iii) are executed by the same controller of the at least one controller.

Clause 119. The apparatus of any one of clauses 114-117 wherein at least two operations of (i), (ii), and (iii) are executed by the different controllers of the at least one controller.

Clause 120. An apparatus for enabling a mobile device of a subscriber to communicate via a cellular network of a facility, the apparatus comprising: a device ensemble of the facility, the device ensemble having devices comprising (a) sensors, (b) a sensor and an emitter, or (c) a transceiver, the devices of the device ensemble are disposed in a housing, the device ensemble configured to (A) measure an environment of the facility and (B) output sensor measurements, the device ensemble is configure to be accessible to a mobile device of the subscriber, the mobile device operatively is configured to operatively couple with the communication network of the facility at least in part by being configured to: receiving a request from the mobile device to access the cellular network of the facility, wherein: the request comprises data from the mobile device based at least in part on a subscriber profile accessible by the network, and the subscriber profile is associated with a connectivity profile comprising one or more connectivity characteristics for providing access to the cellular network associated with the facility, the cellular network facilitating control of one or more building systems of the facility; and subsequent to receiving the request, providing the mobile device access to the cellular network of the facility in accordance with the one or more connectivity characteristics.

Clause 121. The apparatus of clause 120, wherein the device ensemble is configured for disposition in a fixture of the facility, or attached to a fixture of the facility.

Clause 122. The apparatus of any one of clauses 120-121 wherein the fixture comprises a framing.

Clause 123. The apparatus of any one of clauses 120-122 wherein the framing comprises a mullion or a transom.

Clause 124. The apparatus of any one of clauses 120-123 wherein the device ensemble comprises a processor, or a controller.

Clause 125. The apparatus of any one of clauses 120-124 wherein the device ensemble is configured to be operatively coupled to a control system of the facility.

Clause 126. The apparatus of any one of clauses 120-125 wherein the device ensemble is configured to facilitate environmental control of the facility.

What is claimed is:

1. A method of establishing subscriber identity in a cellular network of a facility, the method comprising:

receiving a request for a subscriber profile from a mobile device of a subscriber;

determining a connectivity profile based at least in part on the request received, wherein the connectivity profile comprises one or more connectivity characteristics for providing access to the cellular network that facilitates control of one or more building systems of the facility using a cable configured to transmit both electrical power and cellular communication to the one or more building systems of the facility, wherein the one or more connectivity characteristics indicate an amount of energy consumed by at least one of a heating system, a cooling system, and a lighting system; and sending the subscriber profile to the mobile device, wherein the subscriber profile is associated with the determined connectivity profile.

2. The method of claim 1, wherein the subscriber profile comprises an embedded Subscriber Identification Module (eSIM) profile.

3. The method of claim 1, further comprising: (i) receiving an acknowledgment that the subscriber profile has been installed on the mobile device; and (ii) responsive to receiving the acknowledgement, activating the subscriber profile on the cellular network of the facility.

4. The method of claim 3, wherein activating the subscriber profile comprises sending an International Mobile Subscriber Identifier (IMSI) activation notification to a subscription database.

5. The method of claim 3, wherein the cellular network of the facility is associated with a plurality of facilities, and wherein activating the subscriber profile comprises granting the mobile device access to the cellular network at, at least a subset of, the plurality of facilities.

6. The method of claim 1, wherein receiving the request comprises receiving a Uniform Resource Locator (URL).

7. The method of claim 1, wherein the one or more connectivity characteristics comprise a Quality of Service (QOS) level, an access level, a time during which access to the cellular network is granted or denied, a bandwidth setting, or any combination thereof.

8. The method of claim 7, wherein the access level comprises a level of access to (i) information accessible via the cellular network, (ii) a data network accessible via the cellular network, (iii) a device operatively coupled with the cellular network, or any combination of (i)-(iii).

9. The method of claim 1, wherein the one or more connectivity characteristics facilitate control of one or more building systems of the facility using Gigabit Home Networking (G.hn).

10. A system for establishing subscriber identity in a cellular network of a facility, the system configured to:

receive a request for a subscriber profile from a mobile device of a subscriber;

determine a connectivity profile based at least in part on the request received, wherein the connectivity profile comprises one or more connectivity characteristics for providing access to the cellular network that facilitates control of one or more building systems of the facility using a cable configured to transmit both electrical power and cellular communication to the one or more building systems of the facility, wherein the one or more connectivity characteristics indicate an amount of energy consumed by at least one of a heating system, a cooling system, and a lighting system; and send the subscriber profile to the mobile device, wherein the subscriber profile is associated with the determined connectivity profile.

11. The system of claim 10, wherein the subscriber profile comprises an embedded Subscriber Identification Module (eSIM) profile.

12. The system of claim 10, wherein the system is further configured to: (i) receive an acknowledgment that the subscriber profile has been installed on the mobile device; and (ii) responsive to receiving the acknowledgement, activate the subscriber profile on the cellular network of the facility.

13. The system of claim 12, wherein, to activate the subscriber profile, the system is configured to send an International Mobile Subscriber Identifier (IMSI) activation notification to a subscription database.

14. The system of claim 10, wherein, to determine the one or more connectivity characteristics, the system is configured to determine a Quality of Service (QOS) level, an access level, a time during which access to the cellular network is granted or denied, a bandwidth setting, or any combination thereof.

15. The system of claim 14, wherein, to determine an access level, the system is configured to determine a level of access to (i) information accessible via the cellular network, (ii) a data network accessible via the cellular network, (iii) a device operatively coupled with the cellular network, or any combination of (i)-(iii).

16. A non-transitory computer readable medium storing program instructions for establishing subscriber identity in a cellular network of a facility, which non- transitory computer readable program instructions, when executed by one or more processors operatively coupled to a communication network, cause the one or more processors to execute operations comprising:

receiving, or directing receipt of, through the communication network a request for a subscriber profile from a mobile device of a subscriber;

determining, or directing determination of, a connectivity profile based at least in part on the request received, wherein the connectivity profile comprises one or more connectivity characteristics for providing access to the cellular network that facilitates control of one or more building systems of the facility using a cable configured to transmit both electrical power and cellular communication to the one or more building systems of the facility, wherein the one or more connectivity characteristics indicate an amount of energy consumed by at least one of a heating system, a cooling system, and a lighting system; and sending, or directing the sending of, the subscriber profile to the mobile device, wherein the subscriber profile is associated with the determined connectivity profile.

17. The non-transitory computer readable medium of claim 16, wherein the subscriber profile comprises an embedded Subscriber Identification Module (eSIM) profile.

18. The non-transitory computer readable medium of claim 16, wherein the operations further comprise: (i) receiving an acknowledgment that the subscriber profile has been installed on the mobile device; and (ii) responsive to receiving the acknowledgement, activating the subscriber profile on the cellular network of the facility.

19. The non-transitory computer readable medium of claim 18, wherein the operations to activate the subscriber profile include sending an International Mobile Subscriber Identifier (IMSI) activation notification to a subscription database.

20. The non-transitory computer readable medium of claim 16, wherein the operations to determine the one or more connectivity characteristics include determining a Quality of Service (QOS) level, an access level, a time during which access to the cellular network is granted or denied, a bandwidth setting, or any combination thereof.

* * * * *